United States Patent [19]

Sonuparlak et al.

[11] Patent Number: 5,350,003
[45] Date of Patent: Sep. 27, 1994

[54] REMOVING METAL FROM COMPOSITE BODIES AND RESULTING PRODUCTS

[75] Inventors: Birol Sonuparlak; William B. Johnson, both of Newark; Ali S. Fareed, Wilmington, all of Del.

[73] Assignee: Lanxide Technology Company, LP, Newark, Del.

[21] Appl. No.: 90,352

[22] Filed: Jul. 9, 1993

[51] Int. Cl.$^5$ .................... B22D 19/02; B22D 19/14
[52] U.S. Cl. ........................................ 164/91; 164/98; 164/69.1; 264/44; 264/344
[58] Field of Search ............... 164/91, 97, 98, 100, 164/101, 102, 103, 104, 105, 69.1; 264/344, 48, 60, 44

[56] References Cited

U.S. PATENT DOCUMENTS

| | | | |
|---|---|---|---|
| 4,712,600 | 12/1987 | Hamajima et al. | 164/108 |
| 4,737,332 | 4/1988 | Miyashita et al. | 264/344 |
| 4,781,873 | 11/1988 | Ford | 264/344 |
| 4,806,508 | 2/1989 | Dwivedi et al. | 501/94 |
| 4,820,498 | 4/1989 | Newkirk | 264/344 |
| 4,826,643 | 5/1989 | Newkirk et al. | 264/57 |
| 4,828,008 | 5/1989 | White et al. | 164/97 |
| 4,868,143 | 9/1989 | Newkirk et al. | 264/344 |
| 4,871,495 | 10/1989 | Helferich et al. | 264/344 |
| 4,871,696 | 10/1989 | Newkirk et al. | 501/94 |
| 4,874,569 | 10/1989 | Kuszyk et al. | 264/60 |
| 4,892,786 | 1/1990 | Newkirk | 428/307 |
| 4,948,764 | 8/1990 | Newkirk et al. | 501/127 |
| 4,956,137 | 9/1990 | Dwivedi | 264/60 |
| 5,015,610 | 5/1991 | Dwivedi | 501/127 |
| 5,024,794 | 6/1991 | Newkirk et al. | 264/57 |
| 5,063,185 | 11/1991 | Dwivedi et al. | 501/126 |
| 5,110,675 | 5/1992 | Newkirk | 428/312.2 |
| 5,204,299 | 4/1993 | Dwivedi et al. | 501/127 |
| 5,232,040 | 8/1993 | Johnson | 164/69.1 |

FOREIGN PATENT DOCUMENTS

| | | |
|---|---|---|
| 0155831 | 9/1985 | European Pat. Off. . |
| 0169067 | 1/1986 | European Pat. Off. . |
| 0245193 | 11/1987 | European Pat. Off. . |
| 0261057 | 3/1988 | European Pat. Off. . |
| 0261062 | 3/1988 | European Pat. Off. . |
| 0291441 | 11/1988 | European Pat. Off. . |
| 0375588 | 6/1990 | European Pat. Off. . |
| 279464 | of 0000 | Fed. Rep. of Germany . |
| 279468 | 6/1990 | Fed. Rep. of Germany . |
| 2156718 | 10/1985 | United Kingdom . |
| 9200939 | 1/1992 | World Int. Prop. O. . |
| 9212108 | 7/1992 | World Int. Prop. O. . |
| 9213689 | 8/1992 | World Int. Prop. O. . |

Primary Examiner—P. Austin Bradley
Assistant Examiner—Rex E. Pelto
Attorney, Agent, or Firm—Mark G. Mortenson; Stanislav Antolin

[57] ABSTRACT

The present invention relates to a novel process for removal of at least a portion of at least one metallic component of a metallic constituent from a multi-phase composite body. Particularly, by providing at least one of an infiltration enhancer or an infiltration enhancer precursor or an infiltrating atmosphere to be in communication with a permeable mass, which contacts at least a portion of a composite body, said metallic component of the composite body, when made molten, is caused to spontaneously infiltrate the permeable mass. Such spontaneous infiltration occurs without the requirement for the application of any pressure or vacuum. The metallic constituent is essentially leached or removed from the multi-phase body by spontaneous infiltration.

65 Claims, 18 Drawing Sheets

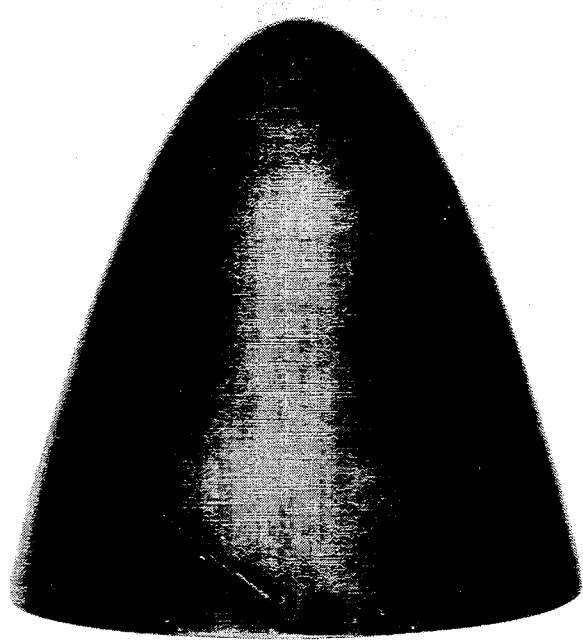
Fig-7A
Fig-7B
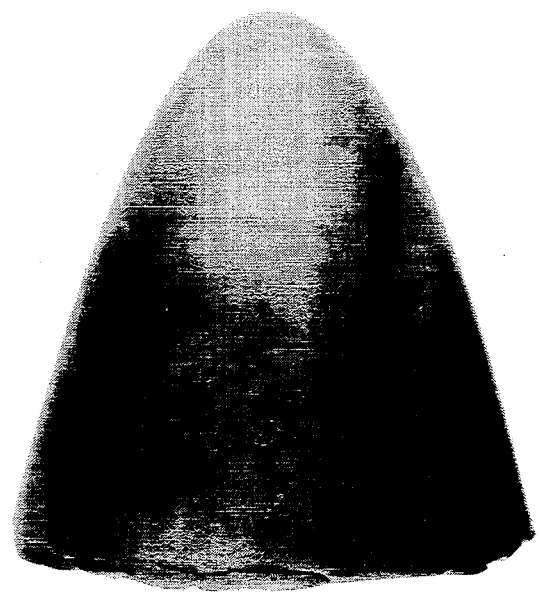

5,350,003

REMOVING METAL FROM COMPOSITE BODIES AND RESULTING PRODUCTS

CROSS-REFERENCE TO RELATED APPLICATIONS

This application is a continuation-in-part of International Patent Application No. PCT/US92/00180 filed on Jan. 10, 1992 and International Patent Application No. PCT/US92/00391 filed on Jan. 16, 1992.

International Application No. PCT/US92/00180 is a continuation-in-part of commonly owned U.S. application Ser. No. 07/639,853, filed Jan. 11, 1991, (now abandoned), which is a continuation-in-part of U.S. patent application Ser. No. 07/443,265, filed Nov. 29, 1989, (now abandoned), in the names of Birol Sonuparlak et al., and entitled "A Method of Removing Metal From Composite Bodies and Products Produced Thereby".

International Application No. PCT/US92/00391 is a continuation-in-part of commonly owned U.S. patent application Ser. No. 07/642,267, filed Jan. 16, 1991, (now abandoned), which is a continuation-in-part of U.S. patent application Ser. No. 07/443,265, filed Nov. 29, 1989, (now abandoned) in the names of Birol Sonuparlak et al., and entitled "A Method of Removing Metal From Composite Bodies and Products Produced Thereby". All of the above-identified applications are herein incorporated by reference.

FIELD OF THE INVENTION

The present invention relates to a novel process for removing metal from composite bodies. Particularly, a composite body which comprises at least one metal component within a metallic constituent, which is at least partially accessible, or can be made to be at least partially accessible, from at least one surface thereof, may be subjected to the methods of the present invention to remove at least a portion, or substantially all, of the metallic constituent from the composite body. The metallic constituent, or at least a metal component of the metallic constituent, may be removed without the requirement for the application of any pressure or vacuum.

BACKGROUND OF THE INVENTION

Composite products (e.g., ceramic reinforced metals and metal reinforced ceramics) comprising a metallic constituent and a second component, such as a strengthening or reinforcing phase (e.g., ceramic particulates, whiskers, fibers or the like) show great promise for a variety of applications. However, in some cases a metallic constituent, or at least one metallic component of the metallic constituent, in a composite body may prevent the composite body from being used in some industrial applications. For example, if a composite body contained an aluminum component as, or in, the metallic constituent, and also contained a ceramic phase or component, the aluminum component, if present in substantial amounts, could prohibit the composite body from being utilized in, for example, certain high temperature applications, certain corrosive environments, certain erosive environments, etc. Thus, in some cases, it may be desirable to remove at least a portion, or substantially all, of a particular component in the metallic constituent or the metallic constituent itself from the composite body.

Various methods for removing a metallic constituent from a composite body are known in the art. Specifically, the general knowledge that a metallic constituent can be leached from a composite body exists. Moreover, the general knowledge that the simultaneous application of temperature and some type of mechanically applied pressure to remove a metallic constituent from a composite body also exists. However, these methods have drawbacks associated with them. For example, the simultaneous application of temperature and pressure could have a deleterious effect upon the microstructure of the composite body. Moreover, the shape of the composite body could be adversely affected if a large amount of pressure was applied. Likewise, subjecting a composite body to a leaching step could also have deleterious effects upon the microstructure (or macrostructure) of the composite body. Still further, these processes may not reliably remove substantial portions of a metallic constituent unless long amounts of time and/or relatively high temperatures are provided for metallic constituent removal. Moreover, such methods may not be capable of selectively removing one or more metallic components within a metallic constituent.

Accordingly, there has been a long felt need for a simple and reliable process to remove from certain composite bodies some or all of a metallic component of a metallic constituent, as well as removing some or all of the metallic constituent itself, said process not relying upon the use of applied pressure or vacuum (whether externally applied or internally created). The present invention satisfies these and other needs by providing a technique for the removal of at least a portion, or substantially all, of a metallic constituent from a composite body, without. the requirement for the application of pressure, etc. Moreover, the present invention provides a technique for the selected removal of at least one metallic component of a metallic constituent and/or selected areas of removal of at least one metallic component of a metallic constituent from the composite body.

DESCRIPTION OF COMMONLY OWNED U.S. PATENTS AND U.S. PATENT APPLICATIONS

The subject matter of this application is somewhat related to the subject matter contained in several other commonly owned patents and commonly owned co-pending patent applications. Specifically, the concept of spontaneous infiltration to form a metal matrix composite body has been disclosed in a number of commonly owned patents and patent applications, the most relevant of which are discussed below herein.

A novel method for forming metal matrix composite bodies is disclosed in commonly owned U.S. Pat. No. 5,249,621, which issued on Oct. 5, 1993, from U.S. patent application Ser. No. 07/863,894, filed Apr. 16, 1992, which is a continuation of U.S. patent application Ser. No. 07/521,043, filed May 9, 1990, (now abandoned) which is a continuation-in-part of U.S. patent application Ser. No. 07/484,753, filed Feb. 23, 1990, (now abandoned) which is a continuation-in-part of U.S. patent application Ser. No. 07/432,661, filed Nov. 7, 1989, (now abandoned) which is continuation-in-part of U.S. patent application Ser. No. 07/416,327, filed Oct. 6, 1989, (now abandoned) which in turn is a continuation-in-part of U.S. patent application Ser. No. 07/349,590, filed May 9, 1989, (now abandoned) which in turn is a continuation-in-part of U.S. Ser. No. 07/269,311, filed Nov. 10, 1988, (now abandoned) all of which were filed in the names of Aghajanian et al., and all of which were entitled "A Method of Forming Metal Matrix Composite Bodies by a Spontaneous Infiltration Process, and Products Produced Therefrom".

Under the process conditions disclosed in the aforementioned Aghajanian et al., applications, a metal matrix composite body is produced by spontaneously infiltrating (i.e., infiltrating without the requirement of pressure, whether externally applied or internally created) a permeable mass of filler material or a preform with a molten matrix metal. Specifically, an infiltration enhancer and/or an infiltration enhancer precursor and/or an infiltrating atmosphere are in communication with the filler material or preform, at least at some point during the process, which permits molten matrix metal to spontaneously infiltrate the filler material or preform.

In a first preferred embodiment, a precursor to an infiltration enhancer may be supplied to at least one of a filler material or preform, and/or a matrix metal, and/or an infiltrating atmosphere. The supplied infiltration enhancer precursor may thereafter react with at least one constituent in the filler material or preform, and/or the matrix metal, and/or the infiltrating atmosphere to produce infiltration enhancer in at least a portion of, or on, the filler material or preform. Ultimately, at least during the spontaneous infiltration, infiltration enhancer should be in contact with at least a portion of the filler material or preform.

In another preferred embodiment of the Aghajanian et al., invention, rather than supplying an infiltration enhancer precursor, an infiltration enhancer may be supplied directly to at least one of the filler material or preform, and/or matrix metal, and/or infiltrating atmosphere. Ultimately, at least during the spontaneous infiltration, the infiltration enhancer should be in contact with at least a portion of the filler material or preform.

These Aghajanian et al., applications disclose numerous examples of matrix metals, which at some point during the formation of a metal matrix composite, may be contacted with an infiltration enhancer precursor, in the presence of an infiltrating atmosphere. Thus, various references were made in the aforementioned applications to particular matrix metal/infiltration enhancer precursor/infiltrating atmosphere systems which exhibit spontaneous infiltration. However, as stated in these Aghajanian et al., applications, it is conceivable that many other matrix metal/infiltration enhancer precursor/infiltrating atmosphere systems other than those discussed in the applications may behave in a manner similar to the systems expressly discussed therein. Specifically, spontaneous infiltration behavior has been observed in the aluminum/magnesium/nitrogen system; the aluminum/strontium/nitrogen system; the aluminum/zinc/oxygen system; and the aluminum/calcium/nitrogen system. Accordingly, even though the Aghajanian et al., applications discuss only those systems referred to above herein, Aghajanian et al., state that it should be understood that other matrix metal/infiltration enhancer precursor/infiltrating atmosphere systems may behave in a similar manner.

In a preferred embodiment for achieving spontaneous infiltration into a permeable mass of filler material or a preform, molten matrix metal is contacted with the preform or filler material. The preform or filler material may have admixed therewith, and/or at some point during the process, be exposed to, an infiltration enhancer precursor. Moreover, in a preferred embodiment, the molten matrix metal, and/or preform or filler material, communicate with an infiltrating atmosphere for at least a portion of the process. In another preferred embodiment, the matrix metal, and/or preform or filler material, communicate with an infiltrating atmosphere for substantially all of the process. The preform or filler material will be spontaneously infiltrated by molten matrix metal, and the extent or rate of spontaneous infiltration and formation of metal matrix composite will vary with a given set of processing conditions including, for example, the concentration of infiltration enhancer precursor provided to the system (e.g., in the molten matrix alloy and/or in the filler material or preform and/or in the infiltrating atmosphere), the size and/or composition of the filler material, the size and/or composition of particles in the filler material or preform, the available porosity for infiltration into the preform or filler material, the time permitted for infiltration to occur, and/or the temperature at which infiltration occurs. Spontaneous infiltration typically occurs to an extent sufficient to embed substantially completely the preform or filler material.

The entire disclosure of the above-discussed commonly owned Aghajanian et al., patent applications are expressly incorporated herein by reference.

A novel method of forming a metal matrix composite by infiltration of a permeable mass of filler contained in a ceramic matrix composite mold is disclosed in Commonly Owned U.S. Pat. No. 4,998,578, which issued on Mar. 12, 1991, from U.S. patent application Ser. No. 07/380,977, filed on Jul. 17, 1989, as a continuation of U.S. Pat. No. 4,871,008, which issued on Oct. 3, 1989, from U.S. patent application Ser. No. 07/142,385, filed Jan. 11, 1988, by Dwivedi et al., both entitled "Method of Making Metal Matrix Composites". According to the method disclosed in the Dwivedi et al. Patents, a mold is formed by the directed oxidation of a molten precursor metal or parent metal with an oxidant to develop or grow a polycrystalline oxidation reaction product which embeds at least a portion of a preform comprised of a suitable filler (referred to as a "first filler") to form a ceramic matrix composite mold. The formed mold of ceramic matrix composite is then provided with a second filler and the second filler and mold are contacted with molten metal, and the mold contents are hermetically sealed, most typically by introducing at least one molten metal into the entry or opening which seals the mold. The hermetically sealed bedding may contain entrapped air, but the entrapped air and the mold contents are isolated or sealed so as to exclude or shutout the external or ambient air. By providing a hermetic environment, effective infiltration of the second filler at moderate molten metal temperatures is achieved, and therefore obviates or eliminates any necessity for wetting agents, special alloying ingredients in the molten matrix metal, applied mechanical pressure, applied vacuum, special gas atmospheres or other infiltration expedients.

The above-discussed commonly owned patents describe a method for the production of a metal matrix composite body, which may be bonded to a ceramic matrix composite body, and the novel bodies which are produced therefrom.

A method of forming macrocomposite bodies by a somewhat related process is disclosed in Commonly Owned U.S. Pat. No. 5,163,499, which issued Nov. 17, 1992, from U.S. patent application Ser. No. 07/520,936, filed May 9, 1990, which is a continuation-in-part of U.S. patent application Ser. No. 07/484,575, (now abandoned), filed on Feb. 23, 1990, in the names of Marc S. Newkirk et al. This application was a continuation-inpart application of application Ser. No. 07/405,747 (now abandoned), filed on Sep. 11, 1989, in the names of Marc S. Newkirk et al., and entitled "Methods for Forming Macrocomposite Bodies and Macrocomposite Bodies Produced Thereby", which in turn was a continuation-in-part application of U.S. patent application Ser. No. 07/376,416 (now abandoned), filed on Jul. 7, 1989, which was a continuation-in-part of U.S. patent application Ser. No. 07/368,564 now abandoned), filed on Jun. 20, 1989, which was in turn a continuation-in-part of U.S. patent application Ser. No. 07/269,464, filed on Nov. 10, 1988, which issued on Aug. 20, 1991, as U.S. Pat. No. 5,040,588, all in the names of Marc S. Newkirk et al., and entitled "Methods for Forming Macrocomposite Bodies and Macrocomposite Bodies Produced Thereby". A continuation of U.S. Pat. 5,040,588, was filed on Aug. 19, 1991, as U.S. patent application Ser. No. 07/747,213. These applications and Patent disclose various methods relating to the formation of macrocomposite bodies by spontaneously infiltrating a permeable mass of filler material or a preform with molten matrix metal and bonding the spontaneously infiltrated material to at least one second material such as a ceramic and/or a metal. Particularly, an infiltration enhancer and/or infiltration enhancer precursor and/or infiltrating atmosphere are in communication with a filler material or a preform, at least at some point during the process, which permits molten matrix metal to spontaneously infiltrate the filler material or preform. Moreover, prior to infiltration, the filler material or preform is placed into contact with at least a portion of a second material such that after infiltration of the filler material or preform, the infiltrated material is bonded to the second material, thereby forming a macrocomposite body.

A method of forming metal matrix composite bodies by a self-generated vacuum process is disclosed in Commonly Owned U.S. Pat. No. 5,224,533, issued Jul. 6, 1993, from U.S. patent application Ser. No. 07/888,241, which is a continuation-in-part of U.S. patent application Ser. No. 07/381,523, filed on Jul. 18, 1989, (now abandoned), in the names of Robert C. Kantner et al., and entitled "A Method of Forming Metal Matrix Composite Bodies by a Self-Generated Vacuum Process, and Products Produced Therefrom". This patent application discloses a method whereby a molten matrix metal is contacted with a filler material or a preform in the presence of a reactive atmosphere, and, at least at some point during the process, the molten matrix metal reacts, either partially or substantially completely, with the reactive atmosphere, thereby causing the molten matrix metal to infiltrate the filler material or preform due to, at least in part, the creation of a self-generated vacuum. Such self-generated vacuum infiltration occurs without the application of any external pressure or vacuum.

A method of forming macrocomposite bodies by a somewhat related process is disclosed in Commonly Owned U.S. Pat. No. 5,247,986, which issued on Sep. 28, 1993, from U.S. patent application Ser. No. 07/824,686, filed on Jan. 21, 1992, and U.S. Pat. No. 5,188,164, which issued Feb. 23, 1993, from U.S. patent application Ser. No. 07/560,746, filed on Jul. 31, 1990, in the names of Robert C. Kantner et al., and entitled "A Method of Forming Macrocomposite Bodies By Self-Generated Vacuum Techniques, and Products Produced Therefrom". U.S. patent application Ser. No. 07/824,686, (now allowed), filed on Jan. 21, 1992, is a continuation application of U.S. patent application Ser. No. 07/383,935, (now abandoned) filed on Jul. 21 1989, in the names of Robert C. Kantner et al., and entitled "A Method of Forming Macrocomposite Bodies By Self-Generated Vacuum Techniques, and Products Produced Therefrom". U.S. Pat. No. 5,188,164, issued Feb. 23, 1993, from U.S. patent application Ser. No. 07/560,746, filed on Jul. 31, 1990, is a continuation-in-part application of U.S. patent application Ser. No. 07/383,935 (now abandoned), filed on Jul. 21, 1989, in the names of Robert C. Kantner et al., and entitled "A Method of Forming Macrocomposite Bodies By Self-Generated Vacuum Techniques, and Products Produced Therefrom". These patent applications disclose a method whereby a molten matrix metal is contacted with a filler material or a preform, optionally in contact with a second or additional body, in the presence of a reactive atmosphere, and, at least at some point during the process, the molten matrix metal reacts, either partially or substantially completely, with the reactive atmosphere, thereby causing the molten matrix metal to infiltrate the filler material or preform due to, at least in part, the creation of a self-generated vacuum. The infiltrated material may be bonded to the carcass of the matrix metal and/or the second or additional body thereby forming a macrocomposite body. Such self-generated vacuum infiltration occurs without the application of any external pressure or vacuum.

Methods of forming shaped metal matrix composite bodies by a spontaneous infiltration process are disclosed in Commonly Owned U.S. Pat. No. 5,316,069, which issued on May 31, 1994, from U.S. patent application Ser. No. 07/803,769, filed on Dec. 5, 1991, which is a continuation of U.S. patent application Ser. No. 07/520,915, which was filed on May 9, 1990, now abandoned, in the names of Aghajanian et al., and entitled "Method of Making Metal Matrix Composite Bodies With Use of A Barrier" and commonly owned and copending International Application No. PCT/US91/03232, filed on May 9, 1991, claiming priority to U.S. patent application Ser. No. 07/520,915, and entitled "Barrier Materials For Making Metal Matrix Composites". These applications describe methods for making a metal matrix composite produced by spontaneously infiltrating a molten matrix metal into a permeable mass of filler material or a preform having at least one surface boundary established or defined by a barrier means. Specifically, an infiltration enhancer and/or an infiltration enhancer precursor and/or an infiltrating atmosphere are in communication with the filler material or preform, at least at some point during the process, which permits molten matrix metal to spontaneously infiltrate the filler material or preform up to the barrier material. A barrier material, typically, inhibits the transport of molten matrix metal beyond itself, thereby permitting the formation of shaped metal matrix composite bodies.

The barrier means disclosed in these applications may be any suitable means which interferes, inhibits, prevents or terminates the migration, movement, or the like, of molten matrix alloy (e.g., an aluminum alloy) beyond the defined surface boundary of the filler material. Suitable barrier means may be any material, compound, element, composition, or the like, which, under the process conditions of this invention, maintains some integrity, is not volatile and preferably is permeable to the gas used with the process, as well as being capable of locally inhibiting, stopping, interfering with, preventing, or the like, continued infiltration or any other kind of movement of the molten matrix metal beyond the defined surface boundary of the ceramic filler. Barrier means may be used during spontaneous infiltration or in any molds or other fixtures utilized in connection with thermo-forming of the spontaneously infiltrated metal matrix composite, as discussed in greater detail below.

The barrier materials of these applications may be a physical barrier (e.g., colloidal graphite, certain glass-forming materials, etc.), a reactive barrier (e.g., calcium carbonate, aluminum phosphate, colloidal silica, etc.), or any combination of the two (e.g., Grade A-17 alumina having an average particle size of about 3.5 microns obtained from Alcoa Industrial Products, Bauxite, Ark.). The barrier material should prevent the molten matrix metal from infiltrating beyond the desired boundaries of the filler material or preform and, preferably, provide a smooth surface finish to the final metal matrix composite body. Further, the barrier should not react or dissolve into the molten matrix metal or the filler material, unless such behavior is desired, e.g., when a reactive barrier is utilized. Any material or combination of materials which satisfy the above-described criteria for a particular matrix metal/infiltration enhancer and/or infiltration enhancer precursor and/or infiltrating atmosphere/filler material system may be utilized as a barrier material in that system.

The entire disclosures of the above-described commonly owned patents and patent applications are expressly incorporated herein by reference.

The subject matter of this application is also related to that of several commonly owned ceramic and ceramic composite Patents and commonly owned and copending ceramic and ceramic composite Patent Applications. Particularly, these Patents and Patent Applications describe novel methods for making ceramic and ceramic matrix composite materials (hereinafter sometimes referred to as "Commonly Owned Ceramic Matrix Patent Applications and Patents").

A novel method for forming ceramic matrix composite bodies is disclosed in commonly owned International Application No. PCT/US93/03024, filed Apr. 1, 1993, which is a continuation-in-part of U.S. patent application Ser. No. 08/003,202, filed on Jan. 11, 1993, which in turn is a continuation-in-part of U.S. patent application Ser. No. 07/862,397, filed on Apr. 2, 1992, both in the names of Christopher R. Kennedy et al., which in turn is a continuation-in-part application of U.S. Pat. No. 5,202,059 issued Apr. 13, 1993, from U.S. patent application Ser. No. 07/061,854 not allowed, filed on Jun. 12, 1987, in the name of Christopher R. Kennedy and entitled, "Coated Ceramic Filler Materials".

The filler materials utilized in this invention may be protected by a number of different mechanisms in a number of different composite bodies. Filler materials containing a coating or plurality of coatings, in accordance with the teachings of [this invention] International Application No. PCT/US93/03024, are particularly applicable or useful in the production of ceramic composites disclosed and claimed in Commonly Owned U.S. Pat. No. 4,851,375, entitled, "Methods of Making Composite Ceramic Articles Having Embedded Filler," which issued on Jul. 25, 1989, from U.S. patent application Ser. No. 819,397, filed Jan. 17, 1986, which is a continuation-in-part of Ser. No. 697,876, filed Feb. 4, 1985, (now abandoned), both in the names of Marc S. Newkirk et al. and entitled, "Composite Ceramic Articles and Methods of Making Same". This Commonly Owned U.S. Patent discloses a novel method for producing a self-supporting ceramic composite by growing an oxidation reaction product from a precursor metal or parent metal into a permeable mass of filler.

A novel approach to the formation of ceramic materials is disclosed generically in Commonly Owned U.S. Pat. No. 4,713,360, which issued on Dec. 15, 1987, in the names of Marc S. Newkirk et al. and entitled "Novel Ceramic Materials and Methods for Making Same". This Patent discloses a method of producing self-supporting ceramic bodies grown as the oxidation reaction product of a molten parent precursor metal which is reacted with a vapor-phase oxidant to form an oxidation reaction product. Molten metal migrates through the formed oxidation reaction product to react with the oxidant thereby continuously developing a ceramic polycrystalline body which can, if desired, include an interconnected metallic component. The process may be enhanced by the use of one or more dopants alloyed with the parent metal. For example, in the case of oxidizing aluminum in air, it is desirable to alloy magnesium and silicon with the aluminum to produce alpha-alumina ceramic structures. This method was improved upon by the application of dopant materials to the surface of the parent metal, as described in Commonly Owned U.S. Pat. No. 4,853,352, which issued on Aug. 1, 1989, in the names of Marc S. Newkirk et al., and entitled "Methods of Making Self-Supporting Ceramic Materials", a European counterpart to which was published in the EPO on Jan. 22, 1986.

A novel method for producing a self-supporting ceramic composite by growing an oxidation reaction product form a parent metal into a permeable mass of filler is disclosed in commonly owned and copending U.S. patent application Ser. No. 08/007,387, filed Jan. 21, 1993, which is a continuation of U.S. application No. 07/811,895, filed Dec. 20, 1991, (now abandoned), which is a continuation of U.S. application Ser. No. 07/433,733, filed Nov. 30, 1989, (now abandoned) and entitled "Method of Making Composite Articles Having Embedded Filler", which is a continuation-in-part of commonly owned and copending U.S. patent application Ser. No. 07/415,180, filed Sep. 29, 1989, (now abandoned, however, U.S. Pat. No. 5,187,130, which issued Feb. 16, 1993, from U.S. application Ser. No. 07/659,473, is a continuation of U.S. application Ser. No. 07/415,180), which is a divisional U.S. Pat. No. 4,916,113, issued Apr. 10, 1990, and entitled "Methods of Making Composite Articles Having Embedded Filler" which is a continuation of U.S. Pat. No. 4,851,375, issued Jul. 25, 1989, and entitled "Composite Ceramic Articles and Methods of Making the Same" all in the names of Marc S. Newkirk, et al.

A method for producing ceramic composite bodies having a predetermined geometry or shape is disclosed in Commonly Owned U.S. Pat. No. 5,017,526, which issued May 21, 1991, from U.S. application Ser. No. 07/338,471, filed Apr. 14, 1989, which is a continuation of U.S. application Ser. No. 06/861,025, filed May 8, 1986, (now abandoned), both in the names of Marc S. Newkirk et al., a European counterpart to which was published in the EPO on Jan. 22, 1986. In accordance with the method in this U.S. patent application, the developing oxidation reaction product infiltrates a permeable preform of filler material in a direction towards a defined surface boundary. It was discovered that high fidelity is more readily achieved by providing the preform with a barrier means, as disclosed in Commonly Owned U.S. patent application Ser. No. 07/659,523, filed Feb. 22, 1991, (now abandoned), which is a continuation of U.S. patent application Ser. No. 07/295,488, (now abandoned) filed Jan. 10, 1989, which is a continuation of U.S. Pat. No. 4,923,832, which issued May 8, 1990, both in the names of Marc S. Newkirk et al., a European counterpart to which was published in the EPO on Nov. 11, 1987. This method produces shaped self-supporting ceramic bodies, including shaped ceramic composites, by growing the oxidation reaction product of a parent metal to a barrier means spaced from the metal for establishing a boundary or surface.

Ceramic composites having a cavity with an interior geometry inversely replicating the shape of a positive mold or pattern are disclosed in Commonly Owned U.S. Pat. No. 5,051,382, which issued Sep. 24, 1991, from U.S. patent application Ser. No. 07/329,794, filed Mar. 28, 1989, which is a divisional of U.S. Pat. No. 4,828,785, which issued May 9, 1989, both in the names of Marc S. Newkirk, et al., a European counterpart to which was published in the EPO on Sep. 2, 1987, and in U.S. Pat. No. 4,859,640, which issued on Aug. 22, 1989, a European counterpart to which was published in the EPO on Mar. 9, 1988.

The feeding of additional molten parent metal from a reservoir has been successfully utilized to produce thick ceramic matrix composite structures. Particularly, as disclosed in Commonly Owned U.S. Pat. No. 4,918,034, issued Apr. 17, 1990, which is a continuation-in-part of U.S. Pat. No. 4,900,699, issued Feb. 13, 1990, both in the names of Marc S. Newkirk et al., and entitled "Reservoir Feed Method of Making Ceramic Composite Structures and Structures Made Thereby", a European counterpart to which was published in the EPO on Mar. 30, 1988, the reservoir feed method has been successfully applied to form ceramic matrix composite structures. According to the method of this Newkirk et al. invention, the ceramic or ceramic composite body which is produced comprises a self-supporting ceramic composite structure which includes a ceramic matrix obtained by the oxidation reaction of a parent metal with an oxidant to form a polycrystalline material. In conducting the process, a body of the parent metal and a permeable filler are oriented relative to each other so that formation of the oxidation reaction product will occur in a direction toward and into the filler. The parent metal is described as being present as a first source and as a reservoir, the reservoir of metal communicating with the first source due to, for example, gravity flow. The first source of molten parent metal reacts with the oxidant to begin the formation of the oxidation reaction product. As the first source of molten parent metal is consumed, it is replenished, preferably by a continuous means, from the reservoir of parent metal as the oxidation reaction product continues to be produced and infiltrates the filler. Thus, the reservoir assures that ample parent metal will be available to continue the process until the oxidation reaction product has grown to a desired extent.

A method for tailoring the constituency of the metallic component of a ceramic matrix composite structure is disclosed in Copending and Commonly Owned U.S. Pat. No. 5,017,533, which issued on May 21, 1991, from U.S. application Ser. No. 07/389,506, filed on Aug. 2, 1989, which in turn is a continuation of U.S. patent application Ser. No. 06/908,454, filed Sep. 17, 1986 (and now abandoned), both of which are in the names of Marc S. Newkirk et al., and entitled "Method for In Situ Tailoring the Metallic Component of Ceramic Articles and Articles Made Thereby".

Moreover, U.S. Pat. No. 5,066,618, which issued Nov. 19, 1991, from U.S. application Ser. No. 07/269,152, filed Nov. 9, 1988, which is a continuation of U.S. Pat. No. 4,818,734, which issued Apr. 4, 1989 from U.S. patent application Ser. No. 07/152,518, filed Feb. 5, 1988, in the names of Robert C. Kantner et al., which was a continuation-in-part application of the above-mentioned Ser. No. 06/908,454, filed Sep. 17, 1986, having the same title and also being Commonly Owned. These Patents and the above-mentioned U.S. application Ser. No. 06/908,454, disclose methods for tailoring the constituency of the metallic component (both isolated and interconnected) of ceramic and ceramic matrix composite bodies during formation thereof to impart one or more desirable characteristics to the resulting body. Thus, desired performance characteristics for the ceramic or ceramic composite body are advantageously achieved by incorporating the desired metallic component in situ, rather than from an extrinsic source, or by post-forming techniques.

As discussed in these Commonly Owned Ceramic Matrix Patent Applications and Patents, novel polycrystalline ceramic materials or polycrystalline ceramic composite materials are produced by the oxidation reaction between a parent metal and an oxidant (e.g., a solid, liquid and/or a gas). In accordance with the generic process disclosed in these Commonly Owned Ceramic Matrix Patent Applications and Patents, a parent metal (e.g., aluminum, silicon) is heated to an elevated temperature above its melting point but below the melting point of the oxidation reaction product (e.g., aluminum oxide, aluminum nitride, silicon nitride, etc.) to form a body of molten parent metal which reacts upon contact with an oxidant (e.g., an oxygen containing atmosphere, a nitrogenous atmosphere, etc.) to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional fresh oxidation reaction product when contacted with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. Oxidation is used in its broad sense in all of the Commonly Owned Ceramic Matrix Patent Applications and Patents and in this application, and refers to the loss or sharing of electrons by a metal to an oxidant which may be one or more elements and/or compounds. Accordingly, elements other than oxygen may serve as an oxidant.

In certain cases, the parent metal may require the presence of one or more dopants in order to influence favorably or to facilitate growth of the oxidation reaction product. Such dopants may at least partially alloy with the parent metal at some point during or prior to growth of the oxidation reaction product. For example, in the case of aluminum as the parent metal and nitrogen as the oxidant, dopants such as strontium, silicon, nickel and magnesium, to name but a few of a larger class of dopant materials, can be alloyed with aluminum, and the created growth alloy is utilized as the parent metal. The resulting oxidation reaction product of such a growth alloy, in the case of using nitrogen as an oxidant, comprises aluminum nitride.

Novel ceramic composite structures and methods of making the same are also disclosed and claimed in certain of the aforesaid Commonly Owned Ceramic Matrix Patent Applications and Patents which utilize the oxidation reaction to produce ceramic composite structures comprising a substantially inert filler (note: in some cases it may be desirable to use a reactive filler, e.g., a filler which is at least partially reactive with the advancing oxidation reaction product and/or parent metal) infiltrated by the polycrystalline ceramic matrix. A parent metal is positioned adjacent to a mass of permeable filler (or a preform) which can be shaped and treated to be self-supporting, and is then heated to form a body of molten parent metal which is reacted with an oxidant, as described above, to form an oxidation reaction product. As the oxidation reaction product grows and infiltrates the adjacent filler material, molten parent metal is drawn through previously formed oxidation reaction product within the mass of filler and reacts with the oxidant to form additional fresh oxidation reaction product at the surface of the previously formed oxidation reaction product, as described above. The resulting growth of oxidation reaction product infiltrates or embeds the filler and results in the formation of a ceramic composite structure of a polycrystalline ceramic matrix embedding the filler. As also discussed above, the filler (or preform) may utilize a barrier means to establish a boundary or surface for the ceramic composite structure.

Novel processing techniques, and the novel bodies which are produced thereby, are disclosed in Commonly Owned U.S. Pat. No. 5,215,666, which issued Jun. 1, 1993, from U.S. application Ser. No. 07/902,515, which is a continuation of U.S. application Ser. No. 07/763,476, filed Sep. 20, 1991, (now abandoned), which is a continuation of U.S. application Ser. No. 07/414,198, filed on Sep. 28, 1989, (now abandoned), which in turn is a continuation of U.S. Pat. No. 4,874,569, which issued on Oct. 17, 1989, both of which are in the names of Jack A. Kuszyk et al., and are entitled "Ceramic Composite and Methods of Making The Same." This patent and patent application disclose the importance of utilizing an aluminium parent metal alloy containing at least about 1 weight percent zinc for the formation of ceramic composite bodies which are used as refractory bodies.

Thus, the aforesaid Commonly Owned Ceramic Matrix Patent Applications and Patents describe the production of oxidation reaction products which are readily grown to desired sizes and thicknesses heretofore believed to be difficult, if not impossible, to achieve with conventional ceramic processing techniques.

The entire disclosures of all of the above-discussed commonly owned metal matrix and ceramic matrix patent applications and patents are expressly incorporated herein by reference.

SUMMARY OF THE INVENTION

A metallic constituent of a composite body can be at least partially, or substantially completely, removed by causing at least one metallic component of the metallic constituent to spontaneously infiltrate an adjacent permeable mass of filler material or a preform. To achieve such spontaneous infiltration, at least a portion of the permeable mass is placed into contact with at least a portion of the metallic constituent contained within the composite body. Thus, at least a portion of the metallic constituent should be at least partially accessible, or can be made to be at least partially accessible, from at least one surface of the composite body.

Specifically, an infiltration enhancer and/or an infiltration enhancer precursor and/or an infiltrating atmosphere are in communication with the filler material or preform, at least at some point during the process, which permits the at least one metallic component of the metallic constituent of a composite body, when made molten, to spontaneously infiltrate at least a portion of the contacted filler material or preform In a first preferred embodiment, a precursor to an infiltration enhancer may be supplied to at least one of, a portion of at least one surface of the composite body, and/or diffused into at least a portion of the metallic constituent of the composite body, and/or mixed into at least a portion of the filler material or preform which is placed into contact with at least a portion of the composite body, and/or contained in an infiltrating atmosphere. The supplied infiltration enhancer precursor may thereafter react with at least one of a component in the filler material or preform, and/or at least one metallic component in the metallic constituent of the composite body, and/or the infiltrating atmosphere, thereby producing infiltration enhancer in at least a portion of, or on at least a portion of, the filler material or preform, which in turn is in contact with at least a portion of at least one surface of the composite body. Ultimately, at least during the spontaneous infiltration, infiltration enhancer should be in contact with at least a portion of the filler material or preform.

In another preferred embodiment of the invention, rather than supplying an infiltration enhancer precursor, an infiltration enhancer may be supplied directly to at least one of the filler material or preform, and/or metallic constituent of the composite body, and/or infiltrating atmosphere. Ultimately, at least during the spontaneous infiltration, the infiltration enhancer should be in contact with at least a portion of the filler material or preform which, in turn, is in contact with at least a portion of the surface of the composite body.

In any of the above-discussed preferred embodiments, the presence of infiltration enhancer and/or infiltration enhancer precursor in or on at least a portion of the filler material or preform may cause at least one metallic component of the metallic constituent, or substantially all of the metallic constituent of the composite body, to spontaneously infiltrate at least a portion of the filler material or preform. The amount of or selected portion of metallic constituent which is caused to spontaneously infiltrate the filler material or preform can be controlled to achieve desirable metal removal. Specifically, substantially all metallic constituent located in a certain area within a composite body (e.g., located near a surface of the composite body) may be completely removed from that selected area thereby leaving other areas of metallic constituent within the composite body substantially undisturbed. Moreover, if the metallic constituent is substantially interconnected throughout the composite body, substantially all of the metallic constituent could be removed. The volumetric amount of metallic constituent to be removed from the composite body depends upon the ultimate application for the composite body. Thus, the present invention may be utilized merely as a surface modification process for composite products, or it could be used to remove substantially all of a metallic constituent from composite products.

Still further, selected portions of the metallic constituent could be separately removed, leaving behind substantially undisturbed residual metallic constituent. Specifically, one or more metallic components of a multi-phase metallic constituent could be removed from selected areas of a composite body or could be removed substantially uniformly from the composite body, depending upon the ultimate application for the composite body. Such selected removal of one or more metallic components of a multi-phase metallic constituent could occur, for example, due to operating at a temperature range within which only said one or more metallic components were molten and thus were the only components that were involved in the spontaneous infiltration (i.e., metal removal process). However, for example, if the temperature was increased to a range within which all components of the multi-phase metallic constituent were rendered molten, then the entire multi-phase metallic constituent may be removable from the composite body. Selective removal of at least one component from the multi-phase metallic constituent could provide for a grading, either slight or substantial, of the microstructure of a composite body, thus resulting in graded properties of the composite body.

In another preferred embodiment for removing at least one metallic component of a metallic constituent from at least a portion of a composite body, the composite body may be substantially completely surrounded by and contacted with a filler material or preform. In this embodiment, spontaneous infiltration of the filler material or preform by at least a portion, or substantially all, of the metallic constituent could be achieved from substantially all surfaces of the composite body, so long as the metallic constituent is at least partially accessible, or could be made to be at least partially accessible, from such surfaces.

In another preferred embodiment for removing at least one metallic component of a metallic constituent from a composite body, only a portion of the composite body may be contacted with a permeable mass of filler material or preform. In this preferred embodiment, at least one metallic component of the metallic constituent could be selectively removed from that surface which is in contact with the permeable mass. In this preferred embodiment, a grading of the properties of the composite body may be achieved by varying the volume percent of metallic constituent present from, for example, one side of the composite body to an opposite side of the composite body. Thus, this grading of volume percent of metallic constituent within a composite body could permit the composite body to be utilized for a number of different conventional applications. Still further, by contacting only a portion of a composite body with a filler material or preform, any surface irregularities which may result from the removal of metallic constituent from a composite body can be substantially confined to that portion of the composite body which contacts the filler material or preform.

In another preferred embodiment, the amount of infiltration enhancer and/or infiltration enhancer precursor which is supplied to, for example, the filler material or preform, can be varied from one point in the filler material or preform to another point. Specifically, the amount of spontaneous infiltration of at least one metallic component of the metallic constituent in the composite body into an adjacent filler material or preform may be controlled by controlling the amount of infiltration enhancer and/or infiltration enhancer precursor provided in the filler material or preform. Thus, for example, by supplying a greater amount of infiltration enhancer precursor and/or infiltration enhancer to one side of a composite body relative to a different side of a composite body, the rate and/or amount of spontaneous infiltration of at least one metallic component of the metallic constituent in the composite body can be selectively controlled. Likewise, by controlling the type, pressure, location, etc. of infiltrating atmosphere supplied to, for example, different portions of the filler material or preform which are in contact with the metallic constituent of the composite body, the amount of spontaneous infiltration and/or rate of spontaneous infiltration can also be selectively controlled. Similarly, metal-removal can also be controlled by exposing composite bodies to static or non-flowing atmospheres, or by exposing composite bodies to flowing atmospheres. For example, the amounts of metal removal may differ when static atmospheres are utilized in contrast to utilization of flowing atmospheres. Still further, by controlling the temperature of different portions of the filler material or preform and/or composite body, the amount of spontaneous infiltration can also be selectively controlled.

In some situations, it is possible to predetermine the amount of infiltration enhancer and/or infiltration enhancer precursor which may be required to be present in a metallic constituent of a ceramic reinforced metal composite body or in a metal reinforced ceramic composite body. Accordingly, a composite body can be manufactured so as to contain a requisite amount of infiltration enhancer and/or infiltration enhancer precursor.

This application discloses specific examples directed to aluminum metal components of metallic constituent contained within aluminum reinforced ceramic composite bodies and ceramic reinforced aluminum composite bodies. However, it should be understood that virtually any metallic component of a metallic constituent contained within a composite body can be at least partially, or substantially completely, removed from the composite body, so long as the mechanisms of the present invention are followed. Thus, even though this application focuses primarily upon aluminum metallic components of metallic constituents contained within composite bodies, it should be understood that any metallic component contained within any composite body, whether the composite body comprises a two-phase composite body or, for example, comprises a ten-phase composite body, the metallic component of multi-phase bodies may behave in a similar manner to those metallic components disclosed in the Examples herein.

Also of interest in this disclosure is the removal of aluminum metal component(s) of metallic constituent(s) contained within fiber reinforced ceramic composite bodies, wherein the fiber reinforcement is coated by a plurality (e.g., two or more) of superimposed coatings thereon. Specifically, fiber reinforcements comprising silicon carbide, silicon carbide-based materials, carbon, alumina and alumina-based materials, can be coated by, for example, chemical vapor deposition or infiltration techniques. When such chemical vapor infiltration techniques are utilized, desirable coating combinations for silicon carbide and silicon carbide-based materials include boron nitride/silicon carbide or titanium carbide/silicon nitride or carbon/silicon carbide. When the fiber reinforcement comprises carbon fibers, desirable coating combinations include carbon/silicon carbide. Additionally, when the fiber reinforcement comprises an alumina or aluminum-based fiber, desirable coating combination include iridium/silicon carbide or niobium/silicon carbide, platinum/silicon carbide or platinum/boron nitride/silicon carbide.

Further, when the above-discussed fiber reinforcements are utilized as reinforcements in ceramic composite bodies made by the directed oxidation of a parent metal and the resultant bodies are subjected to metal removal techniques of the invention, very desirable bodies can be manufactured.

DEFINITIONS

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major chemical constituent.

"Balance Non-Oxidizing Gas", as used herein, means that any gas present in addition to the primary gas comprising the infiltrating atmosphere, is either an inert gas or a reducing gas which is substantially non-reactive with the metallic constituent under the process conditions. Any oxidizing gas which may be present as an impurity in the gas(es) used should be insufficient to oxidize the metallic constituent to any substantial extent under the process conditions.

"Barrier" or "barrier means", as used herein, means any suitable means which interferes, inhibits, prevents or terminates the migration, movement, or the like, of molten metallic constituent or at least a metal component of metallic constituent beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" includes materials which are substantially non-wettable by the migrating molten metallic constituent or at least a migrating molten component of the metallic constituent under the process conditions employed. A barrier of this type appears to exhibit substantially little or no affinity for the molten metallic constituent or at least a molten component of the metallic constituent, and movement beyond the defined surface boundary of the mass of filler material or preform is prevented or inhibited by the barrier means. The barrier may in certain cases be permeable or porous, or rendered permeable by, for example, drilling holes or puncturing the barrier, to permit a gaseous atmosphere to contact the molten matrix metal, etc.

"Ceramic", as used herein, should not be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents (isolated and/or interconnected, depending on the processing conditions used to form the body) derived from the parent metal, or reduced from the oxidant or a dopant, most typically within a range of from about 1–40 percent by volume, but may include still more metal.

"Ceramic Matrix Composite" or "CMC" or "Ceramic Composite Body", as used herein, means a material comprising a two- or three-dimensionally interconnected ceramic which has embedded a preform or filler material, and may further include a metallic constituent embedded therein, possibly in a two- or three-dimensionally interconnected network. The ceramic may include various dopant elements to provide a specifically desired microstructure, or specifically desired mechanical, physical, or chemical properties in the resulting composite.

"Dopants", as used herein, means materials (parent metal constituents or constituents combined with and-/or included in or on a filler, or combined with the oxidant) which, when used in combination with the parent metal, favorably influence or promote the oxidation reaction process and/or modify the growth process to alter the microstructure and/or properties of the product. While not wishing to be bound by any particular theory or explanation of the function of dopants, it appears that some dopants are useful in promoting oxidation reaction product formation in cases where appropriate surface energy relationships between the parent metal and its oxidation reaction product do not intrinsically exist so as to promote such formation. Dopants may be added to the filler material, they may be in the form of a gas, solid, or liquid under the process conditions, they may be included as constituents of the parent metal, or they may be added to any one of the constituents involved in the formation of the oxidation reaction product. Dopants may: (1) create favorable surface energy relationships which enhance or induce the wetting of the oxidation reaction product by the molten parent metal; and/or (2) form a "precursor layer" at the growth surface by reaction with alloy, oxidant, and/or filler, that (a) minimizes formation of a protective and coherent oxidation reaction product layer(s), (b) may enhance oxidant solubility (and thus permeability) in molten metal, and/or (c) allows for transport of oxidant from the oxidizing atmosphere through any precursor oxide layer to combine subsequently with the molten metal to form another oxidation reaction product; and/or (3) cause microstructural modifications of the oxidation reaction product as it is formed or subsequently and/or alter the metallic constituent composition and properties of such oxidation reaction product; and/or (4) enhance growth nucleation and uniformity of growth of oxidation reaction product.

"Filler", as used herein in conjunction with ceramic matrix composite bodies, means either single constituents or mixtures of constituents which are substantially non-reactive with and/or of limited solubility in the metallic constituent and may be single or multi-phase. Fillers may be provided in a wide variety of forms and sizes, such as powders, flakes, platelets, microspheres, whiskers, bubbles, etc., and may be either dense or porous. "Filler" may also include ceramic fillers, such as alumina or silicon carbide, as fibers, chopped fibers, particulates, whiskers, bubbles, spheres, fi bet mats, or the like, and ceramic-coated fillers such as carbon fibers coated with alumina or silicon carbide to protect the carbon from attack, for example, by a molten aluminum metal. Fillers may also include certain materials having a plurality of superimposed coatings thereon to achieve, for example, improved mechanical properties such as fracture toughness, etc. Examples of such materials include silicon carbide or silicon carbide based fibers coated with boron nitride (BN)/silicon carbide (SiC) or titanium carbide (TiC)/silicon nitride ($Si_3N_4$) or carbon (C)/silicon carbide (SiC); carbon fiber coated with carbon (C)/silicon carbide; and alumina or alumina-based fibers coated with iridium (Ir)/silicon carbide (SiC) or niobium (Nb)/silicon carbide (SiC) or platinum (Pt)/silicon carbide (SiC) or platinum (Pt)/boron nitride (BN)/silicon carbide (SiC). Fillers may also include metals.

"Filler", as used herein in conjunction with metal matrix composite bodies and/or metal removal from composite bodies, is intended to include either single constituents or mixtures of constituents which are substantially non-reactive with and/or of limited solubility in the matrix metal and may be single or multi-phase. Fillers may be provided in a wide variety of forms, such as powders, flakes, platelets, microspheres, whiskers, bubbles, fibers, particulates, fiber mats, chopped fibers, spheres, pellets, tubules, refractory cloth, etc., and may be either dense or porous. "Filler" may also include ceramic fillers, such as alumina or silicon carbide, as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum matrix metal. Fillers may also include metals.

"Infiltrating Atmosphere", as used herein, means that atmosphere which is present which interacts with at least one metallic component in the metallic constituent and/or preform (or filler material) and/or infiltration enhancer precursor and/or infiltration enhancer and permits or enhances spontaneous infiltration of at least a portion of the metallic constituent to occur.

"Infiltration Enhancer", as used herein, means a material which promotes or assists in the spontaneous infiltration of at least a portion of a metallic constituent into a filler material or preform. An infiltration enhancer may be formed from, for example, (1) a reaction of an infiltration enhancer precursor with an infiltrating atmosphere to form a gaseous species and/or (2) a reaction product of the infiltration enhancer precursor and the infiltrating atmosphere and/or (3) a reaction product of the infiltration enhancer precursor and the filler material or preform and/or (4) a reaction product of the infiltration enhancer precursor and the matrix metal. Moreover, the infiltration enhancer may be supplied directly to at least one of the filler material or preform of filler material, and/or metallic constituent, and/or infiltrating atmosphere and function in a substantially similar manner to an infiltration enhancer which has formed as a reaction between an infiltration enhancer precursor and another species. Ultimately, at least during the spontaneous infiltration, the infiltration enhancer should be located in at least a portion of, or on, the filler material or preform of filler material to achieve spontaneous infiltration.

"Infiltration Enhancer Precursor" or "Precursor to the Infiltration Enhancer", as used herein, means a material which when used in combination with the metallic constituent or at least a metal component of the metallic constituent, and/or preform and/or infiltrating atmosphere forms an infiltration enhancer which induces or assists the metallic constituent or at least a metal component of the metallic constituent to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or metallic constituent or at least a metal component of the metallic constituent. For example, in some metallic components or metallic constituents/infiltration enhancer precursor/infiltrating atmosphere systems, it is desirable for the infiltration enhancer precursor to volatilize at, near, or in some cases, even somewhat above the temperature at which at least a portion of the metallic constituent becomes molten. Such volatilization may lead to: (1) a reaction of the infiltration enhancer precursor with the infiltrating atmosphere to form a gaseous species which enhances wetting of the filler material or preform by the metallic constituent or at least a metal component of the metallic constituent; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting; and/or (4) a reaction of the infiltration enhancer precursor with the metallic constituent or at last a metal component of the metallic constituent which forms a solid, liquid or gaseous infiltration enhancer in at least a portion of the filler material or preform which enhances wetting.

"Matrix Metal" or "Matrix Metal Alloy", as used herein, means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Metallic Component or Metallic Constituent/Infiltration Enhancer Precursor/Infiltrating Atmosphere System" or "Spontaneous System", as used herein, refers to that combination of materials which exhibit spontaneous infiltration into a preform or filler material. It should be understood that whenever a "/" appears between an exemplary metallic component or metallic constituent, infiltration enhancer precursor and infiltrating atmosphere that the "/" is used to designate a system or combination of materials which, when combined in a particular manner, exhibits spontaneous infiltration into a preform or filler material.

"Metallic Component" or "Metal Component", as used herein, means a portion of or substantially all of the metallic constituent within a composite body which may be caused to spontaneously infiltrate a filler material or preform. For example, two metallic components of an aluminum/silicon metallic constituent would be aluminum and silicon.

"Metallic Constituent", as used herein, means any and all metallic components or phases contained within a composite body. When only one metal phase is present in a metallic constituent, reference to metallic component and metallic constituent means substantially the same thing. However, typically, reference to metallic constituent should be considered to be a general term for the combination of all metallic components and/or phases contained within a composite body.

"Metal Matrix Composite" or "MMC", as used herein, means a material comprising a two- or three-dimensionally interconnected alloy or metallic component or metallic constituent which has embedded a preform or filler material.

A Metal "Different" from the Metallic Constituent or Metallic Component means a metal which does not contain, as a primary component, the same metal as the metallic constituent or metallic component (e.g., if the primary component of the metallic component is aluminum, the "different" metal could have a primary component of, for example, nickel).

"Oxidant", as used herein, means one or more suitable electron acceptors or electron sharers and may be a solid, a liquid or a gas or some combination of these (e.g., a solid and a gas) at the oxidation reaction conditions. Typical oxidants include, without limitation, oxygen, nitrogen, any halogen or a combination thereof, sulphur, phosphorus, arsenic, carbon, boron, selenium, tellurium, and or compounds and combinations thereof, for example, silica or silicates (as sources of oxygen), methane, ethane, propane, acetylene, ethylene, propylene the hydrocarbon as a source of carbon), and mixtures such as air, $H_2/H_2O$ and $CO/CO_2$ (as sources of oxygen). The latter two (i.e., $H_2/H_2O$ and $CO/CO_2$) being useful in reducing the oxygen activity of the environment.

"Oxidation", as used herein means a chemical reaction in which an oxidant reacts with a parent metal, and that parent metal has given up electrons to or shared electrons with the oxidant.

"Oxidation Reaction Product", as used herein, means one or more metals in any oxidized state wherein the metal(s) has given up electrons to or shared electrons with another element, compound, or combination thereof. Accordingly, an "oxidation reaction product" under this definition includes the product of the reaction of one or more metals with one or more oxidants.

"Parent Metal", as used herein, means that metal(s) (e.g., aluminum, silicon, titanium, tin, zirconium, etc.) which is the precursor of a polycrystalline oxidation reaction product and includes that metal(s) as an essentially pure metal, a commercially available metal having impurities and/or alloying constituents therein, or an alloy in which that metal precursor is the major constituent. When a specified metal is mentioned as the parent or precursor metal (e.g., aluminum, etc.), the metal identified should be read with this definition in mind unless indicated otherwise by the context.

"Preform" or "Permeable Preform", as used herein, means a porous mass of filler or filler material which is manufactured with at least one surface boundary which may define a boundary for infiltration of metallic component or metallic constituent, such mass retaining sufficient shape integrity and green strength to provide dimensional fidelity prior to being infiltrated. The mass should be sufficiently porous to accommodate spontaneous infiltration of the metallic component or metallic constituent thereinto. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reactive Filler", as used herein in conjunction with metal matrix composite bodies, means that the filler interacts with molten matrix metal or molten metallic constituent, or at least one molten component of the metallic constituent (e.g., is reduced by the matrix metal).

"Spontaneous Infiltration", as used herein, means that the infiltration of metallic component or metallic constituent into the permeable mass of filler or preform occurs without the requirement for the application of pressure or vacuum (whether externally applied or internally created).

BRIEF DESCRIPTION OF THE FIGURES

The following Figures are provided to assist in understanding the invention, but are not intended to limit the scope of the invention. Similar reference numerals have been used wherever possible in each of the Figures to denote like components, wherein:

FIG. 7A is a photograph of the ceramic matrix composite body in Example 11 prior to metal removal.

FIG. 7B is a photograph of the ceramic matrix composite body in Example 11 after metal removal.

DETAILED DESCRIPTION OF THE INVENTION AND PREFERRED EMBODIMENTS

The present invention relates to removing at least a portion, or substantially all, of at least one metallic component of a metallic constituent from a multi-phase composite body (e.g., a ceramic reinforced metal composite body or a metal reinforced ceramic composite body) by spontaneously infiltrating at least a portion of an adjacent mass of filler material or preform with said at least one metallic component. Particularly, an infiltration enhancer and/or an infiltration enhancer precursor and/or an infiltrating atmosphere are in communication with the filler material or preform, at least at some point during the process, which permits said at least one metallic component of the metallic constituent in the composite body, when molten, to spontaneously infiltrate at least a portion of the adjacent filler material or preform.

Figure 1A:
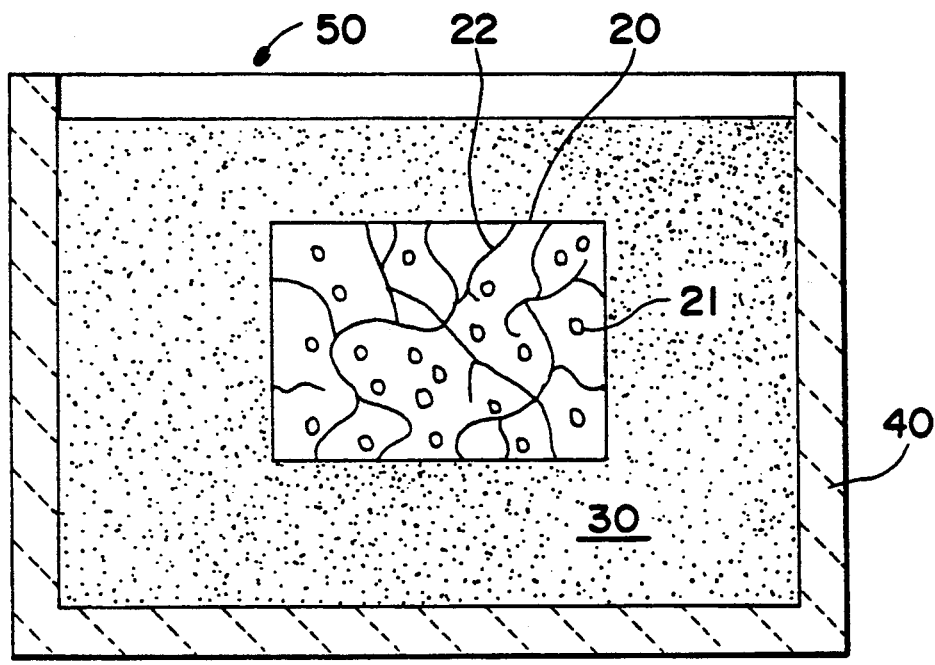
FIG. 1A is a schematic cross-sectional representation of a typical lay-up for removing at least one metallic component of a metallic constituent from substantially all surfaces of a composite body.

With reference to FIG. 1A, a composite body 20 contains ceramic particulate 21 and a metallic constituent 22. The composite body 20 is substantially completely buried within a filler material 30, which is contained within an appropriate refractory vessel 40. The filler material 30 may be any suitable material, as discussed in greater detail below, which is capable of being spontaneously infiltrated by at least one metallic component of the metallic constituent 22. An infiltrating atmosphere 50 may be provided such that it can permeate the filler material 30 and contact at least a portion of the composite body 20. The refractory container 40, and its contents, may be placed into a controlled atmosphere furnace to initiate spontaneous infiltration of at least one metallic component of the metallic constituent 22 into at least a portion of the filler material 30. In this embodiment, spontaneous infiltration of said at least one metallic component of the metallic constituent 22 may be expected to occur from substantially all surfaces of the composite body 20. Spontaneous infiltration can occur until substantially all of the metallic component of the metallic constituent has spontaneously infiltrated the filler material, assuming that the metallic component is substantially interconnected throughout the composite body, or the spontaneous infiltration can be terminated by altering at least one of the process conditions needed to achieve spontaneous infiltration.

Figure 1B:
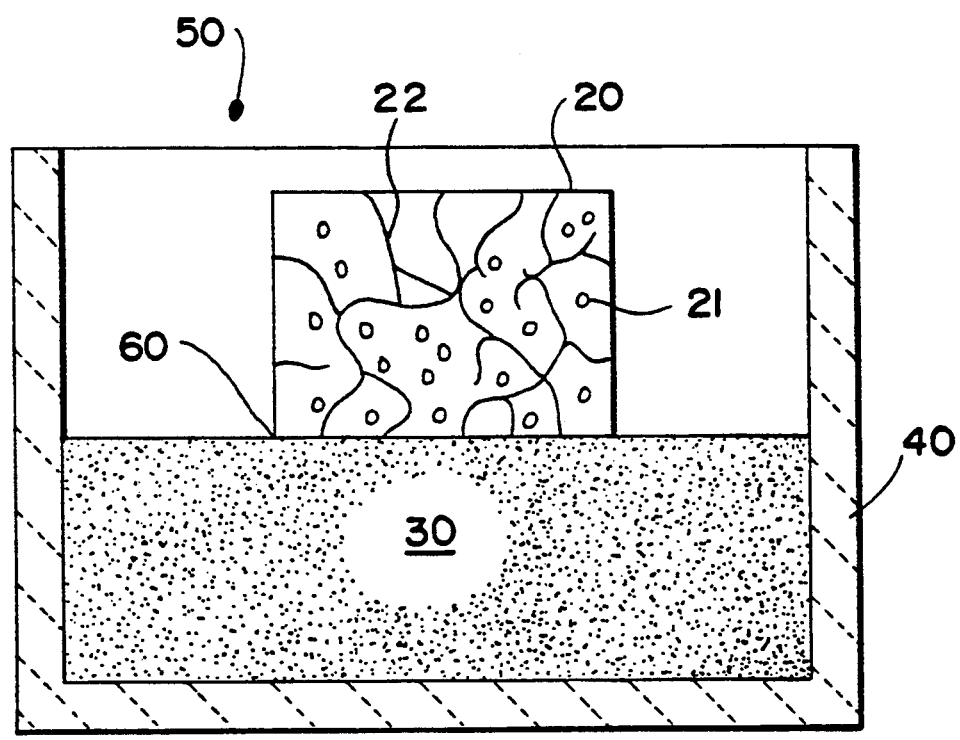
FIG. 1B is a schematic cross-sectional representation of a typical lay-up for selectively removing at least one metallic component of a metallic constituent from a portion of a composite body.

FIG. 1B shows a lay-up similar to that shown in FIG. 1A, however, rather than surrounding completely the composite body 20 with filler material 30, the composite body 20 is placed into limited contact with the filler material 30. In this embodiment, selective removal of at least one metallic component of the metallic constituent 22 from the composite body 20 could be expected to occur at the surface 60, which is an interface between the composite body 20 and the filler material 30. A similar embodiment to that embodiment shown in FIG. 1B would be to surround the composite body 20 with filler material 30 in an amount which was intermediate between the amounts which are shown in FIG. 1A and FIG. 1B.

Figure 2:
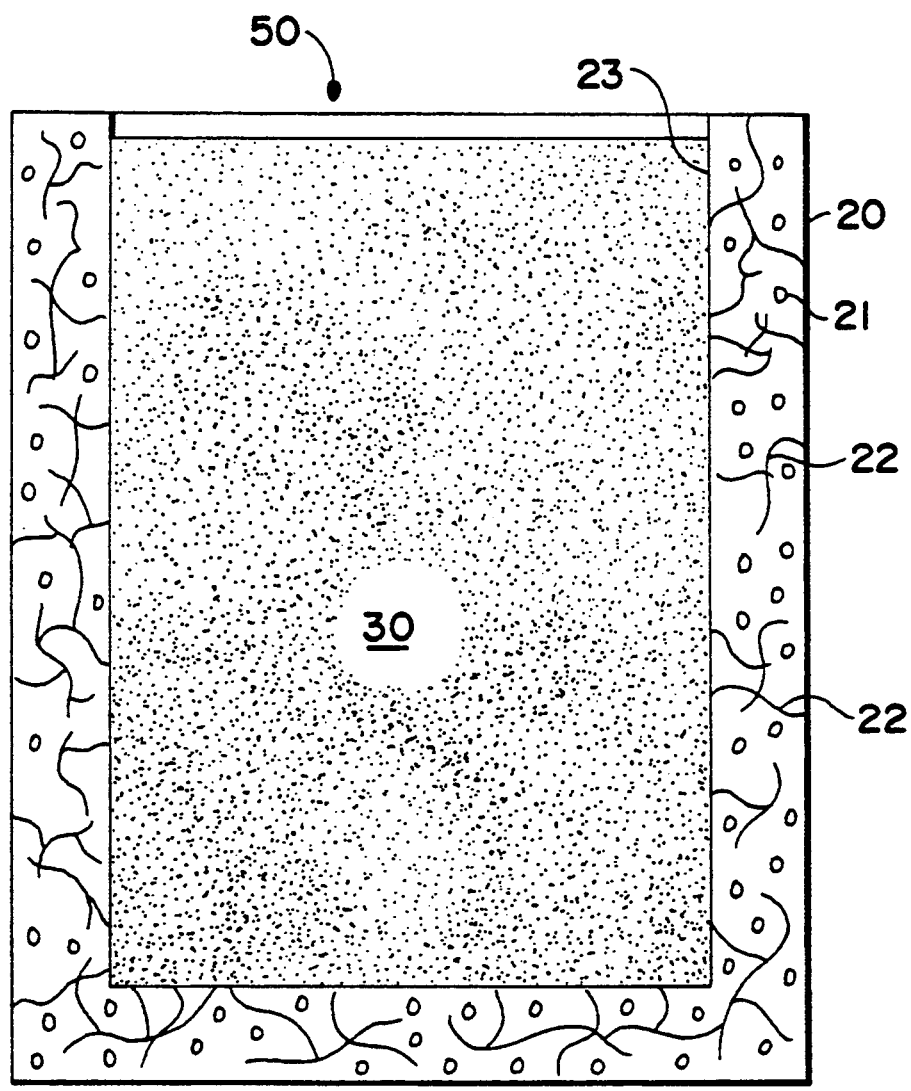
FIG. 2 is a schematic cross-sectional representation of a typical lay-up for selectively removing at least one metallic component of a metallic constituent from an interior cavity of a composite body.

Another embodiment of the invention is shown in FIG. 2. In this embodiment, a filler material 30 is placed into at least a portion of a cavity 23 contained within a composite body 20. In this embodiment, at least one metallic component of a metallic constituent 22 of the composite body 20 can be expected to spontaneously infiltrate the filler material 30, thereby providing for a selected or directed removal of said at least one metallic component of the metallic constituent 22 from the composite body 20 into substantially only the filler material 30 located within the cavity 23. If necessary, the composite body 20 could be contained within any appropriate refractory vessel during the processing thereof.

It is noted that in each of the Figures, crude representation of the metallic constituent 22 and ceramic particulate 21 have been made. It is to be understood that the metallic constituent 22 or at least one metallic component of the metallic constituent 22 could be connected in only a limited amount or could be highly interconnected. Moreover, the number and volume percent of phases present in the composite body, the chemical constituency of the phases, the size and shape of the phase(s), could vary widely. The Figures are provided only to give a general understanding of the invention and should not be construed in any manner as limiting the scope of the invention.

Without wishing to be bound by any particular theory or explanation, when an infiltration enhancer precursor is utilized in combination with at least one of the metallic constituent or at least one metallic component of the metallic constituent, and/or filler material or preform and/or infiltrating atmosphere, the infiltration enhancer precursor may react to form an infiltration enhancer which induces or assists at least one molten metallic component of the metallic constituent to spontaneously infiltrate a filler material or preform. Moreover, it appears as though it may be necessary for the precursor to the infiltration enhancer to be capable of being positioned, located or transportable to a location which permits the infiltration enhancer precursor to interact with at least one of the infiltrating atmosphere, and/or the preform or filler material, and/or molten metallic component or metallic constituent. For example, in some metallic component or metallic constituent/infiltration enhancer precursor/infiltrating atmosphere systems, it is desirable for the infiltration enhancer precursor to volatilize at, near, or in some cases, even somewhat above the temperature at which at least one metallic component of the metallic constituent becomes molten. Such volatilization may lead to: (1) a reaction of the infiltration enhancer precursor with the infiltrating atmosphere to form a gaseous species which enhances wetting of the filler material or preform by the metallic component or metallic constituent; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting; and/or (4) a reaction of the infiltration enhancer precursor with the molten metallic constituent or the molten metallic component to form a solid, liquid or gaseous infiltration enhancer in at least a portion of the filler material or preform which enhances wetting.

Thus, for example, if an infiltration enhancer precursor was included or combined with, at least at some point during the process, molten metallic component or metallic constituent, it is possible that the infiltration enhancer precursor could volatilize from the molten metallic component or molten metallic constituent and react with at least one component in the filler material or preform and/or the infiltrating atmosphere. Such reaction could result in the formation of a solid species, if such solid species was stable at the infiltration temperature, said solid species being capable of being deposited on at least a portion of the filler material or preform as, for example, a coating. Moreover, it is conceivable that such solid species could be present as a discernable solid within at least a portion of the preform or filler material. If such a solid species was formed, the molten metal may have a tendency to react (e.g., the molten metallic component or metallic constituent may chemically reduce the formed solid species) such that infiltration enhancer precursor may become associated with (e.g., dissolved in or alloyed with) the molten metal. Accordingly, additional infiltration enhancer precursor may then be available to volatilize and react with another species (e.g., the filler material or preform and/or infiltrating atmosphere) and again form a similar solid species. It is conceivable that a continuous process of conversion of infiltration enhancer precursor to infiltration enhancer followed by a reduction reaction of the infiltration enhancer with molten metal to again form additional infiltration enhancer, and so on, could occur, until the result achieved is a desirable removal of metallic component or metallic constituent from the composite body.

In order to effect spontaneous infiltration of the metallic component or metallic constituent into the filler material or preform, an infiltration enhancer should be provided to the spontaneous system. An infiltration enhancer could be formed from an infiltration enhancer precursor which could be provided (1) in the metallic constituent or in at least one metallic component of the metallic constituent; and/or (2) in the filler material or preform; and/or (3) from the infiltrating atmosphere; and/or (4) from an external source into the spontaneous system. Moreover, rather than supplying an infiltration enhancer precursor, an infiltration enhancer may be supplied directly to at least one of the filler material or preform, and/or metallic constituent or at least one metallic component of metallic constituent, and/or infiltrating atmosphere. Ultimately, at least during the spontaneous infiltration, the infiltration enhancer should be located in at least a portion of the filler material or preform.

In a preferred embodiment of the invention, it is possible that the infiltration enhancer precursor can be at least partially reacted with the infiltrating atmosphere such that the infiltration enhancer can be formed in at least a portion of the filler material or preform prior to or substantially contiguous with contacting the filler material or preform with at least a portion of the metallic constituent or at least one metallic component of the metallic constituent (e.g., if magnesium was the infiltration enhancer precursor and nitrogen was the infiltrating atmosphere, the infiltration enhancer could be a magnesium nitride which would be located in at least a portion of the preform or filler material).

An example of a metallic component or metallic constituent/infiltration enhancer precursor/infiltrating atmosphere system is the aluminum/magnesium/nitrogen system. Specifically, if an aluminum metal comprised the metallic component or metallic constituent and the aluminum metal was rendered molten, a filler material or preform could thereafter be contacted with molten aluminum metal and be spontaneously infiltrated.

Moreover, rather than supplying an infiltration enhancer precursor, an infiltration enhancer may be supplied directly to at least one of the preform or filler material, and/or metallic component or metallic constituent, and/or infiltrating atmosphere. Ultimately, at least during the spontaneous infiltration, the infiltration enhancer should be located in at least a portion of the filler material or preform.

Under the conditions employed in the method of the present invention, in the case of an aluminum metallic component/magnesium/nitrogen spontaneous infiltration system, the preform or filler material should be sufficiently permeable to permit the nitrogen-containing gas to penetrate or permeate the filler material or preform at some point during the process and/or contact the molten aluminum metallic component. Moreover, the permeable filler material or preform can accommodate infiltration of the molten aluminum metallic component, thereby causing the nitrogen-permeated preform to be infiltrated spontaneously with molten aluminum metallic component from the composite body and/or cause the nitrogen to react with an infiltration enhancer precursor to form infiltration enhancer in the filler material or preform and thereby result in spontaneous infiltration. The extent of spontaneous infiltration and depletion of aluminum metallic component from the composite body will vary with a given set of process conditions, including magnesium content of the aluminum, magnesium content of the preform or filler material, amount of magnesium nitride in the preform or filler material, the presence of additional alloying elements (e.g., silicon, iron, copper, manganese, chromium, zinc, and the like), average size of the filler material (e.g., particle diameter) or average size of the filler material comprising the preform, surface condition (e.g., impurities) and type of filler material or preform, nitrogen concentration of the infiltrating atmosphere, time permitted for infiltration and temperature at which infiltration occurs.

Thus, a metallic constituent of a composite body can be at least partially, or substantially completely, removed by causing at least one metallic component of the metallic constituent to spontaneously infiltrate a permeable mass of filler material or a preform. To achieve such spontaneous infiltration, at least a portion of the permeable mass is placed into contact with at least a portion of the metallic constituent contained within the composite body. Thus, at least a portion of the metallic constituent should be at least partially accessible, or can be made to be at least partially accessible, from at least one surface of the composite body.

Specifically, an infiltration enhancer and/or an infiltration enhancer precursor and/or an infiltrating atmosphere are in communication with the filler material or preform, at least at some point during the process, which permits the at least one metallic component of the metallic constituent of a composite body, when made molten, to spontaneously infiltrate at least a portion of the filler material or preform. In a first preferred embodiment, a precursor to an infiltration enhancer may be supplied to at least one of, a portion of at least one surface of the composite body, and/or diffused into at least a portion of at least one metallic component or at least a portion of the metallic constituent of the composite body, and/or mixed into at least a portion of the filler material or preform which is placed into contact with at least a portion of the composite body, and/or contained in an infiltrating atmosphere. The supplied infiltration enhancer precursor may thereafter react with at least one of the filler material or preform, and/or at least one metallic component in the metallic constituent of the composite body, and/or the infiltrating atmosphere, thereby producing infiltration enhancer in at least a portion of, or on at least a portion of, the filler material or preform, which in turn is in contact with at least a portion of at least one surface of the composite body. Ultimately, at least during the spontaneous infiltration, infiltration enhancer should be in contact with at least a portion of the filler material or preform.

In another preferred embodiment of the invention, rather than supplying an infiltration enhancer precursor, an infiltration enhancer may be supplied directly to at least one of the filler material or preform, and/or metallic constituent of the composite body or at least one metallic component of the metallic constituent of the composite body, and/or infiltrating atmosphere. Ultimately, at least during the spontaneous infiltration, the infiltration enhancer should be in contact with at least a portion of the filler material or preform which, in turn, is in contact with at least a portion of the surface of the composite body.

In any of the above-discussed preferred embodiments, the presence of infiltration enhancer and/or infiltration enhancer precursor in at least a portion of the filler material or preform may cause at least one metallic component of the metallic constituent, or substantially all of the metallic constituent, of the composite body to spontaneously infiltrate at least a portion of the filler material or preform. The amount of or selected portion of metallic constituent which is caused to spontaneously infiltrate the filler material or preform can be controlled to achieve desirable metal removal. Specifically, substantially all metallic constituent located in a certain area within a composite body (e.g., located near a surface of the composite body) may be completely removed from that selected area thereby leaving other areas of metallic constituent within the composite body substantially undisturbed. Moreover, if the metallic constituent is substantially interconnected throughout the composite body, substantially all of the metallic constituent could be removed. The volumetric amount of metallic constituent to be removed from the composite body depends upon the ultimate application for the composite body. Thus, the present invention may be utilized merely as a surface modification process for composite products, or it could be used to remove substantially all of a metallic constituent from a composite product.

Still further, selected portions of the metallic constituent could be separately removed, leaving behind substantially undisturbed residual metallic constituent. Specifically, one or more metallic components of a multi-phase metallic constituent could be removed from selected areas of a composite body or could be removed substantially uniformly from the composite body, depending upon the ultimate application for the composite body. Such selected removal of one or more metallic components of a multi-phase metallic constituent could occur, for example, due to operating at a temperature range within which only said one or more metallic components were molten and thus were the only components that were involved in the spontaneous infiltration into the adjacent permeable mass. However, for example, if the temperature was increased to a range within which all components of the multi-phase metallic constituent were rendered molten, then the entire multi-phase metallic constituent may be removable from the composite body. Selective removal of at least one component from the multi-phase metallic constituent could provide for a grading, either slight or substantial, of the microstructure of a composite body, thus resulting in graded properties of the composite body.

In another preferred embodiment for removing at least one metallic component of a metallic constituent from at least a portion of a composite body, the composite body may be substantially completely surrounded by a filler material or preform. In this embodiment, spontaneous infiltration of the filler material or preform by at least a portion, or substantially all, of the metallic constituent could be achieved from substantially all surfaces of the composite body, so long as the metallic constituent is accessible, or could be made to be accessible, from such surfaces.

In another preferred embodiment for removing at least one metallic component of a metallic constituent from a composite body, only a portion of the composite body may be contacted with a permeable mass of filler material or preform. In this preferred embodiment, at least one metallic component of the metallic constituent could be selectively removed from that surface which is in contact with the permeable mass. In this preferred embodiment, a grading of the properties of the composite body may be achieved by varying the volume percent of metallic constituent present from, for example, one side of the composite body to an opposite side of the composite body. Thus, this grading of volume percent of metallic constituent within a composite body could permit the composite body to be utilized for a number of different conventional applications. Still further, by contacting only a portion of a composite body with a filler material or preform, any surface irregularities which may result from the removal of metallic constituent from a composite body can be substantially confined to that portion of the composite body which contacts the filler material or preform.

In another preferred embodiment, the amount of infiltration enhancer and/or infiltration enhancer precursor which is supplied to, for example, the filler material or preform, can be varied from one point in the filler material or preform to another point. Specifically, the amount of spontaneous infiltration of at least one metallic component of the metallic constituent in the composite body into an adjacent filler material or preform may be controlled by controlling the amount of infiltration enhancer and/or infiltration enhancer precursor provided in the filler material or preform. Thus, for example, by supplying a greater amount of infiltration enhancer precursor and/or infiltration enhancer to one side of a composite body relative to a different side of a composite body, the rate and/or amount of spontaneous infiltration of at least one metallic component of the metallic constituent in the composite body can be selectively controlled. Likewise, by controlling the amount of infiltrating atmosphere supplied to, for example, different portions of the filler material or preform which are in contact with the metallic constituent of the composite body, the amount of spontaneous infiltration and/or rate of spontaneous infiltration can also be selectively controlled. Still further, by controlling the temperature of different portions of the filler material or preform and/or composite body, the amount of spontaneous infiltration can also be selectively controlled.

For example, if the metallic constituent of a composite body comprises aluminum and, if the aluminum contained, or was caused to contain, by any suitable means, at least about 0.1 percent by weight, and preferably at least about 1–3 percent by weight, magnesium, based on alloy weight, the magnesium could function as the infiltration enhancer precursor and permit spontaneous infiltration to occur in the presence of, for example, a nitrogenous atmosphere. Additionally, auxiliary elements contained within, or exposed to the metallic constituent, may affect the minimum amount of magnesium required in the aluminum metal to result in spontaneous infiltration of the filler material or preform. Loss of magnesium from the spontaneous system due to, for example, volatilization should not occur to such an extent that no magnesium was present to form infiltration enhancer. Thus, it is desirable to utilize a sufficient amount of initial elements (e.g., magnesium) to assure that spontaneous infiltration will not be adversely affected by volatilization. Still further, the presence of magnesium in the preform (or filler material) and/or on at least a portion of a surface of the composite body, may result in a reduction or substantially complete elimination of the need for magnesium to be present in the metallic constituent to achieve spontaneous infiltration (discussed in greater detail later herein).

The volume percent of nitrogen in the infiltrating atmosphere also affects spontaneous infiltration rates. Specifically, if less than about 10 volume percent of nitrogen is present in the atmosphere, very slow or little spontaneous infiltration will occur. It has been discovered that it is preferable for at least about 50 volume percent of nitrogen to be present in the atmosphere, thereby resulting in, for example, shorter infiltration times due to a much more rapid rate of infiltration. The infiltrating atmosphere (e.g., a nitrogen-containing gas) can be supplied directly to the filler material or preform and/or aluminum metallic constituent, or it may be produced or result from a decomposition of a material.

The minimum magnesium content required in the aluminum/magnesium/nitrogen spontaneous system for the molten aluminum to infiltrate a filler material or preform depends on one or more variables such as the processing temperature, time, the presence of auxiliary alloying elements such as silicon or zinc, the nature of the filler material, the location of the magnesium in one or more components of the spontaneous system, the nitrogen content of the atmosphere, and the rate at which the nitrogen atmosphere flows. Lower temperatures or shorter heating times can be used to obtain spontaneous infiltration as the magnesium content of the aluminum metallic constituent and/or contained in the preform is increased. Also, for a given magnesium content, the addition of certain auxiliary alloying elements into a metallic constituent, such as zinc, permits the use of lower temperatures. For example, a magnesium content of the aluminum metallic constituent at the lower preferred end of the operable range, e.g., from about 1 to 3 weight percent, may be used in conjunction with at least one of the following: an above-minimum processing temperature, a high nitrogen concentration, or one or more auxiliary alloying elements. When no magnesium is added to the preform, aluminum metallic constituent containing, or exposed to, from about 3 to 5 weight percent magnesium are preferred on the basis of their general utility over a wide variety of process conditions, with at least about 5 percent being preferred when lower temperatures and shorter times are employed. Magnesium contents in excess of about 10 percent by weight of the aluminum metallic constituent may be employed to moderate the temperature conditions required for infiltration. The magnesium content may be reduced when used in conjunction with an auxiliary alloying element, but these elements serve an auxiliary function only and are used together with at least the above-specified minimum amount of magnesium. Thus, it is possible to determine the amount of, for example, magnesium which may be required to achieve spontaneous infiltration behavior in the aluminum/magnesium/nitrogen spontaneous system. Accordingly, a metallic constituent in a metal reinforced ceramic body or in a ceramic reinforced metal body can be manufactured so as to contain the required amount of magnesium.

It is also noted that it is possible to supply to the spontaneous system, infiltration enhancer precursor and/or infiltration enhancer on a surface of the composite body and/or on a surface of the preform or filler material and/or within the preform or filler material prior to infiltrating the metallic constituent or at least one metallic component of the metallic constituent into the filler material or preform (i.e., it may not be necessary for the supplied infiltration enhancer or infiltration enhancer precursor to be alloyed with the metallic constituent, but rather, simply be supplied to the spontaneous system). For example, in the aluminum/magnesium/nitrogen system, if the magnesium was applied to a surface of the composite body it may be preferred that the surface should be the surface which is closest to, or preferably in contact with, the permeable mass of filler material or vice versa; or such magnesium could be mixed into at least a portion of the preform or filler material. Still further, it is possible that some combination of surface application, alloying and/or placement of magnesium into at least a portion of the filler material or preform of filler material could be used. Such combination of applying infiltration enhancer(s) and/or infiltration enhancer precursor(s) could result in a decrease in the total weight percent of magnesium needed to promote infiltration of the aluminum metallic component into the filler material or preform of filler material, as well as achieving lower temperatures at which infiltration can occur.

The use of one or more auxiliary alloying elements and the concentration of nitrogen in the surrounding gas also affects the extent of nitriding of the metallic constituent or at least one metallic component of metallic constituent at a given temperature. For example, auxiliary alloying elements such as zinc or iron included in the metallic constituent and/or placed on a surface of the composite body, and/or mixed within the filler material or preform, may be used to reduce the infiltration temperature and/or increase the amount or rate of infiltration at a particular temperature.

The concentration of magnesium in the metallic constituent, and/or placed onto a surface of the composite body, and/or combined in the filler or preform material, also tends to affect the extent and/or rate of infiltration at a given temperature. Consequently, in some cases where little or no magnesium is contacted directly with the preform or filler material, it may be preferred that at least about three weight percent magnesium be included in the metallic constituent. Alloy contents of less than this amount, such as one weight percent magnesium, may require higher process temperatures or an auxiliary alloying element for infiltration. The temperature required to effect the spontaneous infiltration process of this invention may be lower: (1) when the magnesium content of the metallic constituent alone is increased, e.g., to at least about 5 weight percent; and/or (2) when alloying constituents are mixed with the permeable mass of filler material or preform; and/or (3) when another element such as zinc or iron is present somewhere in the system. The temperature also may vary with different filler materials. In general, in the aluminum metallic component/magnesium/nitrogen spontaneous system, spontaneous and progressive infiltration will occur at a process temperature of at least about 650° C., and preferably at a process temperature of at least about 750° C.–850° C. Temperatures generally in excess of 1200° C. do not appear to benefit the process, and a particularly useful temperature range has been found to be from about 675° C. to about 1050° C. However, as a general rule, the spontaneous infiltration temperature is a temperature which is above the melting point of at least one metallic component of the metallic constituent but below the volatilization temperature of said metallic component. Moreover, the spontaneous infiltration temperature should be below the melting point of the filler material. Still further, as temperature is increased, the tendency to form a reaction product between at least one metallic component of the metallic constituent and the infiltrating atmosphere increases (e.g., in the case of aluminum metallic component and a nitrogen infiltrating atmosphere, aluminum nitride may be formed). Such reaction product may be desirable or undesirable. Additionally, electric resistance heating is typically used to achieve the infiltrating temperatures. However, any heating means which can cause said at least one metallic component to become molten and does not adversely affect spontaneous infiltration, is acceptable for use with the invention.

In the present method, for example, a permeable filler material or preform comes into contact with molten aluminum component of the composite body in the presence of, at least sometime during the process, a nitrogen-containing gas. The nitrogen-containing gas may be supplied by maintaining a continuous flow of gas into contact with at least one of the filler material or preform and/or molten aluminum or by containing the preform or filler material in a closed or static atmospheric system. Although the flow rate of the nitrogen-containing gas is not critical (e.g., flowing nitrogen may not even be essential), it is preferred that a flow rate be established such that, for example, the flow rate is sufficient to compensate for any nitrogen lost from the atmosphere due to any nitride formation, and also to prevent or inhibit the incursion of air which can have an oxidizing effect on one or more metallic components of the metallic constituent.

The method of removing at least one metallic component of a metallic constituent from a composite body is applicable to a wide variety of filler materials, and the choice of filler materials will depend on such factors as the composition of the metallic constituent, the process conditions, and the reactivity of the metallic constituent with the filler material. For example, when the metallic constituent comprises aluminum, suitable filler materials include (a) oxides, e.g. alumina, magnesia, zirconia; (b) carbides, e.g. silicon carbide; (c) borides, e.g. aluminum dodecaboride, titanium diboride, and (d) nitrides, e.g. aluminum nitride, silicon nitride, and (e) mixtures thereof. Further, the filler material or preform may be homogeneous or heterogeneous. If the filler material or preform were heterogeneous, it is possible that selective removal of metallic constituent could occur. For example, under a given set of reaction conditions, one filler material could be infiltrated at a faster rate relative to another filler material. Thus, by proper choice of combination of filler materials (e.g., by using particle size and/or chemical composition) metal could be withdrawn in differing amounts from different portions of a composite body, thereby resulting in graded properties in the composite body.

Figure 3:
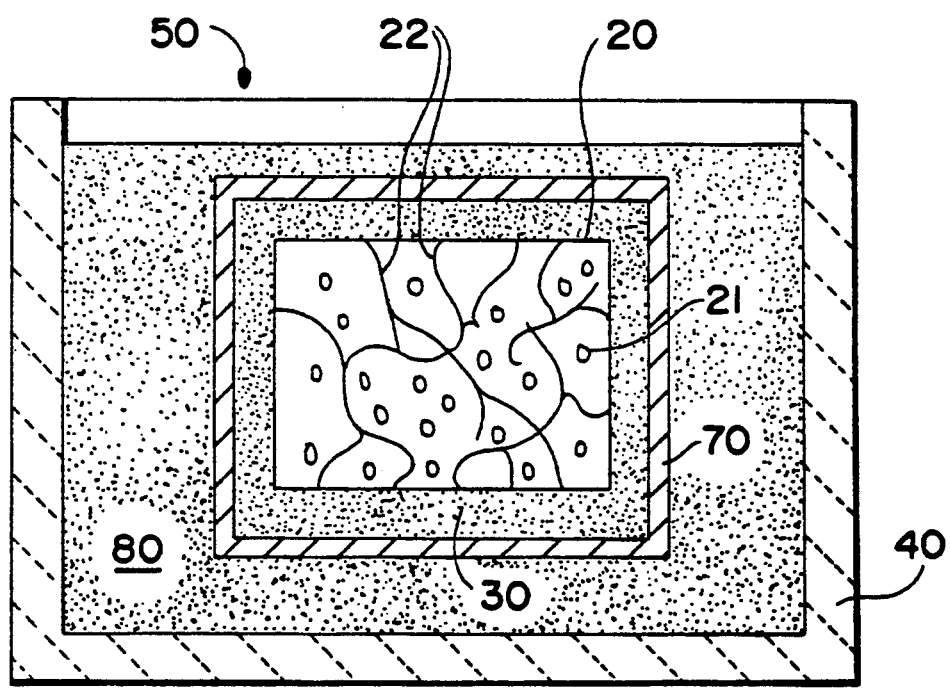
FIG. 3 is a schematic cross-sectional representation of a typical lay-up for removing at least one metallic component of a metallic constituent which limits the amount of metal removed by the use of a barrier means.

It may also be desirable to utilize a barrier means in combination with the present invention. Specifically, as shown in FIG. 3, a barrier means 70 may at least partially, or substantially completely, surround a composite body 20, which itself is surrounded by a filler material 30, and contained within the barrier material 70. The barrier material 70 may than serve as a limiting means for removing metallic constituent from the composite body 20. Specifically, once spontaneous infiltration of at least one metallic component of the metallic constituent 22 of the composite body 20 had begun and had reached the barrier means 70, the barrier means 70 could prevent any further spontaneous infiltration of said metallic component from the composite body 20. Thus, the use of a barrier means may provide a control of the amount of said metallic component to be removed from the composite body 20.

As shown in FIG. 3, the barrier means may be supported by a suitable substantially inert material 80. The barrier means for use with this invention may be any suitable means which interferes, inhibits, prevents or terminates the migration, movement, or the like, of molten metallic constituent beyond the surface boundary of the barrier. Suitable barrier materials may be any material, compound, element, composition, or the like, which, under the process conditions of the invention, maintains some integrity, is not volatile and preferably, at least in some cases, is permeable to the infiltration atmosphere which may be used with the process, as well as being capable of locally inhibiting, stopping, interfering with, preventing, or the like, continued infiltration or any other kind of movement beyond the surface boundary of the barrier.

Suitable barrier means includes materials which are substantially non-wettable by the migrating molten metal under the process conditions employed. A barrier of this type appears to exhibit little or no affinity for the molten metal, and movement beyond the defined surface boundary of the filler material or preform is prevented or inhibited by the barrier means. As stated above, the barrier preferably should be permeable or porous, or rendered permeable by puncturing, to permit the infiltrating atmosphere to contact the molten matrix alloy.

Suitable barriers particularly useful for aluminum metallic components are those containing carbon, especially the crystalline allotropic form of carbon known as graphite. Graphite is essentially non-wettable by the molten aluminum alloy under the described process conditions. Particular preferred graphites are graphite foil products that are sold under the trademark GRAFOIL®️ graphite foil, registered to Union Carbide and under the trademark PERMA-FOIL graphite foil, distributed by TTAmerica. These graphite foils exhibit sealing characteristics that prevent the migration of molten aluminum alloy beyond the defined surface boundary of the filler material. These graphite foils are also resistant to heat and are chemically inert. GRAFOIL®️ graphite foil and PERMA-FOIL graphite foil are flexible, compatible, conformable and resilient.

They can be made into a variety of shapes to fit any barrier application. However, graphite barrier means may be employed as a colloidal suspension, a slurry or paste or even as a paint film around and on the boundary of the filler material or preform. GRAFOIL®️ graphite foil and PERMA-FOIL graphite foil are particularly preferred because they are in the form of a flexible graphite sheet. In use, these paper-like graphites are simply formed around the filler material or preform.

Other useful barriers for aluminum metal in nitrogen include low-volatile organic compounds applied as a film or layer onto the external surface of the filler material or preform. Upon firing in nitrogen, especially at the process conditions of this invention, the organic compound decomposes leaving a carbon soot film. The organic compound may be applied by conventional means such as by painting, spraying, dipping, etc.

Moreover, finely ground particulate materials can function as a barrier so long as infiltration of the particulate material would occur at a rate which is slower than the rate of infiltration of the filler material.

Thus, the barrier means may be applied by any suitable means, such as by covering the defined surface boundary with a layer of the barrier means. Such a layer of barrier means may be applied by painting, dipping, silk screening, evaporating, or otherwise applying the barrier means in liquid (e.g., colloidal graphite suspension), slurry, or paste form, or by sputtering a vaporizable barrier means, or by simply depositing a layer of a solid particulate barrier means, or by applying a solid thin sheet or film of barrier means onto the defined surface boundary. With the barrier means in place, spontaneous infiltration substantially terminates when the infiltrating metal reaches the defined surface boundary and contacts the barrier means.

The present invention is particularly well suited for use in combination with metallic component or metallic constituent removal from ceramic and ceramic composite bodies formed by a directed metal oxidation of a parent metal. Specifically, the directed metal oxidation reaction is conducted so that the oxidation reaction product matrix grows into and embeds an appropriately selected filler material, thereby, forming a ceramic composite body. Specifically, in practicing the present invention, the parent metal (e.g., aluminum) is positioned adjacent to a filler material or preform such that growth of an oxidation reaction product will be in a direction towards the filler material or preform so that the filler material is embedded by the growing oxidation reaction product. The positioning and orienting of the parent metal and the filler material or preform with respect to each other may be accomplished by simply embedding a body of parent metal within a particulate filler material or by positioning one or more bodies of parent metal adjacent to or in contact with a filler material or preform, or an assembly of filler materials and/or preforms. Suitable morphologies for filler materials include rods, bars, wires, plates, platelets, hollow bodies, spheres, powders or other particulates, or combinations thereof. Likewise, the chemical composition of the filler material depends on the synergism which may be achieved between the filler material and the oxidation reaction product, as well as the ultimate desired use for the refractory material. In this regard, the filler material may have a chemical composition which is very similar to or very different from the ceramic matrix. Further, appropriate sizes of the filler material to be utilized depends on a number of different factors. However, certain desirable coarse grained filler materials typically have an average particle size of about 1000 microns and greater; whereas fine grained filler materials utilized in combination with the present invention have an average particle size of about one micron or less.

Additionally, the volume percent of filler provided in the matrix can range anywhere between about 20 volume percent to about 70 volume percent,, the precise amount of filler utilized depending on the composition, morphology, etc., of the filler and the ultimate desired use for the ceramic composite body.

Further discussions of the formation of ceramic and ceramic matrix composite bodies which are desirable to use in connection with other aspects of the present invention can be found in the patents and patent applications disclosed in the Section herein entitled "Description of Commonly Owned U.S. Patents and U.S. Patent Applications."

The present invention is particularly well suited for use in combination with metallic component or metallic constituent removal from ceramic and ceramic composite bodies formed by a directed metal oxidation of a parent metal. Specifically, of particular interest in this disclosure is the removal of aluminum metal component(s) of metallic constituent(s) contained within fiber reinforced ceramic composite bodies, wherein the fiber reinforcement is coated by a plurality of superimposed coatings thereon. Specifically, for example, fiber reinforcements comprising silicon carbide, silicon carbide-based materials, carbon and carbon-based materials, alumina and alumina-based materials, can be coated by, for example, chemical vapor infiltration techniques. When such chemical vapor infiltration techniques are utilized, desirable coating combinations for silicon carbide and silicon carbide-based materials include boron nitride/silicon carbide or titanium carbide/silicon nitride or carbon/silicon carbide. When the fiber reinforcement comprises carbon fibers, desirable coating combinations include carbon/silicon carbide. Additionally, when the fiber reinforcement comprises an alumina or aluminum-based fiber, desirable coating combination include iridium/silicon carbide or niobium/silicon carbide, platinum/silicon carbide or platinum/boron nitride/silicon carbide.

Further, when the above-discussed fiber reinforcements are utilized as reinforcements in ceramic composite bodies made by the directed oxidation of a parent metal and the resultant bodies are subjected to metal removal techniques of the invention, very desirable bodies can be manufactured.

For example, in a preferred embodiment of the invention, two or more coatings are applied to the filler material. In a system utilizing a duplex coating, the coatings are selected to provide adequate mismatch in bonding strengths so as to allow for debonding and pull-out upon application of stress. Also, the duplex coating is selected to provide protection against degradation of the filler, and the outer coating is selected to exhibit wettability of molten parent metal and to protect the inner coating from degradation or corrosion in high temperature, oxidizing environments under the conditions of the matrix formation process. Also, in some cases, a system using two coatings rather than three or more, may be advantageous from an economic standpoint.

Thus, the coatings are selected so as to be compatible with the filler material, and to the process conditions for the manufacture of the composites. Also, the coatings should complement each other in achieving the desired characteristics or properties. In a ceramic composite system having incorporated therein a filler with a duplex coating, for example, the first and outer coatings are selected to provide an adequate mismatch in interfacial shear strength so that one of the three zonal junctions is weak relative to the remaining zonal junctions to provide relative movement between the inner coating and the filler, or between coatings, or between the outer coating and the adjacent ceramic matrix. In this manner, debonding and pull-out will occur, thereby improving or enhancing the fracture toughness of the ceramic composite body.

The first and outer coatings, typically, are deposited onto the ceramic filler material by conventional or known means such as chemical vapor deposition, plasma spraying, physical vapor deposition, plating techniques, sputtering or sol-gel processing. Achievement of a substantially uniform coating system according to these prior art techniques is within the level of skill in this art. For example, chemical vapor deposition of a uniform coating of boron nitride on ceramic filler materials can be achieved by using boron trifluoride and ammonia at a temperature of about 1000–1500° C. and a reduced pressure of 1–100 torr: boron trichloride and ammonia at a temperature of 600–1200° C. and a reduced pressure of 0.1–100 torr; borazine at a temperature of 300–650° C. and a reduced pressure of 0.1–1 torr; or diborane and ammonia at a temperature of 600–1250° C. and a reduced pressure of 0.1–1 torr. A coating of silicon carbide by chemical vapor deposition can be accomplished, for example, by using methyltrichlorosilane at a temperature of 800–1500° C. and a pressure of 0.1–760 torr; dimethyldichlorosilane at a temperature of 600–1300° C. and a reduced pressure of 0.1–100 torr; and silicon tetrachloride and methane at a temperature of 900–1400° C. and a reduced pressure of 0.1–100 torr.

It should be understood that various combinations of ceramic materials with first and outer coatings may be produced depending on the specific properties desired in the coated ceramic material and its ultimate application. A possible combination includes silicon carbide fiber with a first layer of titanium carbide and an additional outer layer of silicon nitride. Another coating system includes silicon carbide fiber with a first coating of boron nitride and additional outer coatings of silicon carbide and alumina.

The coated ceramic materials employed in the ceramic matrix composites of the invention are chosen so that debonding and pull-out may be achieved. Thus, the coated fibers are chosen so that the interfacial shear strength between the ceramic filler material and the first coating is sufficiently different from the interfacial shear strength between the first coating and the additional outer coating or between the outermost coating and the ceramic matrix to permit relative movement between the surfaces and allow for debonding and pull-out.

Debonding and pull-out is especially beneficial for filler materials having a relatively high length to diameter ratio, such as fibers, typically at least about 2:1 and more particularly at least 3:1. Filler material with a low length to diameter ratio such as particles or spheres, characteristically exhibits crack deflection toughening.

In applying the coatings to the filler material, the thickness of each coating and the cumulative thickness of all coatings can vary over a wide range. This thickness can depend on such factors as the composition of each coating and their interaction, the type and geometry of the filler, and the process conditions and precursor metal used in the manufacture of the composite. Generally, the cumulative thickness for the coatings should be sufficient to completely cover the ceramic filler material and protect it from oxidation degradation, attack from molten metal, and other corrosive environments which may be encountered in employment of the finished composite. In the preferred embodiment, the inner coating is compatible with the filler material so as not to degrade its integrity, and further the inner coating can be selected to allow for debonding and pull-out or shear. The coating system is selected to be compatible with the matrix material, especially the precursor for the matrix, and further the coating system is selected so as to be capable of withstanding the process conditions used in the manufacture of the composites. While the inner coating may afford adequate protection against degradation of the filler or allow for shear between this first coating and the filler, a second or outer coating is selected to be compatible with the process conditions employed in the manufacture of the ceramic composite body, in that it should be substantially inert and not degrade, and further should exhibit wettability to molten parent metal when serving as a precursor to the ceramic matrix. Also, if the first coating or fiber is susceptible to attack and degradation by the process environment during composite manufacture or by attack of oxidants diffusing through the matrix during actual service, the second or outer coating is chosen to protect the inner coating or fiber from exposure to processing conditions and/or end use conditions. Thus, the coating system protects the fibers from degradation, as does one coating superimposed on another, and concomitantly provides for compatibility for matrix formation and use, and for relative movement to allow for shear. By reason of this coating system, structural degradation of the composite components is mitigated thereby prolonging the useful life and performance of the composite, and the fracture toughness of the composite is improved.

If the surface of the filler is very irregular and exhibits nodules, barbs, fibrils, projections, or protuberances, the filler material can mechanically interlock or bond with the adjacent surface including the adjacent coating or adjacent filler material thereby impeding or preventing debonding and pull-out, which can be deleterious to the properties of the composite. It, therefore, is desirable to provide a coating system which is sufficiently thick to completely cover the irregularities in the filler.

The thickness and properties of the coatings may vary depending on the deposition process and the filler material. In a duplex coating system, the thickness for each coating, in terms of the radius, typically may range from about 0.05 to about 25 microns, preferably to about 10 microns, but the innermost coating can be monoatomic in order to separate the second coating from the filler particle. The cumulative thickness for a coating system may be to about 25 microns, and more preferably 2–10 microns. Usually, a coating system having a thickness within this range can be applied to the filler by conventional or known means and will provide the desired properties described above.

It has been found that a number of coating compositions can be employed in the coating system of this invention. These compositions include the metal oxides, nitrides, borides and carbides, alkaline metal salts, alkaline earth metal salts, carbon, silicon, and the like. The choice of coating compositions will depend on the filler material, the compatibility of coatings to each other, and the process conditions for the manufacture of the ceramic composite. For example, silicon carbide fibers can be used as filler in composites made by the directed oxidation of a parent metal. In order to provide for debonding and pullout, the silicon carbide fibers may be coated with boron nitride which prevents a relatively strong bond between the coated fiber and the surrounding matrix. However, boron nitride may be degraded by the oxidation reaction conditions of the process for making the composite. Further, boron nitride may not be wet by certain metals, such as aluminum, under the conditions of the matrix formation process, and therefore as an outer coating would tend to interfere with the matrix formation. However, an inner coating exhibiting little or no wettability by parent metal under process conditions can be advantageous. For example, the coating system may have pores or flaws, but the contact angle of the molten parent metal with the inner coating may preclude transport of the parent metal through any pores or flaws in the inner coating and thereby protect the filler from attack by molten metal. The presence of an additional wettable outer coating on the filler would then avoid impedance to the matrix formation process. Therefore, a suitable outer coating such as silicon carbide is applied to the boron nitride coating to achieve compatibility with the forming process and to protect the boron nitride from degradation, such as by oxidation. Silicon carbide is, for example, wet by doped aluminum and relatively oxidation-resistant in an air environment at 1000° C., where boron nitride is typically not wet by aluminum, and is oxidation-prone, at these temperatures. Further, the bond between the two coatings is weak relative to the other bonds thereby facilitating debonding and pull-out of the fibers during fracture. Other useful coating compositions include, for example, titanium carbide, silicon, calcium silicate, calcium sulfate, and carbon as the inner coating, and silicon, silica, alumina, zirconia, zirconium nitride, titanium nitride, aluminum nitride, and silicon nitride as an outer coating. Other suitable compositions for the first and outer coatings may be selected for use with the ceramic filler material provided these coatings complement each other in the manner described above.

Various demonstrations of the present invention are included in the Examples immediately following. However, these Examples should be considered as being illustrative and should not be construed as limiting the scope of the invention as defined in the appended claims.

EXAMPLE 1

The following Example demonstrates, among other things, a method for forming a fiber reinforced ceramic composite body and the resultant mechanical properties of the body from about room temperature to about 1400° C. Specifically, this Example demonstrates a method for forming a silicon carbide fiber reinforced alumina composite body wherein the silicon carbide fibers are coated with a first layer of boron nitride and a second layer of silicon carbide to create a debond zone between the silicon carbide fiber and the alumina matrix.

Figure 4A:
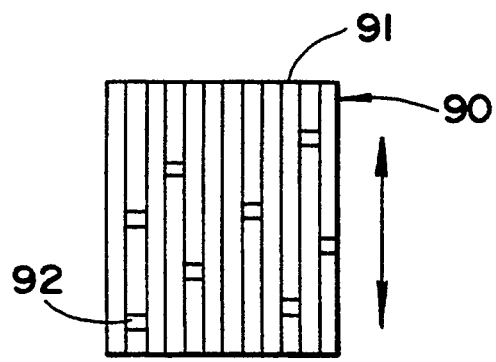
FIG. 4A is a schematic view of the top of a harness satin weave fabric in the as-is position as discussed in Example 1.
Figure 4B:
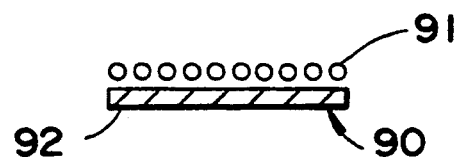
FIG. 4B is a schematic cross-sectional representation of a harness satin weave fabric in the as-is position as discussed in Example 1.
Figure 4C:
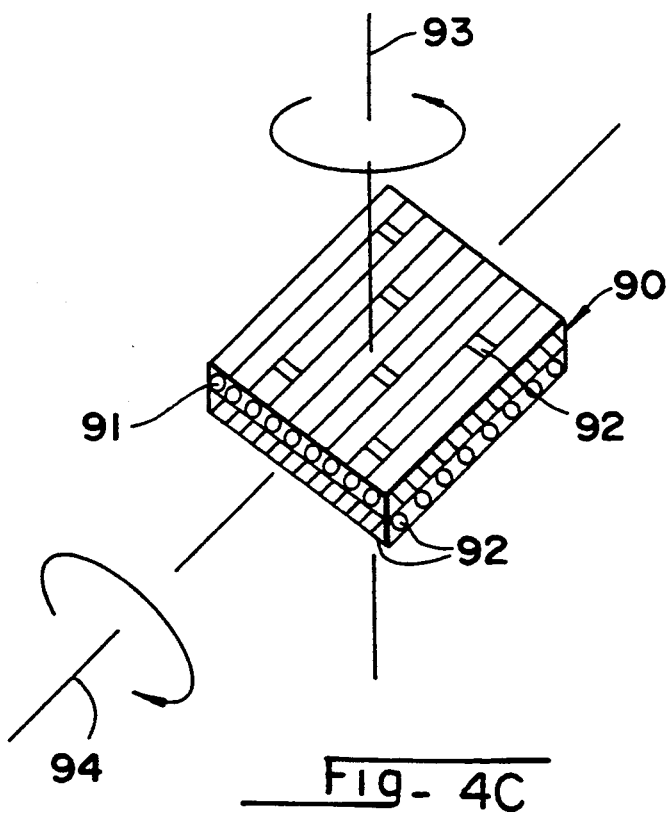
FIG. 4C is an isometric schematic view illustrating the axes of rotation for a harness satin weave fabric in the as-is position as discussed in Example 1.
Figure 4D:
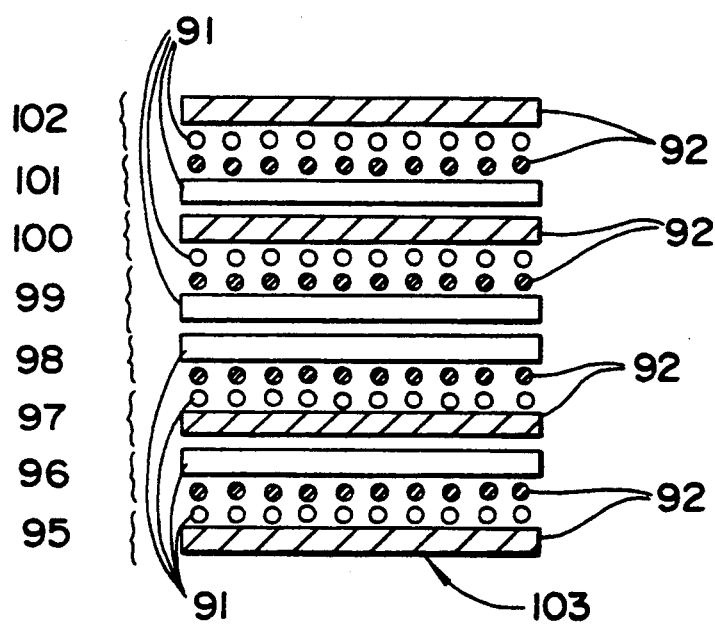
FIG. 4D is a schematic cross-sectional representation of a fabric preform comprised of harness satin fabrics as discussed in Example 1.

A fabric preform 103 was made by stacking a plurality of layers of 8 harness satin weave (8 HSW) fabric and 12 harness satin weave (12 HSW) fabric made from NICALON ™ silicon carbide fiber (obtained from Dow Corning Corporation, Midland, Mich.) on top of each other. FIGS. 4A and 4B are schematics depicting a top view and a cross-sectional view respectively of the as-is position for a HSW fabric. In reference to FIGS. 4A and 4B, a harness section weave (HSW) fabric is designated to be in the "as-is position" when, as viewed in cross-section, the axes of the warp yarns 92 of the fabric 90 are in the plane of the cross-sectional view and are located at the bottom (i.e., as shown in the cross-sectional view) of the fabric 90 and the axes of the fill yarns 91 are perpendicular to the plane of the cross-sectional view and are located at the top of the fabric 90. The orientation of additional fabric layers can be described in reference to the as-is position. For example, as depicted in FIG. 4C, additional fabric layers can be (1) rotated about an axis 93 perpendicular to the plane of the fabric 90 and/or (2) rotated about an axis 94 perpendicular to the plane of the cross-section of the fabric 90 and then subsequently contacted or layered upon a fiber layer positioned in the as-is configuration. Thus, for example, as schematically depicted in cross-section in FIG. 4D, a substantially square fabric preform 103 can be made from 8 pieces of HSW fabric, stacked in the following sequence:

A first fabric layer 95 comprising an 8 HSW fabric was placed on a supporting surface in the as-is position to start the fabric preform 103;

A second fabric layer 96 comprising a 12 HSW fabric, was rotated about 90° in the counterclockwise direction from the as-is position about an axis 93 perpendicular to the plane of the fabric and was placed on the first fabric layer 95 so that the edges of the second fabric layer 96 were substantially aligned with the edges of the first fabric layer 95;

A third fabric layer 97 comprising a 12 HSW fabric, in the as-is position, was placed on the second fabric layer 96 so the edges of the third fabric layer 97 were substantially aligned with the edges of the second fabric layer 96;

A fourth fabric layer 98 comprising a 12 HSW fabric, was rotated about 90° in the counterclockwise direction from the as-is position about an axis 93 perpendicular to the plane of the fabric and was placed on the third fabric layer 97 so that the edges of the fourth fabric layer 98 were substantially aligned with the edges of the third fabric layer 97;

A fifth fabric layer 99 comprising a 12 HSW fabric, was rotated about 90° in the counterclockwise direction from the as-is position about an axis 93 perpendicular to the plane of the fabric and then rotated about 180° in the clockwise direction about an axis 94 perpendicular to the plane of the cross-sectional view of the fabric and was placed on the fourth fabric layer 98 so that the edges of the fifth fabric layer 99 substantially aligned with the edges of the fourth fabric layer 98;

A sixth fabric layer 100 comprising a 12 HSW fabric, was rotated about 180° in the clockwise direction from the as-is position about an axis 94 perpendicular to the plane of the cross-sectional view of the fabric and was placed on the fifth fabric layer 99 so that the edges of the sixth fabric layer 100 were substantially aligned with the edges of the fifth fabric layer 99;

A seventh fabric layer 101 comprising a 12 HSW fabric, was rotated about 90° in the counterclockwise direction from the as-is position about an axis 93 perpendicular to the plane of the fabric and then rotated about 180° in the clockwise direction about an axis 94 perpendicular to the plane of the cross-sectional view of the fabric and was placed on the sixth fabric layer 100 so that the edges of the seventh fabric layer 101 were substantially aligned with the edges of the sixth fabric layer 100; and Finally, an eighth fabric layer 102 comprising an 8 HSW fabric, was rotated about 180° in the clockwise direction from the as-is position about an axis 94 perpendicular to the plane of the cross-sectional view of the fabric and was placed on the seventh fabric layer 101 so that the edges of the eighth fabric layer 102 were substantially aligned with the edges of the seventh fabric layer.

Figure 4E:
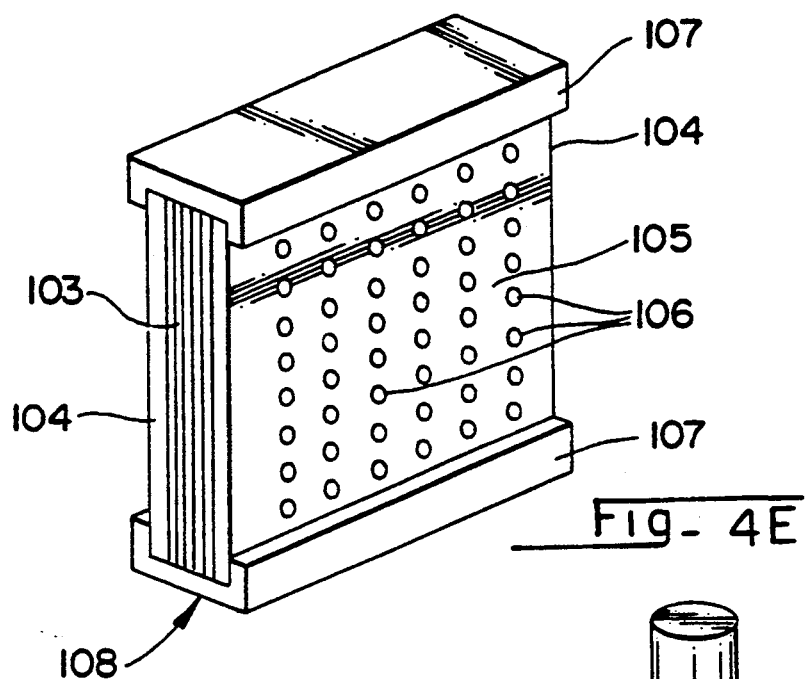
FIG. 4E is an isometric schematic representation of a graphite containment fixture for effecting the coating of a fabric preform as discussed in Example 1.

In reference to FIG. 4E, the fabric preform 103 comprised of the two 8 HSW outer fabric layers and the six 12 HSW inner fabric layers and measuring about 6.75 inch (171 mm) square and about 0.125 inch (3.2 mm) thick was placed on a perforated graphite plate 104 machined from Grade AXF-5Q graphite (Poco Graphite, Inc., Decatur, Tex.) which measured about 7.75 inches (197 mm) square and about 0.5 inch (13 mm) thick. The inner perforated region 105 of the perforated plate measured about 6.25 inches (159 mm) square. The holes 106 of the perforated region 105 had a diameter of about 0.25 inch (6.4 mm) and a center-to-center spacing of about 0.375 inch (9.5 mm) and comprised a 17 hole×17 hole array which was bordered by an about 1 inch (25 mm) unperforated region. After the fabric preform 103 had been placed on the first graphite plate 104, a second graphite plate 104, substantially the same as the first, was placed over the fabric preform 103 and the plates were clamped using C-clamps to compress the fabric preform 103. Two graphite channel members 107 machined from Grade AXF-5Q graphite (Poco Graphite, Inc., Decatur, Tex.) and measuring about 7.75 inches (197 mm) long were placed over common ends of both perforated graphite plates 104 so as to contact opposite ends of the first and second perforated graphite plates 104 thereby creating a preform containment fixture 108. FIG. 4E is an isometric schematic view of the preform containment fixture 108. After the graphite channels 107 were secured to the perforated plates 104, the C-clamps were removed from the perforated plates 104 and the elastic force exerted by the compressed fabric preform 103 biased the perforated graphite plates 104 against the graphite channel members 107 to form a relatively rigid preform containment fixture 108. The warp yarns 92 of the eighth layer 102 of the fabric preform 103 within the graphite containment fixture 108 were positioned so as to be parallel to the length of the graphite channel members 107 of the preform containment fixture 108.

The graphite containment fixture 108 containing the fabric preform 103 was placed into a reactor chamber of a chemical vapor infiltration apparatus having an outer diameter of about 12 inches (305 mm). The inner diameter of the reactor chamber measured about 9.45 inches (240 mm) after being lined with a quartz tube having a wall thickness of about 0.5 inch (13 mm) and lined with a graphite tube having a wall thickness of about 0.25 inch (6.4 mm). The warp yarns 92 of the eighth layer 102 of the fabric preform 103 were parallel to the gas flow direction within the chamber as well as being parallel to the longitudinal axis of the reactor chamber. The reactor chamber was closed and evacuated to about 0.004 inch (0.1 mm) of mercury (Hg). Then the reactor chamber was heated to about 800° C. at about 10° C. per minute so that the contents of the reactor chamber were at about 730° C., as indicated by a thermocouple contained therein. When the temperature within the reactor chamber reached about 730° C., a gas mixture comprised of ammonia (NH3) flowing at about 1200 standard cubic centimeters (sccm) and boron chloride (BCl3) flowing at about 800 sccm was introduced into the reactor chamber while maintaining a total operating pressure of from about 0.047 to about 0.051 inches of mercury (about 1.2 to about 1.3 mm Hg). After about 6.5 hours at about 730° C., the gas mixture flowing into the reactor chamber was interrupted, the power to the furnace heating the reactor chamber was interrupted, and the furnace and its contents were naturally cooled to about 200° C. At about 200° C., the reactor chamber door was opened and the graphite containment fixture 108 was removed, cooled and disassembled to reveal that the fibers of the fabric layers of the fabric preform 103 were coated and that the fabric layers comprising the fabric preform 103 were bonded together by a boron nitride coating formed during the process at about 730° C., thereby forming a coated and bonded fabric preform 109. The boron nitride coating had a thickness of about 0.4 microns.

Figure 4F:
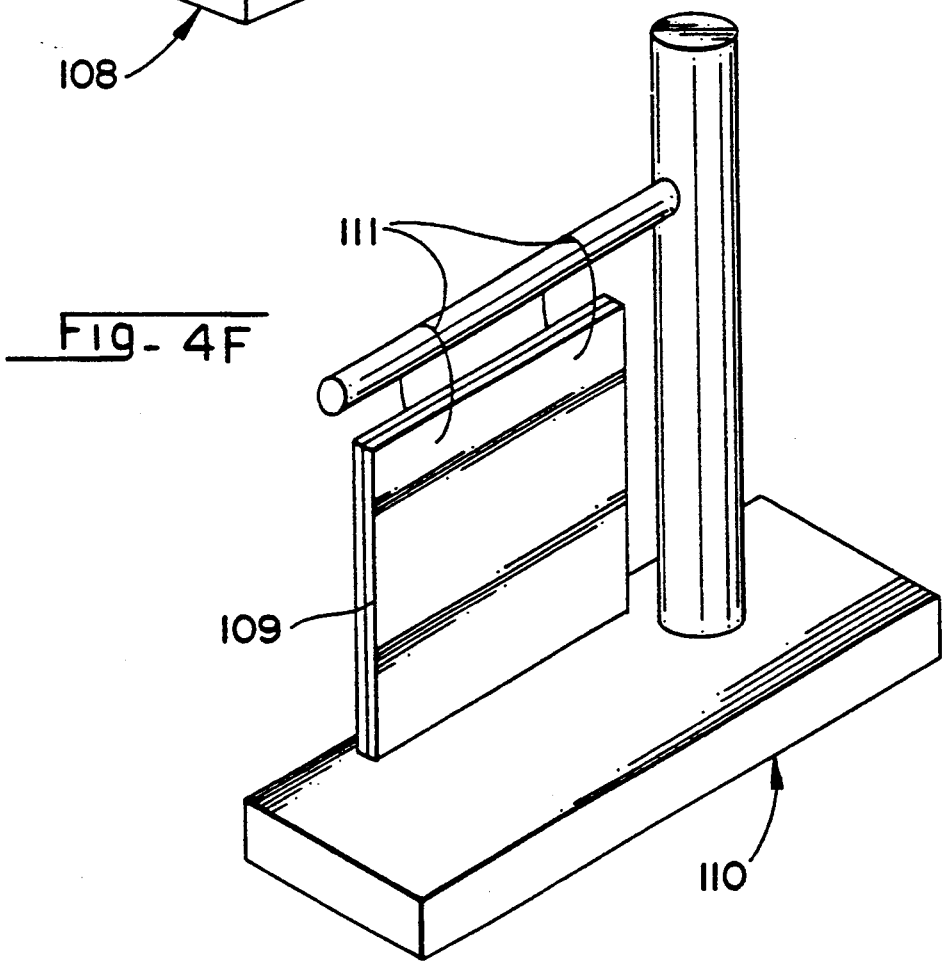
FIG. 4F is an isometric schematic representation of a cantilever graphite fixture for holding a boron nitride coated fabric preform to enable coating of the preform with a second coating as discussed in Example 1.

The boron nitride coated and bonded fabric preform 109 was then suspended from a graphite cantilever support fixture 110 made from Grade AXF-5Q graphite (Poco Graphite, Inc., Decatur, Tex.) by wires 111 comprised of a Kanthal® iron-chromium-aluminum alloy all of which are depicted schematically in FIG. 4F. The graphite cantilever support fixture 110 and the boron nitride bonded fabric preform 109 were then replaced into the reactor chamber of the chemical vapor infiltration apparatus discussed above such that the warp yarns 92 of the eighth layer 102 comprised of the 8 harness satin weave fabric were parallel to the gas flow direction within the chamber as well as being parallel to the longitudinal axis of the reactor chamber. After the reactor chamber door was closed, the reactor chamber and its contents were evacuated to about 0.591 inches (15 mm Hg) and hydrogen gas flowing at about 2500 sccm was introduced into the reactor chamber. The reactor chamber was heated at about 10° C. per minute so that the contents of the reactor chamber were at about 925° C. as indicated by a thermocouple therein. When the reactor chamber contents were at about 925° C., additional hydrogen, flowing at about 2500 sccm, was introduced into the reactor chamber to give a total hydrogen gas flow rate of about 5000 sccm. Once the temperature of the contents of the reactor chamber had substantially completely stabilized at about 925° C., about 2500 sccm hydrogen were diverted away from direct entry into the reactor chamber, and were first bubbled through a bath of trichloromethylsilane (CH3SiCl3) also known as methyltrichlorolsilane (MTS) (Hulls/Petrarch System, Bristol, Pa.), maintained at about 25° C., before entering the reactor chamber. After about 26 hours at about 925° C., the power to the furnace heating the reactor chamber was interrupted and the about 2500 sccm hydrogen that was being directed through the MTS bath was again permitted to flow directly into the reactor chamber to re-establish a direct hydrogen gas flow rate of about 5000 sccm into the reactor chamber. It was noted that about 4.75 liters of MTS had been consumed during the 26 hour of the run at about 925° C. After about a half hour during which a hydrogen gas flow rate at about 5000 sccm was maintained, the hydrogen flow rate was interrupted and the furnace and its contents were evacuated to about 0.039 inches 0.1 mm of mercury (Hg). The pressure within the reactor chamber was then allowed to increase to about atmospheric pressure while argon was introduced at a flow rate of about 14 liters per minute. After the reaction chamber had cooled to a temperature of about 200° C., the argon flow rate was interrupted and the reaction chamber door was open. The graphite cantilever support fixture 110 and the fabric preform were removed from the reactor chamber to reveal that the boron nitride bonded fabric preform 109 had been coated with a second layer of silicon carbide thereby forming a silicon carbide (SiC)/boron nitride (BN)-coated fabric preform 112. The silicon carbide had a thickness of about 2.3 microns.

Figure 4G:
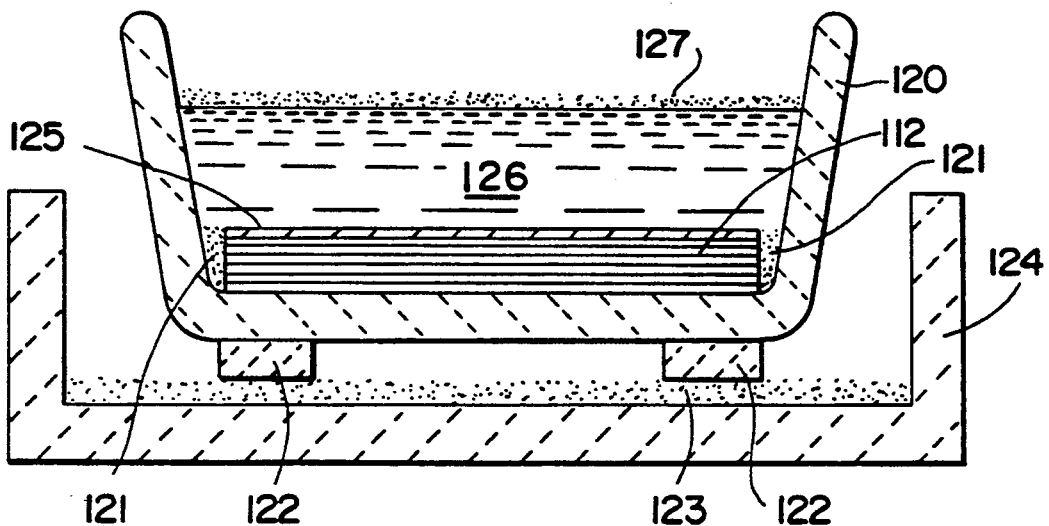
FIG. 4G is a schematic cross-sectional representation of a growth lay-up for forming a fiber reinforced ceramic composite body as discussed in Example 1.

A wax box pattern having a closed end and outer dimensions of about 7 inches (178 mm) square by about 2 inches (51 mm) tall and a wall thickness of about 0.25 inches (6.5 mm) was assembled from high temperature wax sheet (Kit Collins Company, Cleveland, Ohio) which contained adhesive backing on one side thereof. The wax box pattern was assembled by using a hot wax knife. The closed end of the wax pattern was beveled at an angle of about 22°. A slurry mixture comprised by weight of about 5 parts BLUONIC® A colloidal alumina (West Bond Corp., Wilmington, Del.) and about 2 parts −325 mesh (average particle diameter less than about 45 microns) wollastonite (a calcium silicate mineral) was made by hand mixing the materials together. The slurry mixture was then painted onto the outer surface of the wax box pattern with a one inch sponge brush and coarse (−10, +100 mesh) wollastonite powder was sprinkled liberally onto the slurry mixture coating to prevent runoff and to form a first precursor layer of a shell 120. This procedure was repeated to build additional layers of coating with an about 0.5 hour drying period between the formation of the precursor layers. When enough precursor layers of slurry mixture/coarse wollastonite were formed to produce a thickness of about 0.25 inch (6.4 mm), the coated wax box pattern was set aside to dry at about room temperature for about 24 hours. The about 0.25 inch (6.4 mm) thick coating nominally comprised about 12 slurry mixture/coarse wollastonite layers. After the coated wax box pattern had substantially completely dried at about room temperature, the wax box pattern was placed into an air atmosphere furnace maintained under an exhaust hood and the furnace and its contents were held at a temperature of about 120° C. for about 6 hours, during which time the wax melted leaving behind an unfired precursor to an alumina bonded wollastonite shell 120, as shown in FIG. 4G. The furnace and its contents were then heated to about 950° C. in about 2 hours and held at about 950° for about 4 hours to substantially completely remove any residual wax and ensure the sintering of the alumina bonded wollastonite shell. The furnace and its contents were then cooled to about room temperature.

About 40 grams of VASELINE® petroleum jelly vehicle (Cheseborough Ponds, Inc., Greenwich, Conn.) were melted in a small aluminum weighing dish on a hot plate set at about medium heat until the jelly turned to a liquid. A clean sable brush was then used to substantially completely coat one of the 6.75 inch (171 mm) square surfaces of the SiC/BN-coated fabric preform 112 to provide an interface for the application of a nickel oxide powder. A mixture comprising about 8 grams of −325 mesh (particle diameter less than about 45 microns) nickel oxide powder and about 16 grams of ethanol was applied with a sponge brush to substantially completely cover the petroleum jelly coated surface of the SiC/BN-coated fabric preform. After the ethanol had substantially completely evaporated, the SiC/BN-coated fabric preform 112 was inserted into the alumina bonded wollastonite shell 120 such that the uncoated side of the SiC/BN-coated preform 112 not coated with the nickel oxide powder contacted the bottom of the shell 120, as shown in FIG. 4g. The spaces between the perimeter of the SiC/BN-coated fabric preform 112 and the walls of the alumina bonded wollastonite shell 120 were filled with coarse (−10,+100 mesh) wollastonite until the surface of the wollastonite powder was substantially flush with the nickel oxide powder-coated surface of the SiC/BN-coated fabric preform 112. The alumina bonded wollastonite shell 120 containing the SiC/BN-coated fabric preform 112 was then placed onto stilts 122, which were made from fire brick, and was thereafter surrounded by wollastonite powder 123 which was contained in a refractory boat 124. The SiC/BN-coated fabric preform 112 was then leveled. About 1600 grams of a parent metal was distributed into four 30 gram clay crucibles (obtained from J. H. Berge, Inc., South Plainfield, N.J.) in amounts of about 400 grams per crucible. The parent metal comprised by weight of about 8.5 to 11.0 percent silicon, 3.0 to 4.0 percent copper, 2.7 to 3.5 percent zinc, 0.2 to 0.3 percent magnesium, $\leq 0.01$ percent calcium, $\leq 0.10$ percent titanium, 0.7 to 1.0 percent iron, $\leq 0.5$ percent nickel, $\leq 0.5$ percent manganese, $\leq 0.35$ percent tin, $\leq 0.001$ percent beryllium, $\leq 0.15$ percent lead and the balance aluminum. The refractory boat 124 and its contents, as well as the four 30 gram clay crucibles containing the parent metal, were placed into an air atmosphere furnace and the furnace door was closed. The furnace and its contents were then heated from about room temperature to about 700° C. at about 400° C. per hour, during which time the VASELINE ® petroleum jelly volatilized and the nickel oxide powder 125 fell onto the surface of the SiC/BN-coated fabric preform 112. After about an hour at about 700° C., during which time the parent metal 126 had substantially completely melted, the parent metal 126 was then poured into the alumina bonded wollastonite shell 120 and onto the nickel oxide powder-coated side of the SiC/BN-coated fabric preform 112, thereby covering the surface of the preform 112. Wollastonite powder 127 was then poured onto the surface of the molten parent metal 126 within the alumina bonded wollastonite shell 120 to substantially completely cover the surface of the molten parent metal. This assembly formed the lay-up for growth of a ceramic matrix composite body. The furnace and its contents comprising the lay-up were then heated to about 950° C. in about an hour. After about 90 hours at about 950° C., the furnace and its contents were cooled to about 700° C. in about 2 hours. At about 700° C., the lay-up was removed from the furnace and residual molten parent metal was decanted from the alumina bonded wollastonite shell 120, the shell 120 was quickly broken away from the SiC/BN-coated fabric preform 112 and the preform 112 was buried in a silica sand bed to cool the preform 112 to about room temperature. At about room temperature, it was observed that an oxidation reaction product had grown into and substantially completely embedded the SiC/BN-coated fabric preform 112, thereby forming a fiber reinforced ceramic composite body 130 having a plurality of fabric layers comprised of harness satin weaves. Specifically, the fiber reinforced ceramic composite body 130 comprised two outer layers of 8 harness satin weave silicon carbide fabric and six inner layers of 12 harness satin weave silicon carbide fabric embedded by an aluminum oxide oxidation product.

Once the ceramic composite body had been manufactured, the metal removal process of the present invention was begun. The first step of the metal removal process was to form a filler material mixture for infiltration by metal contained in the formed ceramic matrix composite body.

Specifically, filler material mixture comprising by weight of about 90 percent E-67 1000 grit (average particle diameter of about 5 microns) alumina (Norton Co., Worcester, Mass.) and about 10 percent −325 mesh (particle diameter less than about 45 microns) magnesium powder (Reade Manufacturing Company, Lakehurst, N.J.) was prepared in a one gallon NALGENE ™ wide mouth plastic container (Nalge Co., Rochester, N.Y.). Alumina milling balls were added to the filler material mixture in the plastic container and the container lid was closed. The plastic container and its contents were placed on a jar mill for about 4 hours to mix the alumina and magnesium powders together. After the alumina mixing balls had been separated from the alumina-magnesium filler material mixture 131, the filler material mixture 131 was complete.

Figure 4H:
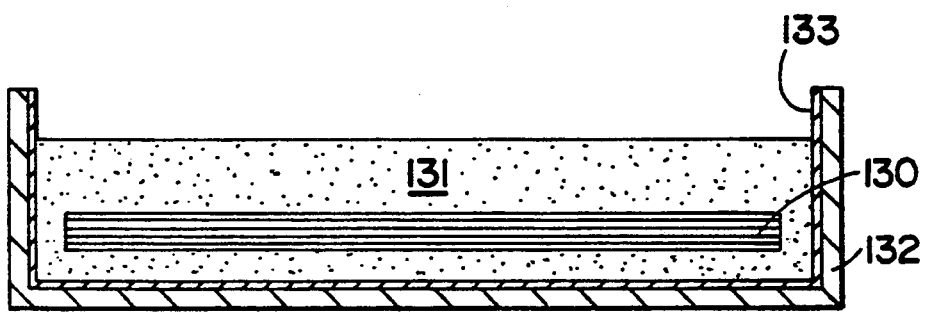
FIG. 4H is a schematic cross-sectional representation of a lay-up for removing a metallic constituent from substantially all the surfaces of a fiber reinforced ceramic composite body as discussed in Example 1.

A stainless steel boat 132 measuring about 7 inches (179 mm) square by about 2 inches (50.8 mm) deep and having a wall thickness of about 0.063 inches (1.6 mm) was lined with a graphite foil box 133 made from a piece of GRAFOIL ® graphite foil (Union Carbide Corp., Carbon Products Division, Cleveland, Ohio). About 1 inch (25 mm) of the filler material mixture 131 was hand packed into the bottom of the graphite foil lined stainless steel boat 132. The fiber reinforced ceramic composite body 130 was then placed onto and forced into the filler material mixture 131. Additional filler material mixture 131 was then poured over the fiber reinforced ceramic composite body 130 to substantially completely cover it. The filler material mixture 131 was then hand packed to ensure good contact between the filler material mixture 131 and the fiber reinforced ceramic composite body 130, thereby forming a metal removal lay-up as depicted schematically in cross-section in FIG. 4H.

The metal removal lay-up comprising the stainless steel boat 132 and its contents was then placed into a resistance heated controlled atmosphere furnace and the furnace chamber door was closed. The furnace chamber and its contents were first evacuated to at least 30 inches (762 mm) of mercury (Hg) vacuum, then the vacuum pump was disconnected from the furnace chamber and nitrogen was introduced into the chamber to establish about atmospheric pressure of nitrogen in the chamber. This operation was repeated. After the pressure in the furnace chamber reached about atmospheric pressure, the furnace chamber and its contents were heated from about room temperature to about 750° C. at a rate of about 250° C. per hour and held at about 750° C. for about 5 hours and cooled from about 750° C. to about 300° C. at about 200° C. per hour with a nitrogen gas flow rate of about 4000 sccm being maintained throughout the heating and cooling. At about 300° C., the nitrogen flow was interrupted, the furnace door was opened, and the stainless steel boat and its contents were removed and cooled by forced convection. At about room temperature, the filler material 131 was separated from the fiber reinforced ceramic composite body 130 and it was noted that the metallic constituent of the fiber reinforced ceramic composite body 130 had been substantially completely removed. The fiber reinforced ceramic composite body 130 was then subjected to grit blasting by a sand blaster which operated with a working pressure of about 75 pounds per square inch to remove any excess filler material that had adhered to the surface of the composite body 130. The fiber reinforced ceramic composite body was then cut with a diamond saw and machined into mechanical test specimens measuring about 2.4 inches (60 mm) long by about 0.2 inch (6 mm) wide by about 0.11 inch (3 mm) thick for mechanical properties measurements.

Several of the machined mechanical test specimens were then subjected to additional heat treatments. Specifically, a first group of samples was heat treated at about 1200° C. for about 24 hours and a second group of samples was heated treated at about 1200° C. for about 100 hours. The heat treatments were effected by placing the mechanical test specimens onto alumina trays with the tensile side of the test specimen facing away from the alumina trays. The alumina trays and their contents were then placed into air atmosphere furnaces and heated to about 1200° C. at a rate of about 200° C. per hour. After about 24 hours at about 1200° C., the furnace containing the first group of samples was cooled to about room temperature at a rate of about 200° C. per hour, whereas after about 100 hours at about 1200° C., the furnace containing a second group of samples, was cooled to about room temperature at a rate of about 200° C. per hour.

The flexural strengths of the fiber reinforced ceramic composite test specimens were measured using the procedure defined by the Department of the Army's proposed MIL-STD-1942A (Nov. 21, 1983). This test was specifically designed for strength measurements of high-performance ceramic materials. The flexural strength is defined in this standard as the maximum outer fiber stress at the time of failure. A four-point-¼-point flexural test was used. The height and width of the test bars were measured with a precision of about 390 microinch (0.01 mm). The test bars were subjected to a stress which was applied at four points by two lower span bearing points and two upper span bearing points. The lower span bearing points were about 1.6 inches (40 mm) apart, and the upper span bearing points were about 0.79 inch (20 mm) apart. The upper span was centered over the lower span, so that the load was applied substantially symmetrically on the test bar. The flexural strength measurements were made with a universal testing machine (Syntech, Stoughton, Mass.). The crosshead speed during testing was about 0.02 inch per minute (0.55 mm/minute). Flexural strengths determined at about 1200° C., about 1300° C. and about 1400° C. were performed with another universal testing machine equipped with an air atmosphere resistance heated furnace (Advanced Test Systems, Butler, Pa.).

Table I contains a summary of the four point flexural strengths for NICALON ™ silicon carbide reinforced alumina oxidation reaction product composite bodies. Specifically, Table I summarizes the sample condition, the test temperature, the number of samples tested, the average flexural strength and standard deviation, the maximum flexural strength and the minimum flexural strength. These data suggest that the flexural strength of fiber reinforced ceramic composite bodies subjected to the methods of

TABLE I

| Sample Condition | Test Temp. | Number of Samples Tested | Average Strength (MPa) | Max. Strength (MPa) | Min. Strength (MPa) |
|---|---|---|---|---|---|
| Metallic constituent removed | Room temp. | 8 | 461 ± 28 | 511 | 438 |
| Metallic constituent removed | 1200° C. | 10 | 488 ± 22 | 517 | 440 |
| Metallic constituent removed | 1300° C. | 4 | 400 ± 12 | 412 | 386 |
| Metallic constituent removed | 1400° C. | 4 | 340 ± 11 | 348 | 325 |
| Metallic constituent removed and heat treated at 1200° C. in air for 24 h. | Room temp. | 3 | 288 ± 21 | 302 | 264 |
| Metallic constituent removed and heat treated at 1200° C. in air for 24 h. | 1200° C. | 3 | 397 ± 9 | 404 | 387 |
| Metallic constituent removed and heat treated at 1200° C. in air for 100 h. | Room temp. | 3 | 265 ± 12 | 275 | 253 |
| Metallic constituent removed and heat treated at 1200° C. in air for 100 h. | 1200° C. | 3 | 401 ± 28 | 433 | 379 | the instant invention are substantially unaffected by test temperature between about room temperature and about 1200° C. Moreover, these data suggest that the flexural strengths of fiber reinforced ceramic composite bodies subjected to the methods of the instant invention are only slightly degraded at test temperatures greater than 1200° C. and by extended exposure times at 1200° C.

EXAMPLE 2

This Example illustrates, among other things, that a variety of ceramic matrix composite bodies can be subjected to the metal removal treatment of the instant invention to remove at least a portion of the metallic constituent of the ceramic matrix composite body. Specifically, Sample A of this Example comprised a silicon carbide fiber reinforced alumina oxidation reaction product composite body; and Sample B of this Example comprised a silicon carbide fiber reinforced aluminum nitride oxidation reaction product composite body.

Sample A

A SiC/BN-coated fabric preform measuring about 3.0 inches (76 mm) long by about 3.0 inches (76 mm) wide and by about 0.125 inch (3.2 mm) thick was prepared by stacking eight layers of 12-harness satin weave (12-HSW) fabric comprising silicon carbide fibers (NICALON ™ obtained from Dow Corning Corporation, Midland, Mich.) the fibers having a diameter ranging from about 394 microinch (10 microns) to about 787 microinch (20 microns). The 12-HSW silicon carbide fabrics were stacked such that each succeeding fabric layer was placed with its fill yarns being rotated about 90° with respect to the fill yarns of the previous fabric layer. The fabric preform comprising the stacked layers were then placed into a chemical-vapor-infiltration (CVI) reactor and the fibers were coated with a first layer of boron nitride (BN) substantially in accordance with the methods of Example 1. Thereafter, the reaction conditions in the CVI reactor were modified such that a CVI coating of silicon carbide (SiC) was placed on top of the BN coating substantially in accordance with the method of Example 1. The CVI coatings held the stacked fabric layers together, thereby forming the SiC/BN-coated fabric preform.

The SiC/BN-coated fabric preform comprising the eight stacked layers of 12-HSW fabric coated with a first layer of BN and a second layer of SiC was placed into the bottom of a porous castable refractory boat having holes at the bottom to facilitate air flow to the composite during composite growth, thereby forming a lay-up. Specifically, the porous castable refractory boat having an inner cavity measuring about 3.25 inches (83 mm) long by about 3.25 inches (83 mm) long by about 3.0 inches (76 mm) deep and having a wall thickness of about 0.125 inch (3.2 mm) was cast from a mixture comprised by weight of about 56.3% plaster of Paris (BONDEX ™, Bondex International), about 28.1% water and about 15.6% 90 grit alumina (E1 ALUNDUM ®, Norton Company, Worcester, Mass.). After the SiC/BN-coated fabric preform was placed into the porous castable refractory boat, −325 mesh (particle diameter less than about 45 microns) wollastonite particulate (a calcium silicate obtained from Peltz-Rowley Chemical Co., Philadelphia, Pa.) was placed into the void space between the SiC/BN-coated fabric preform and the porous castable refractory boat until the level of the wollastonite was substantially flush with the top surface of the preform. A thin layer of molten petroleum jelly vehicle (VASELINE ™, Chesebrough-Pounds, Inc., Greenwich, Conn.) was first applied to the top surface of the SiC/BN-coated fabric preform and then covered with nickel oxide (NiO) powder substantially in accordance of the methods of Example 1.

The porous castable refractory boat, having stilts at its corners, was placed into a resistance heated air atmosphere furnace and heated to about 700° C. at a rate of about 400° C. per hour. A parent metal, comprising by weight about 7.5–9.5% Si, 3.0–4.0% Cu, $\leq$2.9% Zn, 0.2–0.3% Mg, $\leq$1.5% Fe, $\leq$0.5% Mn, $\leq$0.35% Sn, and the balance aluminum and weighing about 420 grams, was also placed in a refractory container in the resistance heated air atmosphere furnace and heated to about 700° C. When parent metal was molten, the furnace door was opened and the parent metal was poured into the heated porous castable refractory boat and onto the NiO powder coated preform, thereby covering the surface of the SiC/BN-coated fabric preform. Wollastonite powder was then placed onto the surface of the molten parent metal within the porous boat to substantially completely cover the surface of the molten parent metal, thereby forming a lay-up. Then the furnace and its contents comprising the lay-up were heated to about 1000° C. in about an hour. After about 60 hours at about 1000° C., the furnace and its contents were cooled to about 700° C. in about 2 hours. At about 700° C., the lay-up was removed from the furnace and residual molten parent metal was decanted from the porous castable refractory boat. The refractory boat was rapidly broken away from the SiC/BN-coated preform and the SiC/BN-coated fabric preform was buried in silica sand to permit the perform to cool to about room temperature. At about room temperature, the SiC/BN-coated fabric preform was removed from the silica sand and it was observed that an oxidation reaction product comprising alumina had grown into and substantially completely embedded the SiC/BN-coated fabric preform, thereby forming a ceramic matrix composite body having a plurality of fabric layers of 12-HSW NICALON ™ silicon carbide as a reinforcement. The silicon carbide fiber reinforced alumina composite body was then cut into bars measuring about 2.4 inches (60 mm) long by about 0.2 inch (6 mm) wide by about 0.11 inch (3 mm) thick in preparation for the removal of at least a portion of the metallic constituent by the instant invention.

Sample B

A graphite foil box having an inner cavity measuring about 4.0 inches (102 mm) long by about 4.0 inches (102 mm) wide by about 3.0 inches (96 mm) deep was made from a piece of graphite foil (GRAFOIL ®, Union Carbide, Carbon Products Division, Cleveland, Ohio) measuring about 10.0 inches (254 mm) long by about 10.0 inches (254 mm) wide by about 0.015 inch (0.38 mm) thick. Four parallel cuts, 3.0 inches (76 mm) from the side and about 3.0 inches (76 mm) long were made into the graphite foil. The cut graphite foil was then folded and stapled to form the graphite foil box.

A parent metal, comprising by weight about 3 percent strontium and the balance aluminum and measuring about 4.0 inches (102 mm) long by about 4.0 inches (102 mm) wide by about 1.0 inch (25 mm) thick was coated on one side thereof measuring about 4.0 inches (102 mm) long by about 4.0 inches (102 mm) wide with a slurry comprising by weight about 90% −325 mesh (particle size less than about 45 microns) aluminum alloy powder and the balance ethanol. The −325 mesh aluminum alloy powder was nominally comprised by weight of about 7.5–9.5% Si, 3.0–4.0% Cu, $\leq$2.9% Zn, 0.2–0.3% Mg, $\leq$1.5% Fe, $\leq$0.5% Mn, $\leq$0.35% Sn, and the balance aluminum. The aluminum alloy powder-coated parent metal was then placed into the graphite foil box such that the uncoated surfaces of the parent metal contacted the inner surfaces of the graphite foil box.

A fabric preform measuring about 4.0 inches (102 mm) long by about 4.0 inches (102 mm) wide by about 0.06 inch (1.6 mm) thick was made within the graphite foil box and on the aluminum alloy powder coated surface of the parent metal by stacking four layers of 12 harness satin weave (HSW) silicon carbide fabric (NICALON ™ obtained from Dow Corning Corporation, Midland, Mich.) onto the parent metal. About 0.5 inch (13 mm) of a 500 grit (average particle diameter of about 17 lm) alumina powder (El ALUNDUM ®, Norton Company, Worcester, Mass.) was poured over the 12-HSW fabric preform and leveled. The sides of the graphite foil box that extended beyond the level of the alumina powder covering the 12-HSW fabrics were folded over onto the alumina powder to form a lid for the graphite foil box.

A lay-up was formed in a graphite refractory container by placing and leveling about 0.5 inch (13 mm) of a 500 grit (average particle diameter of about 17 microns) alumina powder into the bottom of the graphite refractory container. The graphite foil box and its contents comprising the aluminum alloy powder-coated parent metal and the 12-HSW silicon carbide fabric preform were placed into the graphite refractory container and onto a 500 grit (average particle diameter of about 17 microns) alumina. Additional 500 grit alumina was placed into the graphite refractory container into the void defined by the inner surface of the graphite refractory container and the outer surface of the graphite foil box. The 500 grit (average particle diameter of about 17 lm) alumina powder also covered the top lid of the graphite foil box and its contents.

The lay-up comprising the graphite refractory container and its contents comprising the graphite foil box and its contents were placed into a retort lined resistance heat furnace and the retort door was closed. The furnace and its contents were heated to about 100° C. at (particle diameter less than about 45 microns) magnesium powder (AESAR ®, Johnson Matthey, Seabrook, N.H.). The filler material mixture was mixed in a plastic jar on a rotating jar mill for about an hour.

A graphite foil box having an inner cavity measuring about 3 inches (76 mm) long by about 3 inches (76 mm) wide and about 2.5 inches (64 mm) deep was made from graphite foil (PERMA FOIL, TTAmerica, Portland, Ore.). The graphite foil box was made from a piece of graphite foil, measuring about 8 inches (203 mm) long by about 8 inches (203 mm) wide by about 0.15 inches (4 mm) thick. Four parallel cuts about 2.5 inches (64 mm) from the side and about 2.5 inches (64 mm) long, were made into the graphite foil. The graphite foil was then folded into the graphite foil box and stapled together. Metal was removed from Sample A by first pouring about 0.5 inch (13 mm) of the mixture of filler material and magnesium powder into one of the graphite foil boxes. The filler material mixture was levelled and hand tapped until smooth. A bar of the silicon carbide fiber reinforced alumina

TABLE II

| Sample ID | Composite | Geometry | Filler Material For Metal Removal | Infiltration Enhancer Precursor | Processing Temperature | Processing Time At Processing Temperature | Atm. |
|---|---|---|---|---|---|---|---|
| A | SiC$_f$/Al$_2$O$_3$[7] | bar | 1000 grit Al$_2$O$_3$[2] 10% | −325 mesh Mg[3] | 850° C. | 10h | N$_2$ |
| B | SiC$_f$/AlN[7] | irregular | 1000 grit Al$_2$O$_3$[2] 10% | −325 mesh Mg[3] | 750° C. | 10h | N$_2$ |

[2]E-67 tabular alumina, Norton Co., Worcester, MA.
[3]AESAR ®, Johnson Matthey Corporation, Seabrook, New Hampshire
[7]NICALON ™ silicon carbide fiber (obtained from Dow Corning Corporation, Midland, MI) reinforced composite.

a rate of about. 300° C. per hour. At about 100° C., the retort was evacuated to about 30.0 inches (762 mm) mercury (Hg) vacuum and maintained at about 30.0 inches (762 mm) Hg vacuum to about 150° C.. At about 150° C., nitrogen was introduced into the retorted at a flow rate of about 4 liters per minute. The furnace and its contents were then heated to about 900° C. at about 300° C. per hour. After about 200 hours at about 900° C., the furnace and its contents were cooled to about room temperature at a rate of about 300° C. per hour. At about room temperature, the retort door was opened and the lay-up was removed. The lay-up was disassembled, the preform was removed from within the graphite foil box, and it was observed that an oxidation reaction product comprising aluminum nitride had grown into and substantially completely embedded the silicon carbide fabric preform thereby forming a ceramic matrix composite body reinforced with a plurality of fabric layers of 12-HSW NICALON ™ silicon carbide as reinforcement.

Table II contains a summary of the parameters used to practice the metal removal step of the present invention on Samples A and B. Specifically, Table II contains the dimensions of the Sample, the filler material used for metal removal, the infiltration enhancer precursor, the processing temperature, the processing time at the processing temperature, and the processing atmosphere.

FIG. 1A depicts a cross-sectional schematic of the setup used in this series of tests to remove the metallic constituent from Samples A and B.

After the formation of the silicon carbide fiber reinforced alumina composite body of Sample A had been achieved, the metal removal process was effected. Specifically, a filler material mixture was formed, comprising by weight about 90 percent filler, which comprised 1000 grit (average particle diameter of about 5 microns) Al$_2$O$_3$ (E-67 tabular alumina, Norton Co., Worcester, Mass.) and about 10 percent by weight −325 mesh composite of Sample A, and measuring about 1.7 inches (43.8 mm) long by about 0.25 inch (6.3 mm) wide by about 0.2 inch (4.5 mm) thick was placed onto the filler material mixture within the graphite foil box and covered with another about 0.5 inch (13 mm) of the filler material mixture which was again levelled and hand tapped until smooth.

The graphite foil box containing Sample A was then placed into a graphite refractory container having inner dimensions of about 9 inches (229 mm) long by about 9 inches (229 mm) wide by about 5 inches (127 mm) deep and having a wall thickness of about 0.5 inch (13 mm). The graphite refractory container and its contents were then placed into a controlled atmosphere resistance heated furnace, the furnace door was closed and the furnace was evacuated to at about 30 inches (762 mm) Hg. After about 15 hours at about 30 inches (762 mm) of mercury vacuum, the vacuum was shut off and nitrogen gas was introduced into the furnace chamber at a flow rate of about 1 liter/minute. The operating pressure of the chamber was about 16.7 pounds per square inch (1.2 kg/cm$^2$) with a nitrogen flow rate of about 1 liter/minute. The furnace was heated to about 850° C. at about 200° C. per hour. After about 10 hours at about 850° C., the power to the furnace was interrupted and the graphite refractory container and its contents were allowed to cool within the furnace to about room temperature. Once at room temperature, the graphite refractory container and its contents were removed and the lay-up for Sample A was disassembled to reveal that the metallic constituent comprising an aluminum alloy in the silicon carbide fiber reinforced alumina composite had been drawn out from the composite body during the metal removal process.

The setup for the removal of the metallic constituent from Sample B was substantially the same as that described for Sample A of this Example and is schematically illustrated in FIG. 1A. The nitrogen flow rate to effect removal of the metallic constituent from Sample B was about two liters per minute. The controlled atmosphere furnace was heated to about the processing temperature of about 750° C. at a rate of about 200° C. per hour, held at about the processing temperature for about 10 hours. After about 10 hours at the processing temperature, at least a portion of the metallic constituent was removed from within the ceramic matrix composite body. Specifically, the metallic constituent spontaneously infiltrated the filler material mixture comprising substantially a 1000 grit (average particle diameter of about 5 microns) alumina and a −325 mesh (particle diameter less than about 45 microns) magnesium infiltration enhancer precursor. The furnace and its contents were cooled to about room temperature. At about room temperature, the setup was removed from the furnace, disassembled, and weight loss due to the removal of the metallic constituent from Sample B was noted.

EXAMPLE 3

This Example illustrates, among other things, that ceramic matrix composite bodies whose metallic constituent has been substantially completely removed by the instant invention retain a greater portion of their flexural strength, as measured at about room temperature, when measured at elevated temperatures in comparison to substantially similar ceramic matrix composite bodies whose metallic constituent has not been removed by the process of the present invention. Specifically, this Example compares the flexural strengths measured at about room temperature, at about 1000° C. and at about 1200° C. of silicon carbide fiber reinforced alumina composite bodies and the flexural strengths of silicon carbide fiber reinforced alumina composite bodies whose metallic constituent has been substantially removed by the instant invention.

The silicon carbide fiber reinforced alumina composite bodies of this Example (i.e., Samples C–H) were made substantially in accordance with the methods of Sample A in Example 2.

FIG. 1A depicts a cross-sectional schematic view of the setup used with Samples F through H to remove the metallic constituent from the silicon carbide fiber reinforced alumina composite bodies in this Example. Each experimental setup in Table III comprised an alumina crucible, a filler material mixture comprised of a filler material and an infiltration enhancer precursor, and a silicon carbide fiber reinforced alumina composite body surrounded by the filler material mixture and contained within the alumina crucible. The alumina crucibles for the setups used with Samples F, G and H were obtained from McDaniel Refractory Co., Beaver Falls, Pa. and measured about 3.9 inches (100 mm) long by about 1.8 inches (45 mm) wide by about 0.75 inch (19 mm) tall.

The setups were placed into a resistance heated controlled atmosphere furnace and nitrogen was introduced. For Samples F, G and H, the nitrogen flow rate was about 1000 sccm. The furnace and its contents were then heated at a rate of about 200° C. per hour to about 750° C. After about 5 hours at about 750° C., during which time the metallic constituent from within the fiber reinforced ceramic composite bodies spontaneously infiltrated the filler material mixture comprised of the filler material and the infiltration enhancer precursor, the furnace and its contents were allowed to cool to about room temperature. At about room temperature, each setup was removed from the furnace, disassembled, and it was noted that the samples experienced a weight loss due primarily to the removal of the metallic constituent from within the ceramic matrix composite body.

The flexural strengths of Samples C–H were measured using the procedure defined by the Department of the Army's proposed MIL-STD-19424 (Nov. 21, 1983). This test was specifically designed for strength measurements of high-performance ceramic materials. The flexural strength is defined in this standard as the maximum outer fiber stress at the time of failure. A four-point-$\frac{1}{4}$-point flexural test was used. The flexural strengths were measured with test bars, measuring about 2 inches (50 mm) long by about 0.24 inch (6 mm) wide by about 0.12 inch (3 mm) thick, from the respective fiber reinforced ceramic composite bodies. The height and width of the test bars were measured with a precision of about 390 microinch (0.01 mm). The test bars were subjected to stress applied at four points by two lower span bearing points and two upper span bearing points. The lower span bearing points were about 1.6 inches (40 mm) apart, and the upper span bearing points were about 0.79 inch (20 mm) apart. The upper span was centered over the lower span, so that the load was applied substantially symmetrically on the test bar. The flexural strength measurements were made by a universal testing machine (Syntech, Stoughton, Mass.). The crosshead speed during testing was about 0.02 inch per minute (0.55 mm/minute). Flexural strengths determined at about 1000° C. and about 1200° C. were made by using a universal testing machine equipped with an air atmosphere resistance heated furnace (Advanced Test Systems, Butler, Pa.).

Table III contains a comparison of the average flexural strengths of silicon carbide fiber reinforced alumina composite bodies whose metallic constituents were not removed (i.e., "as-grown" bodies) with the flexural strengths of silicon carbide fiber composite bodies whose metallic

TABLE III

| | | Four Point Flexural Strengths (MPa) | | | |
|---|---|---|---|---|---|
| Sample ID | Condition | Composite | Flexural Strength Test Temp. | Average Flexural Strength (MPa) | Std. Dev. Strength (MPa) |
| C | As grown | $SiC_f/Al_2O_3^7$ | Room Temperature | 469 | 49 |
| D | As grown | $SiC_f/Al_2O_3^7$ | 1000° C. | 344 | 11 |
| E | As grown | $SiC_f/Al_2O_3^7$ | 1200° C. | 252 | 29 |
| F | metallic constituent removed | $SiC_f/Al_2O_3^7$ | Room Temperature | 480 | 30 |
| G | metallic constituent removed | $SiC_f/Al_2O_3^7$ | 1000° C. | 407 | 26 |
| H | metallic constituent | $SiC_f/Al_2O_3^7$ | 1200° C. | 347 | 63 |

TABLE III-continued

| | | Four Point Flexural Strengths (MPa) | | | |
|---|---|---|---|---|---|
| Sample ID | Condition | Composite | Flexural Strength Test Temp. | Average Flexural Strength (MPa) | Std. Dev. Strength (MPa) |
| | removed | | | | |

[7]12 harness satin weave fabric comprising NICALON ™ silicon carbide fibers obtained from Dow Corning Corporation, Midland, Michigan constituent was removed by the present invention, at temperatures of about: room temperature, about 1000° C. and about 1200° C. Specifically, Table III shows that the average flexural strength, measured at about 1200° C., of the as-grown silicon carbide fiber reinforced alumina composite body (i.e., Sample E) as compared to the average flexural strength of Sample C measured at about room temperature, is only about 54% as strong. In contrast, the average flexural strength measured at about 1200° C., of the silicon carbide fiber reinforced alumina composite body whose metallic constituent was substantially removed by the instant invention (i.e., Sample H), was about 72% of the room temperature flexural strength of Sample F. Thus, this Example demonstrates that by removing the metallic constituent by the present invention from a silicon carbide fiber reinforced alumina composite body, a greater portion of the body's flexural strength measured at room temperature is retained at elevated temperatures in comparison to strength retention at elevated temperatures of a fiber reinforced ceramic composite body in the as-grown condition.

EXAMPLE 4

The following Example demonstrates that by subjecting fiber reinforced ceramic composite bodies to the method of the present invention, the ceramic matrix composite bodies at least maintain their room temperature fracture toughness at elevated temperatures. A series of fiber preforms were made substantially in accordance with the methods described in Example 1, except that the first layer and eighth layer of the fabric preform comprised 12 harness satin weave fabric instead of 8 harness satin weave fabric and the temperature of the methyltrichlorolsilane (MTS) bath used during the formation of silicon carbide coatings was maintained at about 18° C. instead of about 25° C. The lay-up for the growth of the fiber reinforced ceramic composite body included an alumina-bonded wollastonite shell fabricated substantially in accordance with the methods described in Example 1, and the composite growth process was substantially the same as that described in Example 1. The resultant ceramic matrix composite bodies were subjected to a metal removal treatment substantially the same as that described in Example 1. The samples were subsequently machined to form mechanical test samples which were used to determine both the flexural strength and the fracture toughness of the fiber reinforced ceramic composite bodies both as a function of test temperature.

Table IV summarizes the results of these tests. The methods for measurement of the flexural strength was substantially in accordance with the methods described in Example 1. The method of Munz, Shannon and Bubsey (International Journal of Fracture, Vol. 16 (1980) R137–R141) was used to determine the fracture toughness of the silicon carbide fiber reinforced ceramic composite bodies. The fracture toughness was calculated from the maximum load of Chevron notch specimens in four point loading. Specifically, the geometry of each Chevron notch specimen was about 1.8 to 2.2 inches (45 to 55 mm) long, about 0.12 inch (3 mm) wide and about 0.15 inch (3.75 mm) high. A Chevron notch was cut in each specimen with a diamond saw to permit the propagation of a crack starting at the notch and traveling through the sample. The Chevron notched specimens, having the apex of the Chevron notch pointing downward, were placed into a fixture within a Universal test machine. The notch of the Chevron notch specimen, was placed between two pins about 1.6 inches (40 mm) apart and about 0.79 inch (20 mm) from each pin. The top side of the Chevron notch specimen was contacted by two pins about 0.79 inch (20 mm) apart and about 0.39 inch (10 mm) from the notch. The maximum load measurements were made with a Sintec Model CITS-2000/6 Universal Testing Machine (System Integration Technology Incorporated, Straton, Mass.). A crosshead speed of 0.02 inches/minute (0.58 millimeters/minute) was used. The load cell of the Universal testing machine was interfaced to a computer data acquisition system. The Chevron notch sample geometry and maximum load were used to calculate the fracture toughness of the material. Several samples were used to determine an average fracture toughness for a given group of parameters (e.g., temperature, fiber reinforced ceramic composite body, etc.).

Table IV summarizes the results of the measurements of the average flexural strength, the maximum flexural strength and the average fracture toughness all as a function of temperature, for Samples J, K and L, as treated in accordance with the present invention. Moreover, the fracture toughness of an untreated Sample I is compared to a treated Sample J. The data in Table IV shows that the fracture toughness of a fiber reinforced ceramic composite body with its metallic constituent substantially completely removed is not significantly marked elevated temperatures. In

TABLE IV

| Sample ID | Sample Condition | Test Temp. | Average Flexural Strength (MPa) | Maximum Flexural Strength (MPa) | Average Fracture Toughness (MPa-m1/2) |
|---|---|---|---|---|---|
| I | As Grown | RT | — | — | 19 ± 1 |
| J | Metallic constituent removed | RT | 450 (31)* | 563 | 21 ± 1 |
| K | Metallic constituent removed | 1000° C. | 400 (7)* | 432 | 23 ± 1 |
| L | Metallic constituent removed | 1200° C. | 350 (14)* | 406 | 18 ± 1 |

*The number in parentheses indicates the number of sample test.

addition, the fracture toughness of a treated sample does not vary significantly from the fracture toughness of an untreated composite body.

EXAMPLE 5

The following Example demonstrates, among other things, that fiber reinforced ceramic composite bodies exhibiting excellent fracture toughness can be produced by (1) coating a fabric preform with coatings comprising silicon carbide (SiC)/boron nitride (BN); (2) growing an oxidation reaction product by a reaction of a parent metal with a vapor-phase oxidant to embed the SiC/BN-coated fabric preform and (3) removing the metallic constituent from the grown fiber reinforced ceramic composite body by the methods of the present invention.

A NICALON ™ silicon carbide fiber reinforced alumina composite body plate measuring substantially the same as that in Example 1 was formed substantially in accordance with the methods of Example 1. Specifically, the fabric preform lay-up, the formation of both the boron nitride and silicon carbide coatings, the growth of the alumina oxidation reaction product embedding the SiC/BN-coated fabric preform and the removal of the metallic constituent from the fiber reinforced ceramic body were performed substantially in accordance to the methods of Example 1.

The fracture toughness of the fiber reinforced ceramic composite body, was measured substantially in accordance with the method of Example 4 except that specimen size used to determine the toughness measured from about 1.0 to about 1.2 inches (25 to 30 mm) long, about 0.15 inch (3.75 mm) high and about 0.12 inch (3 mm) wide. The apex of the Chevron notch pointed up within the Universal test machine. The notch of the specimen was placed between two pins about 0.39 inch (10 mm) apart and about 0.2 inch (5 mm) from each pin. The top side of the specimen was contacted by two pins about 0.79 inch (20 mm) apart and about 0.39 inch (10 mm) from the notch. Three specimens were tested to determine an average fracture toughness for a specific test temperature.

The fracture toughness measured at about room temperature at about 1200° C. and about 1300° C. of the fiber reinforced ceramic composite body of this Example were $35.3+1$ MPa-m$^{\frac{1}{2}}$, $19.6+1$ MPa-m$^{\frac{1}{2}}$ and $18.7+1$ MPa-m$^{\frac{1}{2}}$, respectively.

EXAMPLE 6

This Example demonstrates, among other things, the use of a Si3N4 powder filler material in conjunction with a magnesium (Mg) infiltration enhancer precursor to effect the removal of at least a portion of the metallic constituent of a fiber reinforced ceramic composite body. Additionally, this Example demonstrates that a second metallic constituent removal treatment can be performed on a machined surface of a fiber reinforced ceramic composite body while substantially maintaining the finish of the machined surface.

Figure 5A:
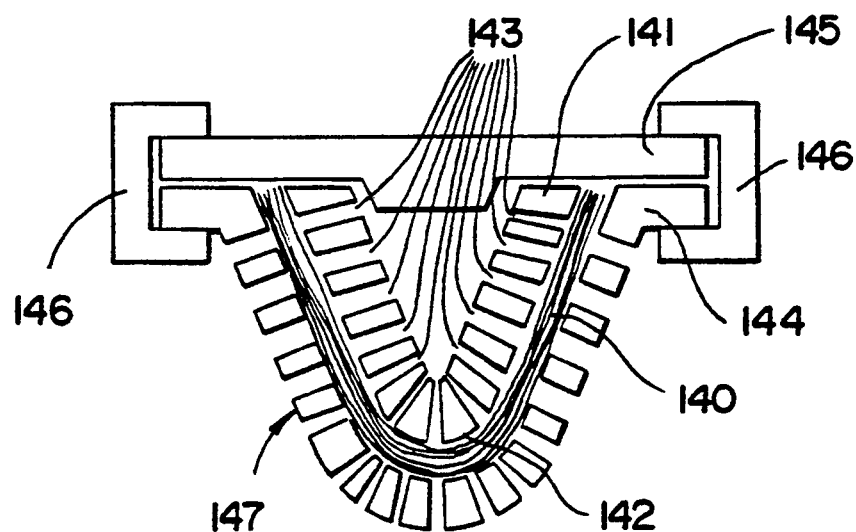
FIG. 5A is a schematic cross-sectional representation of a graphite containment fixture for forming a "V"-shaped fabric preform as discussed in Example 6.

In reference to FIG. 5A, a trough-shaped fabric preform 140 having a "V"-shaped cross-section was formed by stacking eight layers of harness satin weave (HSW) fabric substantially in accordance with the sequence of Example 1, except that the fabrics were sprayed using an air gun with a mixture comprised by weight of about 10% ELVACITE® 2045 isobutyl methacrylate (DuPont, Wilmington, Del.) and about 90% acetone prior to stacking. The stacked fabrics were then formed around a "V"-shaped male graphite tool 141 having an outer surface 142 corresponding to the desired inner surface of the fabric preform 140. The graphite tools of this Example were machined from Grade AXF-5Q graphite (Poco Graphite, Decature, Tex.). The "V"-shaped male graphite tool 141 had a wall thickness of about 0.38 inch (9.6 mm) and was perforated over substantially all of its surface with holes 143 having diameters of about 0.125 inch (3.2 mm). To enable the fabric preform 141 to conform to the outer surface of the "V"-shaped male graphite tool 141, the fabric preform 140 was wet with acetone. The fabric preform 140 on the "V"-shaped male graphite tool 141 was then inserted into a female graphite tool 144 having an inner surface shaped to correspond to the desired shape of the outer surface of the fabric preform 140. A graphite retaining member 145 was engaged into the "V"-shaped female graphite tool 144 and secured by several clamping members 146 to compress the fabric preform 141 and to form a graphite containment fixture 147 to facilitate coating the fabric preform in a chemical vapor infiltration apparatus.

The graphite containment fixture 147 and its contents were then placed into an air atmosphere furnace to remove the isobutyl methacrylate. The furnace and its contents were heated from about room temperature to about 450° C. in about 8 hours, held at about 450° C. for about 5 hours, during which time the isobutyl methacrylate was removed, and cooled to about room temperature in about 13 hours.

The graphite containment fixture 147 containing the fabric preform 140 was then placed into the reactor chamber of the chemical vapor infiltration apparatus described in Example 1. A boron nitride coating was formed substantially in accordance with the method of Example 1 except that the time the furnace was maintained at about 800° C. was about 5 hours. After the fabric preform had been coated with boron nitride, the gas mixtures within the reactor and the temperature of the reactor chamber were altered to deposit silicon carbide substantially in accordance with the methods of Example 1 except that the coating time was about 5 hours before the furnace was cooled to about 200° C. After the reactor chamber and its contents had cooled to about 200° C., the graphite containment fixture 147 was removed from the reactor chamber and disassembled to provide a SiC/BN-coated "V"-shaped fabric preform. The SiC/BN-coated fabric preform was then replaced in the reactor chamber and additional silicon carbide was deposited on the fabric preform substantially in accordance with the methods of Example 1 to form a trough-shaped preform 150.

Figure 5B:
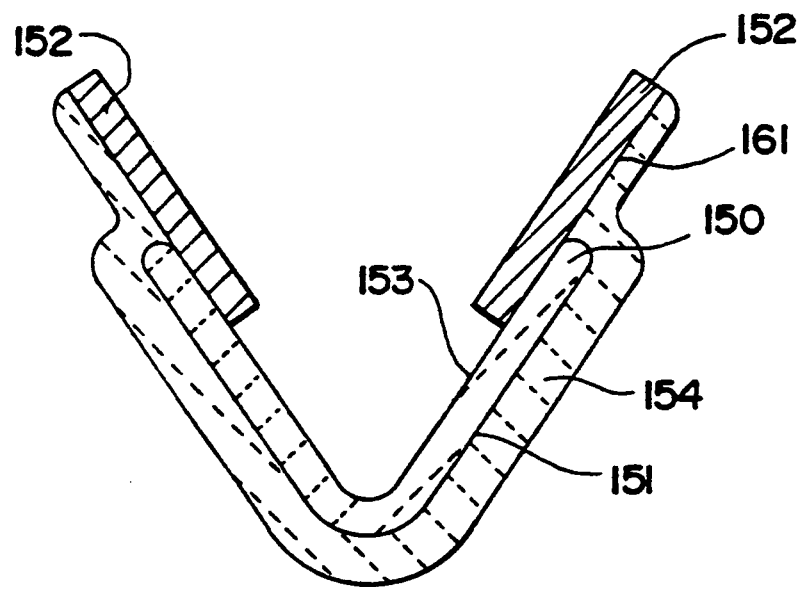
FIG. 5B is a schematic cross-sectional representation of the formation of a shell on a "V"-shaped fabric preform as discussed in Example 6.

FIG. 5B shows a schematic cross-sectional view of a trough-shaped preform 150 measuring about 9 inches long (228.6 mm) and about 1 inch (25 mm) deep (i.e., as measured from a top portion of the trough to a bottom portion of the trough) fabricated from 8 layers of harness satin weave nicalon ™ silicon carbide fibers (obtained from Dow Corning Corporation, Midland, Mich.) and having a "V"-shaped cross section. The trough shaped preform 150 contained pores along an outer surface 151 which were impregnated with molten red wax (Yakes Manufacturing Co., Chicago, Ill.). Strips 152 of high temperature wax sheet having an adhesive backing on one side (Kit Collin Company, Cleveland, Ohio) and measuring about 9 inches (227 mm) long, about 2–2.25 inches (51–57 mm) wide and about 0.25 inch (6.4) thick were attached by the adhesive portion thereon to a portion of an inner surface 153 of the trough-shaped preform 150, thereby extending the length of each side of the "V"-shaped preform by about 1.75–2.0 inches (45–51 mm). A slurry mixture comprised by weight of about 5 parts BLUONIC® A colloidal alumina (West Bond Corp., Wilmington, Del.) and about 2 parts −325 mesh (particle diameter less than about 45 microns) wollastonite (a calcium silicate) was made by hand mixing the materials together.

A shell 154 was formed by painting the slurry mixture onto the outer surface 161 of the wax extension 152 and the outer surface 151 of the wax coated trough-shaped preform with a one inch foam brush. Coarse wollastonite was then sprinkled liberally onto the slurry mixture to prevent runoff and to form a first precursor layer of the shell 154. This procedure was repeated after an about 0.5 hour drying period. When the slurry mixture/coarse wollastonite layers reached a thickness of about 0.25 inch (6.4 mm), the wax coated trough-shaped preform 150 was dried at about room temperature for about 24 hours. The about 0.25 inch (6.4 mm) thick coating nominally comprised about 12 slurry mixture/coarse wollastonite layers. The substantially dry wax coated trough-shaped preform was placed into an air atmosphere furnace, which was maintained under an exhaust hood, and the furnace and its contents were heated to about 120° C. and held at that temperature for about 6 hours, during which time the wax melted leaving behind an unfired precursor to the shell 154. The furnace and its contents were then heated to about 950° C. in about 2 hours and held at about 950° for about 4 hours to substantially completely remove any residual wax and ensure the sintering of the colloidal alumina and wollastonite, thereby forming the shell 154. The furnace and its contents were then cooled to about room temperature.

About 40 grams of VASELINE® petroleum jelly vehicle (Cheseborough Ponds, Inc., Greenwich, Conn.) were placed into a small aluminum weighing dish and heated on a hot plate set at medium heat until the jelly turned into a liquid. A clean sable brush was then used to substantially completely coat the inner surface 153 of the trough-shaped preform 154 to provide an interface for the application of a nickel oxide powder mixture 155. Specifically, a mixture 155 comprising about 8 grams of −325 mesh (particle diameter less than about 45 microns) nickel oxide powder and about 16 grams of ethanol was applied with a sponge brush to substantially completely cover the petroleum jelly coated surface to form a growth lay-up. The growth lay-up comprising the wollastonite shell 154 containing the trough-shaped preform 150 was placed into a refractory container 156 such that opposite longitudinal ends of the wollastonite shell 154 on the outer surface of the preform 150 were supported by two partially hollowed-out fire bricks 157 (i.e., cavities were created in each of the two fire bricks so as to be complementary to each longitudinal end of the wollastonite shell 154) all of which were surrounded by a wollastonite bedding 158.

Figure 5C:
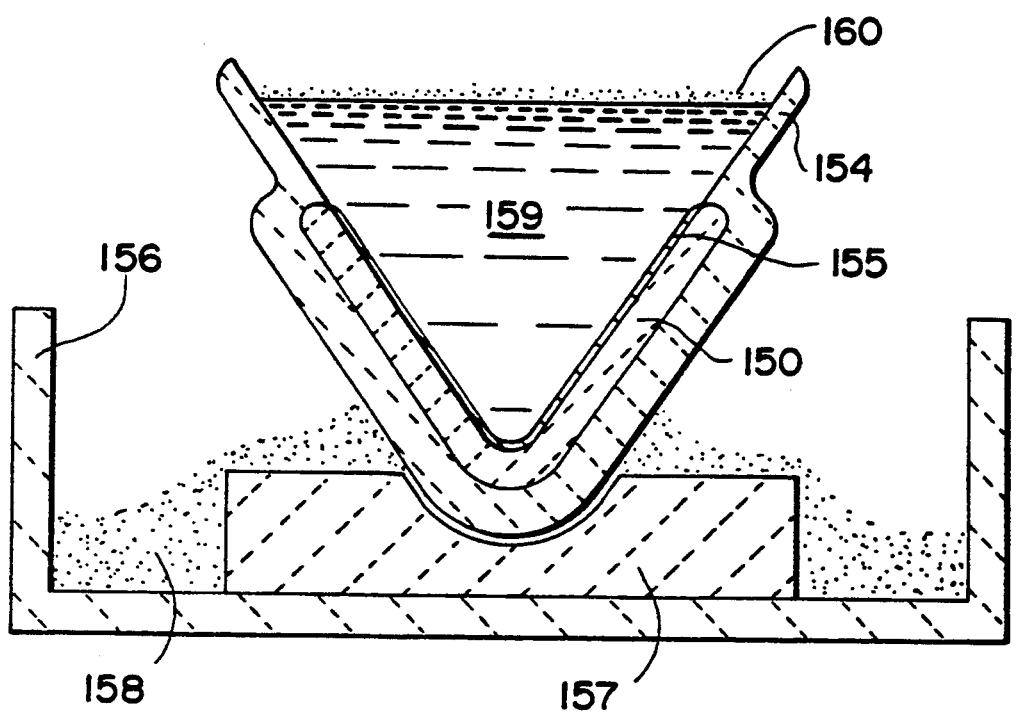
FIG. 5C is a schematic cross-sectional representation of a lay-up for forming a fiber reinforced ceramic composite body having a "V"-shaped cross section.

The refractory boat and its contents were then placed into a resistance heated air atmosphere furnace and heated from about room temperature to about 700° C. Simultaneously about 800 grams of a parent metal was melted, the parent metal comprising by weight about 9.5 to 11 percent silicon, 3.0 to 4.0 percent copper, 2.7 to 3.5 percent zinc, 0.2 to 0.3 percent magnesium, $\leq 0.01$ percent calcium, $\leq 0.10$ titanium, 0.7 to 1.0 percent iron, $\leq 0.5$ percent nickel, $\leq 0.5$ percent manganese, $\leq 0.35$ percent tin, $\leq 0.001$ percent beryllium, $\leq 0.15$ percent lead, and the balance aluminum. At about 700° C., the molten parent metal 159 was poured into the cavity of the trough-shaped preform 150 to substantially completely fill the cavity, as shown in FIG. 5C. Then, wollastonite powder 160 was poured onto the surface of the molten parent metal 159 and the furnace door was closed. FIG. 5C is a cross-sectional schematic of the setup as contained in the furnace. The furnace and its contents were then heated from about 700° C. to about 950° C. at about 400° C. per hour. After about 125 hours at about 950° C., the furnace and its contents were cooled from about 950° C. to about 700° C. at about 400° C. per hour. At about 700° C., the furnace door was opened and the refractory boat 156 and its contents were removed. The wollastonite-coated trough-shaped preform 150 within the refractory boat 156 was then removed and residual parent metal 159 was decanted. The wollastonite shell 154 was then separated from the growth infiltrated trough-shaped preform 150 and the preform was buried underneath silica sand to cool the preform to about room temperature. At about room temperature, the trough-shaped preform 150 was removed from the sand and it was observed that oxidation reaction product had grown into and embedded the silicon carbide/boron nitride-coated nicalon TM silicon carbide harness satin weave fabric preform to form a ceramic composite body 170 comprising silicon carbide/boron nitride-coated silicon carbide fiber reinforcement embedded by alumina oxidation reaction product. The surface of the ceramic composite body was then cleaned in a sandblaster.

Once the ceramic composite body 170 had been successfully manufactured, the metal removal was begun. Two filler material mixtures were made. A first filler material mixture 171 comprised by weight of about 10 percent −325 mesh (particle diameter less than 45 microns) magnesium powder (Reade Manufacturing Co., Lakehurst, N.J.) and about 90 percent E-67 1000 grit (average particle diameter of about 5 microns) alumina (Norton Company, Worcester, Mass.) was combined in a plastic jar with alumina milling balls and the plastic jar and its contents were placed on a rotating jar mill to substantially completely mix the filler material mixture. A second filler material mixture 172 comprised by weight of about 10% −325 mesh (particle diameter less than about 45 microns) magnesium powder (Reade Manufacturing Company, Lakehurst, N.J.) and about 90% silicon nitride (Grade LC 12 SX having a particle diameter less than about 0.5 microns and obtained from Hermann C. Stark, New York, N.Y.) were combined in a plastic jar and placed on a rotating jar mill and substantially completely mix the filler material mixture.

Figure 5D:
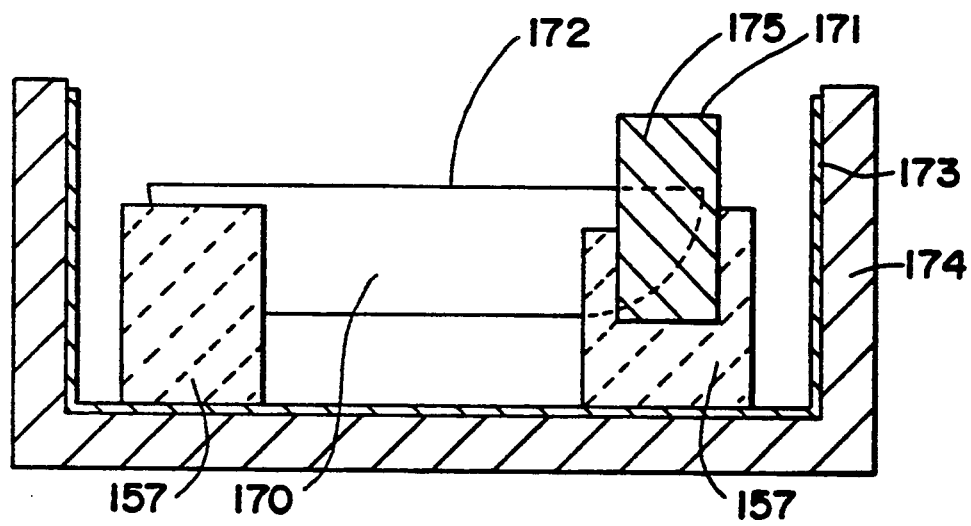
FIG. 5D is a schematic side view representation of a typical lay-up for removing a metallic constituent from an interior cavity of a fiber reinforced ceramic composite body.

The ceramic composite body 170 was placed into a graphite foil 173 lined graphite boat 174 and supported by two fire bricks 157, as depicted in FIG. 5D. The silicon nitride/magnesium filler material mixture 172 was then packed into the inner cavity of the ceramic composite body 170. A graphite foil box 175 was constructed around one end of the ceramic composite body 170 and filler material mixture 171 comprised of alumina and magnesium was poured into the space between the ceramic composite body 172 and the graphite foil box 175. The graphite boat 174 and its contents were then placed into a controlled atmosphere resistance heated furnace and the furnace was sealed. After the furnace and its contents had been evacuated to about 30 inches (762 mm) of mercury (Hg) vacuum, nitrogen was introduced into the furnace chamber at about 6 liters per minute. The furnace and its contents were then heated from about room temperature to about 750° C. in about 4 hours while maintaining a nitrogen flow rate of about 6000 sccm. After about 5 hours at about 750 with a nitrogen flow rate of about 6000 sccm, the furnace and its contents were cooled to about room temperature in about 4 hours. At about room temperature, the nitrogen flow rate was interrupted and the furnace was opened and the graphite boat 174 and its contents were removed. After disassembling the graphite boat and its contents, it was revealed that the metallic silicon carbide/boron nitride-coated silicon carbide fiber reinforced alumina composite body 170 had experienced a weight loss of about 5.63 percent.

The ceramic composite body, after cleaning by sandblasting, was then subjected to machining and it was noted that some isolated metallic channels of the fiber reinforced ceramic composite body had been exposed.

Figure 5E:
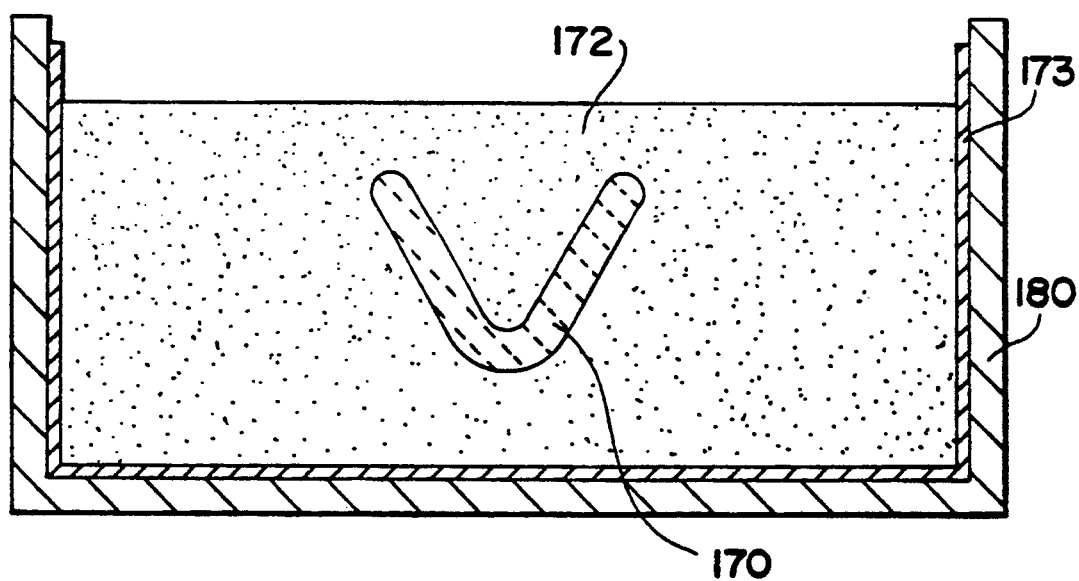
FIG. 5E is a schematic cross-sectional representation of a lay-up for removing metallic constituent from machined surfaces of a fiber reinforced ceramic composite body.

A second metal removal process was then performed. Specifically, as depicted in FIG. 5E the silicon nitride/magnesium filler material mixture was placed into the bottom of a graphite foil lined 173 stainless steel boat 180 and the ceramic composite body 170 was placed onto the silicon nitride/magnesium filler material mixture 172. Additional filler material mixture 172 was then poured into the graphite foil-lined stainless steel boat 180 and around the ceramic composite body 170 to substantially completely surround the ceramic composite body 170. The stainless steel boat 180 and its contents were then placed into a controlled atmosphere furnace and the furnace door was closed. After the furnace and its contents had been evacuated to about 30 inches (762 mm) of mercury (Hg) vacuum, nitrogen was introduced into the furnace chamber at a flow rate of about 7000 sccm. The furnace and its contents were then heated from about room temperature to about 750° C. in about 4 hours while maintaining a nitrogen flow rate of about 7000 sccm. After about 5 hours at about 750° C. with a nitrogen flow rate of about 7000 sccm, the furnace and its contents were cooled to about room temperature in about 4 hours. At about room temperature, the nitrogen flow rate was interrupted and the furnace was opened and the stainless steel boat 180 and its contents were removed. After disassembling the stainless steel boat and its contents, it was revealed that the freshly exposed metallic constituent of the silicon carbide reinforced composite body 170 had been substantially completely removed without substantially affecting the machined surface finish.

EXAMPLE 7

A ceramic matrix composite body made substantially in accordance with the teachings contained in U.S. Pat. No. 4,851,375, was formulated. Specifically, the ceramic matrix composite body comprised a 500 grit (average particle diameter of about 17 microns) silicon carbide reinforcement which had been embedded by an oxidation reaction product matrix comprising alumina and a metallic component comprising an aluminum alloy which was at least partially three dimensionally interconnected in the composite body.

After formation of the silicon carbide particulate reinforced alumina composite body had been achieved, the metal removal process was effected. Specifically, a material mixture was formed, comprising by weight about 90 percent filler, which consisted of 1000 grit (average particle diameter of about 5 microns) $Al_2O_3$ (E-67 tabular alumina, Norton Co., Worcester, Mass.) and about 10 percent −325 mesh (particle diameter less than about 45 microns) magnesium powder (AESAR ®, Johnson Matthey, Seabrook, N.H.). The material mixture was mixed in a plastic jar on a rotating jar mill for about an hour.

Two graphite foil boxes having inner cavities measuring about 3 inches (76 mm) long, about 3 inches (76 mm) wide and about 2.5 inches (64 mm) deep were made from graphite foil (PERMA-FOIL, TTAmerica, Portland, Ore.). The graphite foil boxes were made from pieces of graphite foil, measuring about 8 inches (203 mm) long by about 8 inches (203 mm) wide and about 0.15 inches (4 mm) thick. Four parallel cuts about 2.5 inches (64 mm) from the side and about 2.5 inches (64 mm) long, were made into the graphite foil. The graphite foil was then folded into the graphite foil box and stapled together. Sample M, referred to in Table V, was prepared for treatment by first pouring about 0.5 inch (13 mm) of the mixture of filler material and magnesium powder into one of the graphite foil boxes. The filler material mixture was levelled and hand tapped until smooth. A bar of the silicon carbide particulate reinforced alumina composite discussed above, and measuring about 1.7 inches (43.8 mm) long by about 0.25 inch (6.3 mm) wide and about 0.2 inch (4.5 mm) thick was placed onto the filler material mixture within the graphite foil box and covered with about another 0.5 inch (13 mm of the filler material mixture which was again levelled and hand tapped until smooth.

Sample N, not specifically referred to in any Table, was prepared for treatment by first pouring about one inch (25 mm) of the same filler material mixture used for Sample M into the second graphite foil box. The filler material mixture was levelled and again hand tapped until smooth. Another silicon carbide particulate reinforced composite, discussed above, measuring about 1.7 inches (43 mm) long by about 0.25 inch (6.3 mm) wide and about 0.2 inch (4.5 mm) thick was placed onto the filler material mixture and forced into the filler material mixture such that five sides of the composite body contacted the filler material mixture (i.e., was buried within the filler material mixture) and one side of the composite body measuring about 0.25 inch (6.3 mm) by about 1.7 inches (43 mm) was substantially flush with the surface of the filler material mixture and thus would be exposed to the infiltrating atmosphere, when supplied.

Both graphite foil boxes containing Samples M and N, respectively, were then placed into a solid graphite refractory container having inner dimensions of about 9 inches (229 mm) long, about 9 inches (229 mm) wide, about 5 inches (127 mm) deep and having a wall thickness of about 0.5 inch (13 mm). The graphite refractory container and its contents were then placed into a controlled atmosphere resistance heated furnace, the furnace door was closed and the furnace was evacuated to at least about 30 inches (762 mm) of mercury vacuum. After about 15 hours at about 30 inches of mercury vacuum, the vacuum was shut off and nitrogen gas was introduced into the furnace chamber at a flow rate of about 2 liters/minute. The operating pressure of the chamber was about 16.7 pounds per square inch (1.2 $kg/cm^2$) with a nitrogen flow rate of about 2 liters/minute. The furnace was heated to about 850° C. in about 4 hours. After about 10 hours at about 850° C., the power to the furnace was interrupted and the graphite refractory container and its contents were allowed to cool within the furnace to about room temperature. Once at room temperature, the graphite refractory container and its contents were removed and the lay-ups for each of Sample M and Sample N were disassembled to reveal that the metallic constituent comprising an aluminum alloy in each of the silicon carbide particulate reinforced alumina composite had been drawn out from each composite body during the process.

Figure 6A:
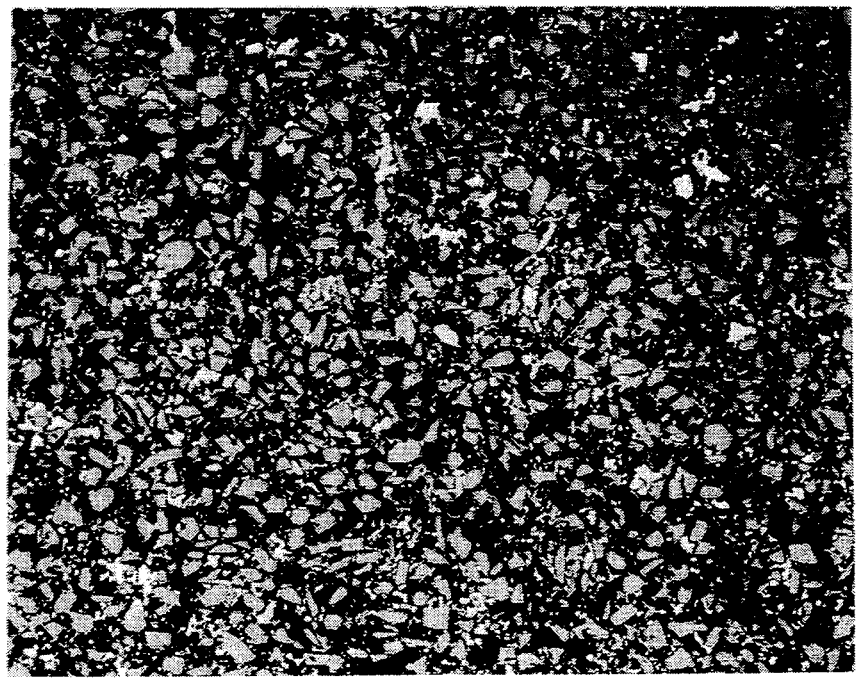
FIG. 6A is a photomicrograph taken at 200× of the microstructure of the ceramic matrix composite body of Example 7 (Sample M) prior to metal removal.
Figure 6B:
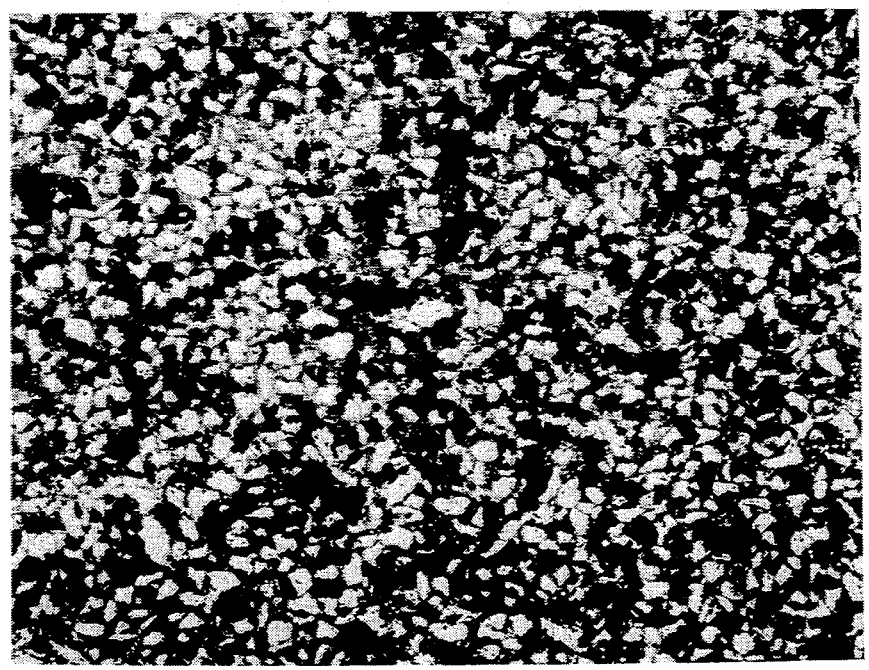
FIG. 6B is a photomicrograph taken at 200× of the microstructure of the ceramic matrix composite body of Example 7 (Sample M) after metal removal.

Thus, this Example demonstrates that the metallic constituent of a composite body can be drawn out by processing the body in a filler material mixture comprising a substantially inert component and an infiltration enhancer precursor. Moreover, this Example demonstrates that the metallic constituent of a composite body can be removed either by surrounding a composite body with a filler material mixture or by selectively contacting the filler material mixture with a surface of the composite body and thus, directionally removing at least a portion of the metallic constituent from the composite body. Specifically, FIG. 6A is a photomicrograph taken at about 200× of the microstructure of the silicon carbide particulate reinforced alumina composite prior to metal removal and FIG. 6B is a photomicrograph taken at about 200× of the microstructure of the silicon carbide particulate alumina composite after metal removal.

tion enhancer precursor, in the relative amounts shown in Table V, and which surrounded the SiC particulate reinforced alumina body, as shown in FIG. 1A. Each setup corresponding to Samples O, P, and Q (note that Sample M was discussed in Example 7) were placed into a resistant heated controlled atmosphere furnace and nitrogen was introduced into the furnace at a flow rate of about 0.5 liters/minute. The furnace was then heated to the processing temperature, as specified in Table V, at a rate of about 200° C./hour, held at the respective processing temperatures for the respective processing times shown in Table V, during which time the metallic constituent from within the ceramic matrix composite body spontaneously infiltrated the filler material mixture. After processing each of the samples for the respective times shown in Table V, the furnace was cooled to about room temperature. Once at room temperature, each setup was removed from the furnace and disassembled. It was noted that for Samples M, O, P, and Q, substantially all of the metallic constituent had been removed from each ceramic matrix composite body.

TABLE V

| Sample ID | Composite | Geometry | Filler Material | Infiltration Enhancer Precursor | Processing Temperature | Processing Time At Processing Temperature | Atm. |
|---|---|---|---|---|---|---|---|
| M | 500 grit SiC$_p$/Al$_2$O$_3$[1] | 5 × 6 × 43 mm bar | 1000 grit Al$_2$O$_3$[2] | 10% −325 mesh Mg[3] | 850° C. | 10h | N$_2$ |
| O | 500 grit SiC$_p$/Al$_2$O$_3$[1] | 3 × 5 × 6 mm bar | BN[4] | 10% −325 mesh Mg | 850° C. | 24h | N$_2$ |
| P | 500 grit SiC$_p$/Al$_2$O$_3$[1] | 3 × 5 × 6 mm bar | SiC-coated BN[6] | 10% −325 mesh Mg | 850° C. | 24h | N$_2$ |
| Q | 500 grit SiC$_p$/Al$_2$O$_3$[1] | 5 × 6 × 43 mm bar | glass powder[5] | 10% −325 mesh Mg | 650° C. | 10h | N$_2$ |

[1]Silicon Carbide particulate reinforced alumina composite.
[2]E-67 tabular alumina, Norton Co., Worcester, MA.
[3]AESAR ®, Johnson Matthey Corporation, Seabrook, New Hampshire
[4]SOHIO/Carborumdum Company, Niagra Falls, New York
[5]PYREX ® glass powder, Corning Glass Work, Corning, New York
[6]Synterials Corporation, Harndon, Virginia

EXAMPLE 8

This Example illustrates, among other things, that a variety of filler material mixtures comprising a substantially inert filler material or a reactive filler material can be used in combination with an infiltration enhancer precursor to remove at least a portion of a metallic constituent from metal reinforced ceramic composites (i.e., ceramic matrix composites). Specifically, the substantially inert filler materials used in this Example include Al$_2$O$_3$, BN, and SiC coated BN, while the substantially reactive filler material used in this Example includes PYREX® glass powder (Corning Glass Works, Corning, N.Y.).

Table V contains the experimental parameters for Samples M, O, P, and Q. Specifically the Table contains a description of the ceramic matrix composite body (which was substantially the same as the ceramic composite body discussed in Example 7) from which the metallic constituent was removed, the dimensions of the ceramic matrix composite body, the weight of the filler material, the weight percent of infiltration enhancer precursor added to the filler material to form the filler material mixture, the processing temperature, the processing time at the processing temperature and the processing atmosphere. FIG. 1A shows a cross-sectional schematic view of a setup similar to the ones used for this Example.

The setups comprised a graphite refractory container, which contained a filler material mixture comprising a substantially inert filler material and an infiltration enhancer precursor, in the relative amounts shown

EXAMPLE 9

This Example illustrates, among other things, that varying amounts of an infiltration enhancer precursor can be combined with a filler material, to make a filler material mixture, so that at least a portion of the metallic constituent can be removed from ceramic matrix composite bodies. In this Example −325 mesh (particle diameter less than about 45 microns) magnesium powder (AESAR ®, Johnson Matthey Corp., Seabrook, N.H.) was used as the infiltration enhancer precursor.

Table VI contains the experimental parameters for Samples M, R, S, and T. Specifically, Table VI contains the ceramic matrix composite body from which at least a portion of the metallic constituent was removed, the dimensions of the ceramic matrix composite body, the weight percent of filler material, the weight percent of infiltration enhancer precursor added to the filler material to form the filler material mixture, the processing temperature, the processing time at processing temperature, and the processing atmosphere. The ceramic matrix composite bodies utilized in this Example and the method for forming the filler material mixtures were substantially the same as that described for Sample M in Example 7.

The refractory containers for Samples R, S, and T were high density alumina crucibles having an inner diameter of about 2.3 inches (59 mm), a depth of about 2.3 inches (5.9 mm) and a wall thickness of about 0.04 inch (1 mm). FIG. 1A shows a cross-sectional schematic view of the setup used for Sample R, S, and T to remove the metallic constituent from the silicon carbide particulate reinforced alumina composite.

The weight percentage of infiltration enhancer precursor mixed with the filler material, as shown in Table VI, was about 10 weight percent for Sample M, about 20 weight percent for Sample R, about 40 weight percent for Sample S, and about 100 weight percent for Sample T.

The setup for each Sample comprised a refractory container containing the filler material mixture comprising the filler material and the Sample V, about 850° C. for Sample W, about 950° C. for Sample X, and about 1050° C. for Sample Y.

Table VII contains the experimental parameters used for Samples U, V, W, X, and Y. Specifically Table VII lists the ceramic matrix composite bodies from which the metallic constituent was removed, the dimension of the ceramic matrix composite body, the filler material, the infiltration enhancer precursor, the processing temperature, the processing time at the processing temperature, and the processing atmosphere. The ceramic matrix composite bodies tested in this Example and the

TABLE VI

| Sample ID | Composite | Geometry | Filler Material | Infiltration Enhancer Precursor | Processing Temperature | Processing Time At Processing Temperature | Atm. |
|---|---|---|---|---|---|---|---|
| M | 500 grit SiC$_p$/Al$_2$O$_3$[1] | 5 × 6 × 43 mm bar | 1000 grit Al$_2$O$_3$[2] | 10% −325 mesh Mg[3] | 850° C. | 10h | N$_2$ |
| R | 500 grit SiC$_p$/Al$_2$O$_3$[1] | 3 × 5 × 6 mm bar | 1000 grit Al$_2$O$_3$[2] | 20% −325 mesh Mg[3] | 850° C. | 10h | N$_2$ |
| S | 500 grit SiC$_p$/Al$_2$O$_3$[1] | 3 × 5 × 6 mm bar | 1000 grit Al$_2$O$_3$[2] | 40% −325 mesh Mg[3] | 850° C. | 10h | N$_2$ |
| T | 500 grit SiC$_p$/Al$_2$O$_3$[1] | 3 × 5 × 6 mm bar | none | 100% −325 mesh Mg[3] | 850° C. | 10h | N$_2$ |

[1] Silicon Carbide particulate reinforced alumina composite.
[2] E-67 tabular alumina, Norton Co., Worcester, MA.
[3] AESAR ®, Johnson Matthey Corporation, Seabrook, New Hampshire infiltration enhancer precursor and surrounding the silicon carbide particulate reinforced alumina composite body. The setup was placed into a resistance heated controlled atmosphere furnace and nitrogen was introduced. The processing conditions for Sample M are described in Example 7. The processing conditions for method for making the filler material mixture were substantially the same as that described for Sample M in Example 7.

FIG. 1A shows a cross-sectional schematic view of the setup used with Samples U through Y to remove the metallic constituent from the

TABLE VII

| Sample ID | Composite | Geometry | Filler Material | Infiltration Enhancer Precursor | Processing Temperature | Processing Time At Processing Temperature | Atm. |
|---|---|---|---|---|---|---|---|
| U | 500 grit SiC$_p$/Al$_2$O$_3$[1] | 3 × 5 × 6 mm bar | 1000 grit Al$_2$O$_3$[2] | 10% −325 mesh Mg[3] | 650° C. | 1.5h | N$_2$ |
| V | 500 grit SiC$_p$/Al$_2$O$_3$[1] | 3 × 6 × 53 mm bar | 1000 grit Al$_2$O$_3$[2] | 10% −325 mesh Mg[3] | 750° C. | 10h | N$_2$ |
| W | 500 grit SiC$_p$/Al$_2$O$_3$[1] | 3 × 6 × 53 mm bar | 1000 grit Al$_2$O$_3$[2] | 10% −325 mesh Mg[3] | 850° C. | 10h | N$_2$ |
| X | 500 grit SiC$_p$/Al$_2$O$_3$[1] | 3 × 6 × 53 mm bar | 1000 grit Al$_2$O$_3$[2] | 10% −325 mesh Mg[3] | 950° C. | 10h | N$_2$ |
| Y | 500 grit SiC$_p$/Al$_2$O$_3$[1] | 3 × 6 × 53 mm bar | 1000 grit Al$_2$O$_3$[2] | 10% −325 mesh Mg[3] | 1050° C. | 10h | N$_2$ |

[1] Silicon Carbide particulate reinforced alumina composite.
[2] E-67 tabular alumina, Norton Co., Worcester, MA.
[3] AESAR ®, Johnson Matthey Corporation, Seabrook, New Hampshire Samples R, S, and T include flowing nitrogen at about 0.5 liters/minute. The furnace was heated to about 850° C. at a rate of about 200° C./hour and held at about 850° C. for about 10 hours, during which time the metallic constituent from within the ceramic matrix composite body spontaneously wetted the filler material mixture comprising the alumina filler material and the infiltration enhancer precursor. After about 10 hours at about 850° C., the furnace and its contents were cooled to about room temperature. At about room temperature, the setup was removed from the furnace and disassembled to reveal that substantially all of the metallic constituent had been removed and that Samples M, R, S, and T now comprised silicon carbide particulate reinforced alumina composites with three dimensionally interconnected porosity and an alumina matrix.

EXAMPLE 10

This Example illustrates, among other things, that a range of processing temperatures may be used to remove the metallic constituent from ceramic matrix composite bodies according to the instant invention. Specifically, the processing temperatures in this Example were about 650° C. for Sample U, about 750° C. for silicon carbide particulate reinforced alumina composite in this Example. Each experimental setup in Table VII comprised an alumina crucible, a filler material mixture comprising a filler material and an infiltration enhancer precursor, and a silicon carbide particulate reinforced alumina composite body surrounded by the filler material mixture and contained within the alumina crucible. The alumina crucible for the setup used with Sample U was obtained from Netzche, Inc., Exton, Pa. and had an inner diameter measuring about 0.23 inch (6.0 mm) wide by about 0.51 inch (13 mm) deep. The alumina crucibles for the setups used with Samples V, W, X, and Y were obtained from McDanel Refractory Co., Beaver Falls, Pa. and measured about 3.9 inches (100 mm) long by about 1.8 inches (45 mm) wide by about 0.75 inch (19 mm) tall.

The setups were placed into a resistance heated controlled atmosphere furnace and nitrogen was introduced. For Sample U, the nitrogen flow rate was about 0.5 liters/minute. For Samples V, W, X, and Y, the nitrogen flow rate was about 1.0 liter/minute. The furnace and its contents were then heated at about 200° C. per hour to about the processing temperature specified in Table VII. After about the specified time in Table VII at the specified temperature, during which time the metallic constituent from within the ceramic matrix composite body spontaneously wetted the filler material mixture comprising of the filler material and the infiltration enhancer precursor, the furnace and its contents were allowed to cool to about room temperature. At about room temperature, each setup was removed from the furnace, disassembled, and it was noted that the samples experienced a weight loss due to the removal of the metallic constituent from within the ceramic matrix composite body. The weight loss for Samples U, V, W, X, and Y indicated that substantially all of the metallic constituent had been removed from the ceramic matrix composite body.

EXAMPLE 11

This Example illustrates, among other things, that the instant invention for removing the metallic constituent from ceramic matrix composite bodies is applicable to large and complex shaped composite bodies.

A conically shaped preform having substantially paraboloidal outer and inner surfaces and measuring about 5.0 inches (127 mm) high and having an outer diameter measuring about 4.0 inches (102 mm) at the end opposite the nose end of the conically shaped preform was slip cast from a slip mixture comprising by weight about 56.2% 1000 grit (average particle diameter of about 5 microns) fired 39 CRYSTOLON® silicon carbide (Norton Company, Worcester, Mass.), about 15% submicron (average particle diameter of about 0.6 microns) silicon carbide (HSC-059 or 100 GL, SuperiorGraphite, Chicago, Ill.), about 3.8% fired 39 CRYSTOLON® 500 grit (average particle diameter of about 17 microns) silicon carbide (Norton Company, Worcester, Mass.), about 24.5% water, and about 0.5% DARVAN® 821A organic dispersant (R. T. Vanderbilt Co., Inc., Norwalk, Conn.). The fired silicon carbide was heated in an air atmosphere resistance heated furnace from about 1300° C. to about 1325° C. for about 48 hours. The slip mixture was placed in an about 5 gallon (19 liter) plastic container which was about half full of alumina grinding media having a diameter of about 0.5 inch (13 mm) and the plastic container and its contents were placed on a rotating jar mill for about 3 days. The slip mixture was then cast into a plaster of paris mold having a paraboloidal inner cavity corresponding substantially to the outer surface of the desired conical shaped preform. A rubber mandrel having a paraboloidal outer surface corresponding substantially to the inner surface of the desired conical shaped preform was then inserted into the preform mixture contained within the plaster of paris mold. After about 5 hours, the rubber mandrel was removed from within the set slip mixture and the conically shaped preform was removed from the plaster of paris mold. After the conically shaped preform had dried for at least 12 hours, it was placed into an air atmosphere furnace and heated to about 1025° C. in about 10 hours, held at about 1025° C. for about 24 hours and cooled to about room temperature in about 10 hours.

The outer surface of the fired conically shaped preform was first sanded by hand and then coated with a barrier mixture comprising by weight about 50% −325 mesh (particle diameter less than about 45 microns) wollastonite and about 50% YK paint thinner (ZYP Coating, Oak Ridge, Tenn.). The barrier coated conically shaped preform was placed into a refractory boat such that the nose of the barrier coated conically shaped preform was against the bottom of the refractory boat and the opening of the conically shaped void within the preform was up.

The refractory boat and its contents comprising the barrier coated conically shaped preform were placed into an air atmosphere resistance heated furnace and the furnace was heated to about 1000° C. in about 8 hours. A refractory crucible containing a parent metal comprising by weight about 15.0% Si, 6.0% Zn and the balance aluminum was inserted into the furnace at about 1000° C. and when the parent metal had substantially completely melted, the parent metal was poured into the conically shaped void within the preform to fill the void. Additional molten parent metal was added to the conically shaped void on a daily basis throughout the about 100 hour growth at about 1000° C. After about 100 hours at about 1000° C., the cortically shaped preform was observed in the furnace and it was determined that the oxidation reaction product had grown into and substantially completely embedded the silicon carbide particulate preform thereby forming a substantially net shaped silicon carbide particulate reinforced alumina conically shaped composite body. The remaining parent metal within the void of the conically shaped composite body was poured out and the power to the furnace was interrupted and the furnace containing the refractory boat containing the conically shaped composite body were allowed to cool to about room temperature. At about room temperature, the conically shaped composite body was subjected to sand blasting to remove any remnants of the barrier material on the outer surface of the conically shaped composite body and prepare it for the metallic constituent removal process of the instant application.

FIG. 2 shows a portion of a cross-sectional schematic view of a set-up which is similar to that setup which was used to remove the metallic constituent from the conically shaped composite body. Specifically, FIG. 2 shows a representative set-up comprising a composite body 20 (i.e., this Example the numeral 20 represents a silicon carbide particulate reinforced, conically shaped composite body), that served as a container for the filler material mixture 30. In this Example, the filler material mixture 30, comprised by weight about 90% E-67 100 grit (average particle diameter of about 173 microns) alumina (Norton Company, Worcester, Mass.) and about 10% −325 mesh (particle diameter less than about 45 microns) magnesium powder (AESAR®, Johnson Matthey Corporation, Seabrook, N.H.). The conically shaped composite body was supported on its outside portions by 38 ALUNDUM® 220 grit (average particle diameter of about 66 microns) alumina (Norton Company, Worcester, Mass.) which was contained within a steel box, both of which are not shown in FIG. 2.

Figure 8A:
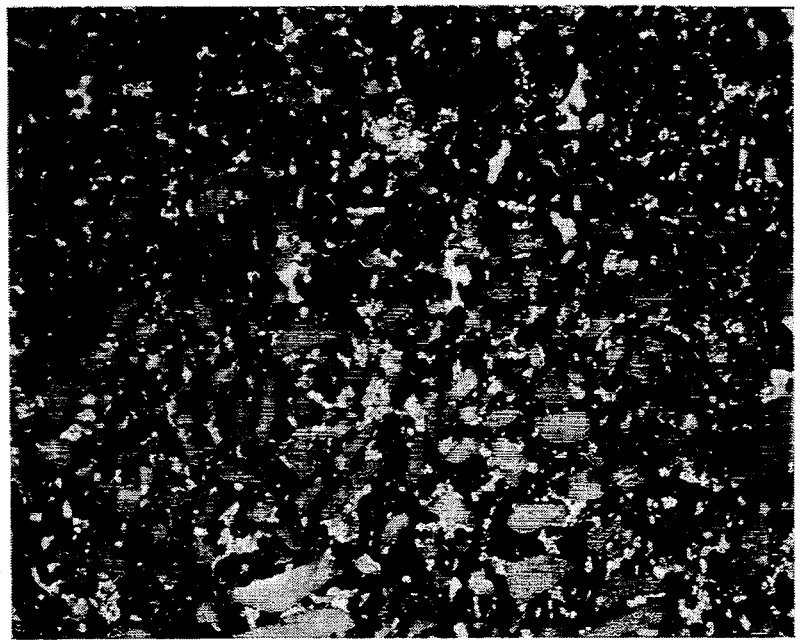
FIG. 8A is a photomicrograph taken at 1000× of the microstructure of the ceramic matrix composite body of Example 11 prior to metal removal.
Figure 8B:
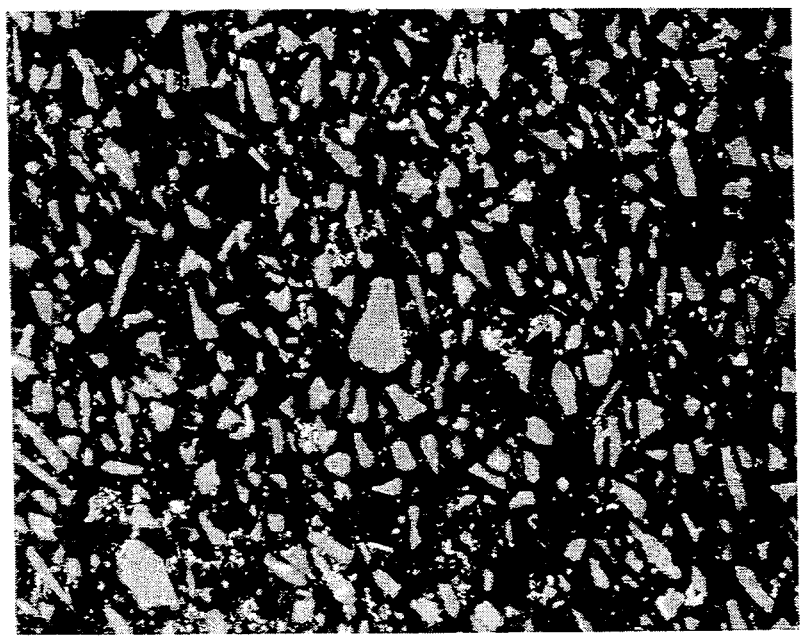
FIG. 8B is a photomicrograph taken at 1000× of the microstructure of the ceramic matrix composite body of Example 11 after metal removal.

The set-up, comprising the steel box which contained 220 grit (average particle diameter of about 66 microns) alumina, which alumina supported the exterior portion of the conically shaped composite body 20, which composite body 20 also contained the filler material mixture 30, was placed into a retort-lined resistant heated furnace. The retort door was closed and nitrogen was introduced into the retort at a flow rate of about five liters per minute. The furnace and its contents were heated to about 800° C. at a rate about 200° C. per hour with a flow of nitrogen of about five liters per minute. After about 10 hours at about 800° C. with a flow of nitrogen at about five liters per minute, the power to the furnace was interrupted and the furnace and its contents were allowed to cool to about room temperature. At about room temperature, the retort door was opened, the set-up was removed from the furnace and disassembled to reveal that the filler material mixture adjacent to the interior surface of the conically shaped composite body now comprised an agglomerated mass comprising 1000 grit alumina, aluminum nitride, and aluminum alloy. Also, it was observed from a polished cross-section of the cortically shaped composite body that the metallic constituent had been removed. Specifically, FIG. 7A shows a cortically shaped composite body prior to treatment by the instant invention and FIG. 7B shows a cortically shaped composite body after treatment by the instant invention to remove the metallic constituent. FIG. 8A is a photomicrograph taken at about 1000×, which corresponds to the microstructure of the silicon carbide reinforced alumina composite prior to treatment by the instant invention. Specifically, the microstructure shows that the composite body comprises silicon carbide particulate reinforcement (shown as discrete gray regions in the micrograph), interconnected metallic channels (shown as the speckled or mottled white region in the micrograph) and an alumina matrix growth product (shown as grayish-black regions in the micrograph). In contrast, FIG. 8B is a photomicrograph taken at about 1000×, which corresponds to the microstructure of a silicon carbide reinforced alumina conically shaped composite body treated by the instant invention. Specifically, the microstructure shown in FIG. 8B shows that the composite body, after metal removal treatment, comprises silicon carbide particulate reinforcement (shown as discrete gray regions in the micrograph), porosity (shown as discrete black regions in the micrograph) in place of the metallic channels, some isolated residual metal (shown as speckled or mottled white regions in the micrograph), and an alumina matrix oxidation reaction product (shown as grayish-black regions in the micrograph).

EXAMPLE 12

This Example demonstrates, among other things, that the method of the instant invention can be used in conjunction with fiber reinforced ceramic composite bodies formed by the directed oxidation of a parent metal to embed a fiber cloth preform.

As depicted in FIG. 5B of Example 6 a schematic cross-sectional view of a trough-shaped preform 150 measuring about 9 inches long (228.6 mm) and about 1 inch (25 mm) deep (i.e., as measured from a top portion of the trough to a bottom portion of the trough) was fabricated from 8 layers of plain weave NICALON TM silicon carbide fibers (obtained from Dow Corning Corporation, Midland, Mich.) and having a "V"-shaped cross section. The preform 150 contained pores along an outer surface 151 which were impregnated with molten red wax (Yates Manufacturing Co., Chicago, Ill. Strips 152 of high temperature wax sheet having an adhesive backing on one side (Kit Collin Company, Cleveland, Ohio) and measuring about 9 inches (227 mm) long, about 2-2.25 inches (51-57 mm) wide and about 0.25 inch (6.4) thick were attached by the adhesive portion thereon to a portion of an inner surface 153 of the trough-shaped preform, thereby extending the length of each side of the "V"-shaped preform to extend about 1.75-2.0 inches (45-51 mm), thereby forming a wax extension. A slurry mixture comprising by weight about 5 parts BLUONIC ® A colloidal alumina (West Bond Corp., Wilmington, Del.) and about 2 parts −325 mesh (particle diameter less than about 45 microns) wollastonite (a calcium silicate) was made by hand mixing the materials together.

A shell 154 was formed by painting the slurry mixture onto the outer surface 161 of the wax extension 152 and the outer surface 151 of the wax coated trough-shaped preform with a one inch foam brush. Coarse wollastonite was then sprinkled liberally onto the slurry mixture to prevent runoff and to form a first precursor layer of the shell 154. This procedure was repeated after an about 0.5 hour drying period. When the slurry mixture/coarse wollastonite layers reached a thickness of about. 0.25 inch (6.4 mm), the wax coated trough-shaped preform 150 was dried at about room temperature for about 24 hours. The about 0.25 inch (6.4 mm) thick coating nominally comprised about 12 slurry mixture/coarse wollastonite layers. After the wax coated trough-shaped preform had substantially completely dried at room temperature, it was placed into an air atmosphere furnace, which was maintained under an exhaust hood, and the furnace and its contents were heated to about 120° C. and held at that temperature for about 6 hours, during which time the wax melted leaving behind an unfired precursor to the shell 154. The furnace and its contents were then heated to about 950° C. in about 2 hours and held at about 950° for about 4 hours to substantially completely remove any residual wax and ensure the sintering of the colloidal alumina and wollastonite, thereby forming the shell 154. The furnace and its contents were then cooled to about room temperature.

About 40 grams of VASELINE ® petroleum jelly vehicle (Cheseborough Ponds, Inc., Greenwich, Conn.) were placed into a small aluminum weighing dish and heated on a hot plate set at medium heat until the jelly turned into a liquid. A clean sable brush was then used to substantially completely coat the inner surface 153 of the trough-shaped preform 154 to provide an interface for the application of a nickel oxide powder mixture 155. Specifically, a mixture 155 comprising about 8 grams of −325 mesh (particle diameter less than about 45 microns) nickel oxide powder and about 16 grams of ethanol was applied with a sponge brush to substantially completely cover the petroleum jelly coated surface to form a growth lay-up. The growth lay-up comprising the wollastonite shell 154 containing the trough-shaped preform 150 was placed into a refractory container 156 such that opposite longitudinal ends of the wollastonite shell 154 on the outer surface of the preform 150 were supported by two partially hollowed-out fire bricks 157 (i.e., cavities were created in each of the two fire bricks so as to be complementary to each longitudinal end of the wollastonite shell 154) all of which were surrounded by a wollastonite bedding 106.

The refractory boat and its contents were then placed into a resistance heated air atmosphere furnace and heated from about room temperature to about 700° C. Simultaneously about 800 grams of a parent metal was melted, the parent metal comprising by weight about 7.5 to 8.5 percent silicon, 3.0 to 4.0 percent copper, 2.7 to 3.5 percent zinc, 0.2 to 0.3 percent magnesium, $\leq 0.01$ percent calcium, $\leq 0.10$ titanium, 0.7 to 1.0 percent iron, $\leq 0.5$ percent nickel, $\leq 0.5$ percent manganese, $\leq 0.35$ percent tin, $\leq 0.001$ percent beryllium, $\leq 0.15$ percent lead, and the balance aluminum. At about 700° C., the molten parent metal 159 was poured into the cavity of the trough-shaped preform 150 to substantially completely fill the cavity, as shown in FIG. 5C of Example 6. Then, wollastonite powder 160 was poured onto surface of the molten parent metal 159 and the furnace door was closed. FIG. 5C of Example 6 depicts a cross-sectional schematic of the setup as contained in the furnace. The furnace and its contents were then heated from about 700° C. to about 1000° C. at about 700° C. per hour. After about 96 hours at about 1000° C., the furnace and its contents were cooled from about 1000° C. to about 700° C. at about 400° C. per hour. At about 700° C., the furnace door was opened and the refractory boat 156 and its contents were removed. The wollastonite coated trough-shaped composite corresponding to the preform 150 within the refractory boat 156 was then removed and residual parent metal 159 was decanted. The wollastonite shell 154 was then separated from the growth infiltrated trough-shaped composite corresponding to the preform 150 and the composite was buried underneath silica sand to cool the composite to about room temperature. At about room temperature, the trough-shaped preform 150 was removed from the sand and it was observed that oxidation reaction product had grown into and embedded the NICALON ™ silicon carbide plain weave fiber preform to form a ceramic composite body 170 comprising silicon carbide fiber reinforcement embedded by alumina oxidation reaction product. The surface of ceramic composite body was then cleaned in a sandblaster.

Figure 9:
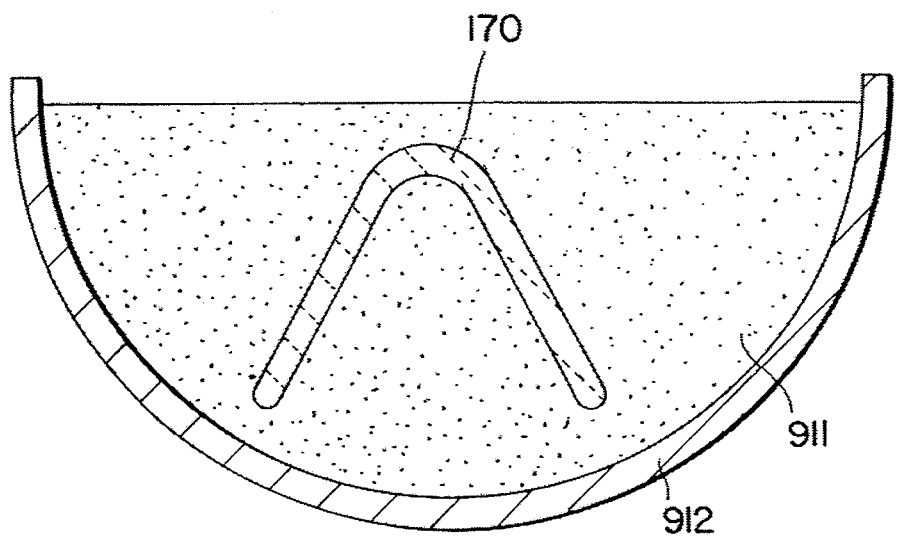
FIG. 9 is a schematic cross-sectional view of lay-up used for removing the metallic constituent from the fiber reinforced ceramic composite body according to Example 7.

Once the ceramic composite body 170 had been successfully manufactured, the metal removal was begun. Specifically, as depicted in FIG. 9, a filler material mixture 911 comprised by weight of about 10 percent −325 mesh (particle diameter less than about 45 microns) magnesium powder (Reade Manufacturing Co., Lakehurst, N.J.) and about 90 percent E67 1000 grit (average particle diameter of about 5 microns) alumina (Norton Co., Worcester, Mass.) were combined in a plastic jar with alumina milling balls and the plastic jar and its contents were placed on a rotating jar mill to substantially completely mix the filler material mixture. After the filler material mixture 911 had been separated from the milling balls, the bottom of a graphite foil lined stainless steel boat 912 was filled with the filler material mixture. The ceramic composite body 170 was then placed onto the filler material mixture 911 and additional filler material mixture was poured over the ceramic composite body 170 to substantially completely cover it. The graphite foil lined stainless steel boat 912 and its contents, were then placed into a controlled atmosphere resistance heated tube furnace and the tube furnace was sealed. After the tube furnace and its contents were evacuated to about 30 inches (762 mm) of mercury vacuum, nitrogen was introduced into the furnace chamber. The tube furnace was once again evacuated and filled with nitrogen to establish a nitrogen flow rate of about 3 liters per minute. The tube furnace and its contents were heated from about room temperature to about 750° C. at about 200° C. per hour while maintaining a nitrogen flow rate of about 3 liters per minute. After about 5 hours at about 750° C. with a nitrogen flow rate of about 3 liters per minute, the tube furnace and its contents were cooled to about room temperature at about 200° C. per hour. At about room temperature, the nitrogen flow rate was interrupted, the tube furnace was opened, and the graphite foil lined stainless steel boat 912 and its contents were removed. After disassembling the graphite foil lined stainless steel boat and its contents, it was revealed that the metallic constituent of the silicon carbide fiber reinforced alumina composite body 170 had been substantially completely removed.

EXAMPLE 13

A ceramic matrix composite body substantially the same as that of Example 7 and measuring about 2 inches (51 mm) long, about 2 inches (51 mm) wide and about 0.5 inch (13 mm) thick was subjected to the metal removal process substantially the same as that described in Example 7 except that the filler material mixture comprised by weight about 90 percent Grade LC-12 SX, extra fine, extra high purity silicon nitride having a particle size ≦0.5 microns (obtained from Hermann C. Stark Co., New York, N.Y.), the nitrogen gas was introduced into the furnace chamber at a flow rate of about 1 liter per minute and the furnace was heated to about 750° C. for about 5 hours. At about room temperature, the set-up was disassembled to reveal that the metallic constituent comprising an aluminum alloy in the silicon carbide particulate reinforced alumina composite had been drawn out of the composite body during the process.

Thus, this Example demonstrates that the metallic constituent of a composite body can be drawn out by processing a ceramic composite body in a filler material comprising a relatively inert component (under the process condition for removal of metal) consisting of silicon nitride and an infiltration enhancer precursor consisting of magnesium.

EXAMPLE 14

The following Example demonstrates, among other things, the use of the method of the present invention to remove at least a portion or substantially all of at least one metallic component of a metallic constituent from a ceramic reinforced metal composite body (i.e., a metal matrix composite). Specifically, the following Example demonstrates the removal of at least one metallic component of a matrix metal from a silicon carbide reinforced aluminum metal matrix composite body. Furthermore, the following Example demonstrates a method for the formation of a metal matrix composite and the subsequent removal of at least one metallic component of the matrix metal from a plurality of metal matrix composites.

This Example specifically demonstrates the following aspects concerning the removal of at least one metallic component of the metallic constituent from a metal matrix composite body: the formation of a metal matrix composite body including fabrication of a mold which is used to make a preform, preform fabrication, metal matrix composite formation, and the removal of at least one metallic component of the metallic constituent of the formed metal matrix composite body.

Mold Fabrication

A rubber mold was fabricated, said mold measuring about 8 inches (203 mm) square by about 2 inches (51 mm) high and having centered on one surface a recess measuring about 6 inches (152 mm) round by about 0.075 inch (1.9 mm) deep. Specifically, a mold form for casting the rubber mold was constructed by affixing a glass disk measuring about 5.9 inches (150 mm) round and about 0.075 inch (1.9 mm) thick to the FORMICA ® facing of a particle board, said board and facing measuring about 8 inches (203 mm) square and about 0.75 (19 mm) thick. The glass disk was affixed to the FORMICA ® facing of the particle board by coating one surface of the glass disk with a thin layer of VASELINE® petroleum jelly (Chesebrough-Ponds, Inc., Greenwich, Conn.). The mold form was completed by placing two small-side boards (also comprising FORMICA®-faced particle board) measuring about 8 inches (203 mm) long, about 4 inches (102 mm) wide and about 0.75 inch (19 mm) thick on opposite sides of and perpendicular to the bottom board and two large-side boards (also comprising FORMICA®-faced particle board) measuring about 10 inches (254 mm) long, about 4 inches (102 mm) wide and about 0.75 inch (19 mm) thick perpendicular to the bottom board and two small-side boards. Carpenter clamps secured the small-side boards and large-side board to each other and to the bottom board to form the mold form having inner dimensions measuring about 8 inches (203 mm) square and about 3.25 inches (83 mm) high. Thus, the inner surface of the mold form comprised FORMICA®. An MS-122/CO2 TFE Release Agent Dry Lubricant (Miller-Stephenson, Inc., Danbury, Conn.) was then sprayed evenly onto the exposed surfaces of the glass disk affixed to the bottom board of the mold form and the FORMICA® faces of the inner walls of the mold form.

A rubber casting mixture was formed by combining in a five-gallon plastic container about 220 grams of dark blue Zn catalyst activator (Silicones, Inc., Woodbine High Point, N.C.) with about 2400 grams of white silicone rubber base (Silicones, Inc., Woodbine High Point, N.C.). The ingredients were then mixed using a spatula to form a uniform light blue liquid rubber casting mixture. The five-gallon container and its contents were then placed in a vacuum chamber for about 5 minutes while maintaining a vacuum that permitted any entrained air in the casting mixture to ebulate from the casting mixture in a controlled manner, thereby removing any entrained air from the uniformly colored rubber casting mixture.

After the rubber casting mixture had been sufficiently de-aired, the mold form was placed onto a level surface and the rubber casting mixture was poured into the mold form. After about 24 hours, during which time the rubber casting mixture cured to form a rubber mold, the mold form was disassembled and a rubber mold having the characteristics described above was obtained. The rubber mold was then cleaned using a commercially available hand dishwashing liquid (i.e., SUNLIGHT® hand dishwashing liquid, Lever Brother Co., New York, N.Y.), warm water and a soft cloth.

Preform Fabrication

A silicon carbide mixture was prepared in a 16 ounce NALGENE® plastic jar (obtained from VWR Scientific, Bridgeport, N.J.). About 123 grams of dionized water and about 1.2 grams of RHOPLEX® LC-40 high solids acrylic emulsion (Rohm and Haas Company, Philadelphia, Pa.) were combined in the plastic jar and the plastic jar was closed. The plastic jar and its contents were hand shaken for about 2 minutes to mix the ingredients. The plastic jar was then opened and about 0.1 gram of 581B defoamer (Colloid, Newark, N.J.) was added to the contents of the plastic jar. After the plastic jar and its contents had been shaken for about 2 minutes, about 61.2 grams of BLUONIC® A colloidal alumina (Westbond Corp., Wilmington, Del.) were added to the contents of the plastic jar. After the plastic jar was closed, the plastic jar and its contents were hand shaken for about 2 minutes to mix the contents. About 185 grams of Type E-110 500 grit (average particle diameter of about 17 microns) silicon carbide (Norton Co., Worcester, Mass.) were added to the contents of the plastic jar and the plastic jar and its contents were hand shaken for about 2 minutes. About 430 grams of 39 CRYSTOLON® 220 grit (average particle diameter of about 66 microns) silicon carbide (Norton Co., Worcester, Mass.) were added to the contents of the plastic jar and the jar was closed. The plastic jar and its contents were then placed on a roll mill set at a rotational speed of about 35 revolutions per minute for about 8 hours.

An aluminum plate measuring about 9 inches (229 mm) square and about 0.25 inch (6.4 mm) thick was placed on the table of a Model VP51D1 SYNTRON® magnetic vibrator (FMC Corp., Materials Handing Equipment Division, Homer City, Pa.) having a Model CSCR-1B SYNTRON® electric controller. The cleaned rubber mold was then placed onto the aluminum plate so that the recess of the rubber mold faced away from the aluminum plate.

Meanwhile, the plastic jar containing the silicon carbide mixture was placed on a Model OMI-b orbital mixer (Engineered Technical Products, Somerville, N.J.) for about 30 minutes at a mixing speed of about 24 revolutions per minute. The plastic jar containing the silicon carbide mixture was removed from the orbital mixer and hand shaken while the electric controller of the magnetic vibrator supporting the aluminum plate and rubber mold was turned on to a vibration setting of about 5. About 105 grams of the silicon carbide mixture were poured from the plastic jar and into the recess of the rubber mold as the rubber mold was vibrated by the supporting magnetic vibrator. After about one minute, with the electrical controller of the magnetic vibrator set at a setting of about 5, the silicon carbide mixture flowed into and filled the recess in the rubber mold. After the entire recess of the rubber mold was covered with the silicon carbide mixture, the setting of the electrical controller of the magnetic vibrator was reduced to a setting of about 3 and held at a setting of about 3 for about 10 minutes. The electrical controller of the magnetic vibrator was then turned off. Excess silicon carbide mixture extending beyond the surface of the rubber mold was removed by twice drawing the 45 degree beveled edge of a doctor blade measuring about 9 inches (229 mm) long, about 2.98 inches (76 mm) high and about 0.039 inches (0.99 mm) thick across the surface of the recess in the mold by using the sides of the rubber mold as a guide. The aluminum plate supporting the rubber mold and its contents were then rotated clockwise by about 90 degrees. The doctor blade was again drawn twice across the surface of the mold recess containing the silicon carbide mixture. This procedure was repeated until the aluminum plate supporting the rubber mold had been rotated a total of about 360 degrees to about its original position on the table and the surface level of the silicon carbide mixture contained within the recess of the rubber mold substantially coincided with the surface level of the rubber mold.

The aluminum plate supporting the rubber mold and the rubber mold and its contents were then removed from the vibrating table and placed under a 250 watt, 130 volt infrared light (Catalog No. 3349K51, McMaster Corr., Elmhurst, Ill.) for about 30 minutes. The distance between the infrared light and the silicon carbide mixture within the recess of the rubber mold was about 12 inches (305 mm). The aluminum plate supporting the rubber mold and the rubber mold and its contents were then placed into a forced air oven set at about 45° C. for about 3 hours to permit the moisture to evaporate from the silicon carbide mixture to form a preform. After the preform formed in the rubber mold, the aluminum plate supporting the rubber mold and the rubber mold and its contents were removed from the drying oven and the sides of the rubber mold were manipulated to loosen the preform from within the rubber mold. The rubber mold was then inverted over a cordierite plate measuring about 7 inches (178 mm) square and about 0.5 inch (13 mm) thick. The sides of the rubber mold were again manipulated while the rubber mold was held about 1 inch (25 mm) from the cordierite plate to dislodge completely the silicon carbide preform from the rubber mold. The weight of the resultant silicon carbide preform measured about 80 grams while the preform dimensions measured about 6 inches (156 mm) round by about 0.078 inch (2 mm) thick.

The cordierite plate supporting the silicon carbide preform was then placed into a resistance heated air atmosphere furnace. The furnace and its contents were then heated from about room temperature to about 100° C. in about 1 hour, held at about 100° C. for about 1 hour, heated from about 100° C. to about 1100° C. at about 125° C. per hour. After about 2 hours at about 1100° C., the power to the resistance heated air furnace was disengaged and the furnace and its contents were allowed to cool to about room temperature as fast as the furnace would permit. At about room temperature, the mass of the fired silicon carbide preform measured about 79 grams while the fired silicon carbide preform dimensions measured about 6 inches (156 mm) round by about 0.078 inch (20 mm) thick.

A first surface of the fired silicon carbide preform was then spray-coated with KRYLON ® crystal clear acrylic spray (Borden Krylon Inc., Columbus, Ohio). The KRYLON ® crystal clear acrylic coating was dried by placing the fired silicon carbide preform in a forced air oven for about 5 minutes at about 120° C. After the fired preform had cooled to about room temperature, a graphite-based mixture comprised by weight of about 50% DAG ® 154 colloidal graphite (Acheson Colloids Co., Port Huron, Mich.) and about 50% denatured ethanol (Pharmco, Bayonne, N.J.) was sprayed using an air brush onto the acrylic coating on the surface of the fired silicon carbide preform. The fired silicon carbide preform was again placed in a forced air oven set at about 120° C. for about 5 minutes to dry the graphite-based mixture. At about room temperature, the first surface of the fired preform was substantially evenly coated with additional graphite-based mixture to result in a total density of at least 0.022 grams per square inch (3.4×10−5 grams per square millimeter). After the colloidal graphite coating had substantially completely dried on the first surface of the fired silicon carbide preform, the fired silicon carbide preform was turned over so that a second surface of the fired silicon carbide preform was exposed. The second surface of the fired silicon carbide preform was then also spray-coated with the KRYLON ® crystal clear acrylic spray and placed into a forced air oven set at about 120° C. for about 5 minutes. The fired silicon carbide preform was then allowed to cool to about room temperature and the KRYLON ® crystal clear acrylic coated second surface was sprayed using an air brush with the graphite based mixture. The fired silicon carbide preform was again placed into the forced air oven at about 120° C. for about 5 minutes to dry the graphite based mixture to at least a density of 0.011 grams per square inch (1.7×10−5 grams per square millimeter) on the second surface of the fired silicon carbide preform.

Composite Formation

A setup including the graphite-coated fired silicon carbide preform was prepared. A boat was machined from Grade ATJ graphite (Union Carbide Corporation, Carbon Products Division, Cleveland, Ohio) to internal dimensions measuring about 9 inches (228 mm) square, about 4 inches (102 mm) high and having a wall thickness of about 0.5 inch (13 mm). The graphite boat was lined with a graphite foil box measuring about 7 inches (178 mm) square and about 2 inches (51 mm) high. The graphite foil box was fabricated from a piece of GRAFOIL ® graphite foil (Union Carbide Corp., Carbon Products Division, Cleveland, Ohio) measuring about 11 inches (219 mm) square and about 0.015 inch (0.38 mm) thick. A matrix metal comprising by weight about 15% silicon, 5% magnesium and the balance aluminum, and measuring about 7 inches (178 mm) square and about 0.5 inch (13 mm) thick, was placed within the graphite foil box contained in the graphite boat. The exposed surface of the matrix metal ingot was then spray-coated with KRYLON ® crystal clear acrylic and a graphite foil ring having an outer diameter measuring about 6.125 inches (156 mm), an inner diameter measuring about 5.85 inches (149 mm) and a thickness of about 0.005 inch (0.13 mm) was substantially centered on the exposed surface of the matrix metal ingot. After the graphite foil ring had been placed on this exposed surface of the matrix metal ingot, both the graphite foil ring and the exposed surface of the matrix metal ingot were spray-coated with KRYLON ® crystal clear acrylic spray. About 1.5 grams of −50 mesh (particle diameter less than about 297 microns) atomized magnesium powder (Hart Metals Inc., Tamaqua, Pa.) were sprinkled onto the exposed surface of the matrix metal ingot within the graphite foil ring. The graphite boat containing the graphite foil box, the matrix metal ingot and the graphite foil ring was then placed into a forced air atmosphere oven set at about 80° C. for about 1 hour. The graphite coated fired silicon carbide preform was then placed onto the graphite foil ring so that the second surface of the fired preform faced and contacted the exposed surface of the matrix metal ingot. The space between the graphite foil box and the graphite boat was then filled with 39 CRYSTOLON ® 90 grit (average particle diameter of about 216 microns) silicon carbide (Norton Co., Worcester, Mass.) to form a setup.

The setup was then incorporated into a layup. The opening of the graphite boat of the setup was covered with a piece of GRAFOIL ® graphite foil (Union Carbide Corp., Carbon Products Division, Cleveland, Ohio) and then placed into a graphite tray having internal dimensions measuring about 19 inches (483 mm) long, about 10 inches (254 mm) wide, about 1.5 inches (38 mm) deep and having a wall thickness of about 0.5 inch (13 mm).

The layup and its contents were then placed into a retort-lined resistance heated furnace capable of maintaining a controlled atmosphere. Prior to placing the layup into the retort-lined resistance heated furnace, the internal surfaces of the retort-lined furnace were wiped clean using paper towels soaked with dehydrated alcohol. The furnace door was closed and the furnace and its contents were evacuated to about 30 inches (762 mm) of mercury vacuum. The vacuum pump was then disengaged and nitrogen gas was introduced into the furnace chamber until atmospheric pressure was substantially achieved. The nitrogen gas flow rate was then interrupted and simultaneously the vacuum pump was reengaged. The retort-lined resistance heated furnace and its contents were then evacuated again to about 30 inches (762 mm) of mercury vacuum. Again, the vacuum pump was disengaged from the retort-lined resistance heated furnace and nitrogen gas was introduced into the furnace chamber at a flow rate of about 5 liters per minute and at about atmospheric pressure. While maintaining the nitrogen gas flow rate at about 5 liters per minute, the furnace and its contents were heated from about room temperature to about 225° C. in about one hour. After about 5 hours at about 225° C., the furnace and its contents were heated from about 225° C. to about 850° C. in about 3 hours. After about 7 hours at about 850° C., while maintaining a nitrogen gas flow rate of about 5 liters per minute, the power to the retort-lined resistance heated furnace was interrupted and the nitrogen gas flow was stopped. The furnace door was opened and the layup and its contents were removed from the furnace and allowed to cool to about room temperature. At about room temperature, the layup was disassembled to reveal that the fired silicon carbide preform had been infiltrated by the matrix metal to form a metal matrix composite disk.

Metal Removal

To prepare for the removal of the metallic component from the metal matrix composite disk, a filler mixture was prepared comprising by weight about 90% Grade LC-12 SX, extra fine, extra high purity silicon nitride having a particle size less than about 5 microns (Hermann C. Stark Co., New York, N.Y.) and about 10% −325 mesh (average particle diameter of about 45 microns) ground magnesium powder (Reade Manufacturing Co., Lakehurst, N.J.). About 2000 grams of the ingredients in the above designated proportions were placed into a 1 gallon stainless steel jar. The stainless steel jar was closed and placed onto a rolling mill for about an hour to substantially completely mix the silicon nitride powder and the ground magnesium powder thereby forming the filler mixture.

The inner cavity of a stainless steel box, measuring about 10 inches (254 mm) square and about 2 inches (51 mm) high, was lined with a piece of GRAFOIL® graphite foil (Union Carbide Corp., Carbon Products Division, Cleveland, Ohio). A sufficient amount of filler mixture was poured into the graphite foil lined stainless steel box so as to substantially completely cover the bottom surface of the box. After leveling, the filler mixture was handpacked into the graphite foil lined stainless steel box by pressing the filler mixture with the palm and/or fist and/or fingers of a hand. The metal matrix composite disk was then placed on the hand-packed filler mixture and additional filler mixture was poured into the graphite foil lined box so as to substantially completely cover the metal matrix composite disk. The total amount of filler mixture weighed about 538 grams. After leveling, the filler mixture covering the metal matrix composite disk was lightly packed over the metal matrix composite disk thereby forming a layup.

The layup and its contents were then placed into a retort-lined resistance heated furnace and the furnace door was closed. The furnace and its contents were evacuated to about 30 inches (762 mm) of mercury vacuum. The vacuum pump was disengaged and nitrogen gas was introduced at a flow rate of about 10 liters per minute until atmospheric pressure was attained in the retort chamber. After interrupting the nitrogen gas flow rate, the vacuum pump was again engaged to the chamber of the retort-lined resistance heated furnace. The furnace and its contents were then evacuated to about 30 inches (762 mm) of mercury. Again, the vacuum pump was disengaged and nitrogen gas was introduced into the chamber of the retort-lined resistance heated furnace to establish about atmospheric pressure in the retort chamber. The furnace and its contents were then heated from about room temperature to about 750° C. in about 4 hours, held at about 750° C. for about 5 hours, at which time the energy to the furnace was interrupted and the furnace and its contents were allowed to cool to about room temperature while maintaining a nitrogen gas flow rate of about 10 liters per minute. After the furnace and its contents had cooled to about room temperature in about 5 hours, the nitrogen gas flow was interrupted, the furnace door opened and the layup was removed. The layup was disassembled to reveal that the metallic component of the metal matrix composite disk had been removed thereby forming a metal-removed metal matrix composite body.

A portion of the metal-removed metal matrix composite body was then cut, mounted and polished for metallographic examination. Simultaneously, a comparative metal matrix composite disk made in a manner substantially the same as metal-removed metal matrix composite disk but not having been exposed to the metal removal step, was cut, mounted and polished for comparison with the metal-removed metal matrix composite body.

Figure 10A:
FIG. 10A is a photomicrograph taken at about 1000× of the microstructure of the metal matrix composite body of Example 9 prior to metal removal.

FIG. 10A shows a photomicrograph of the comparative metal matrix composite body at a magnification of about 1000×. Specifically, FIG. 10A shows a silicon carbide reinforcement material 801 surrounded by a metallic constituent 802 comprised of an aluminum metallic component and a silicon rich metallic component 803.

Figure 10B:
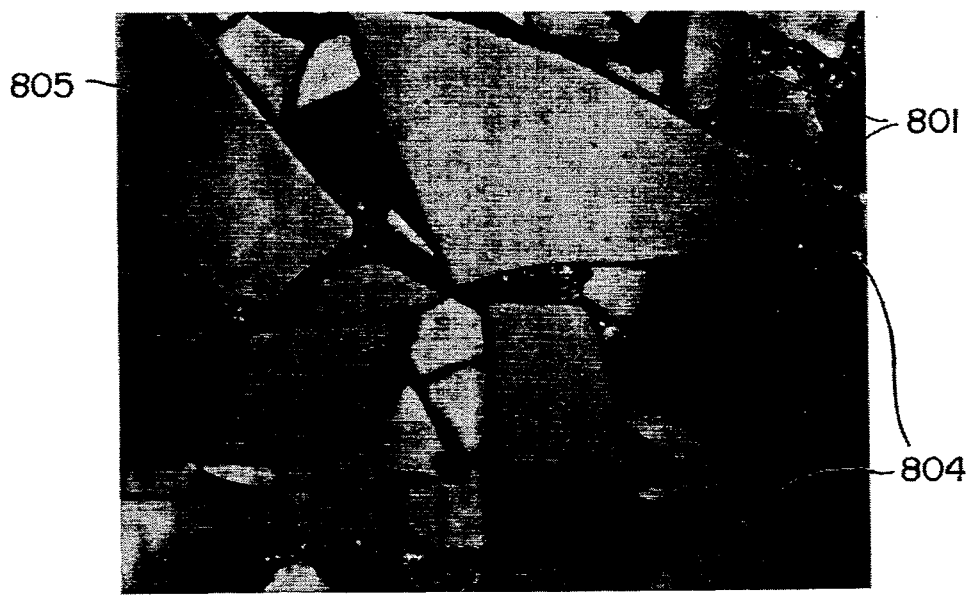
FIG. 10B is a photomicrograph taken at about 1000× of the microstructure of the metal matrix composite body of Example 9 after metal removal.
Figure 10C:
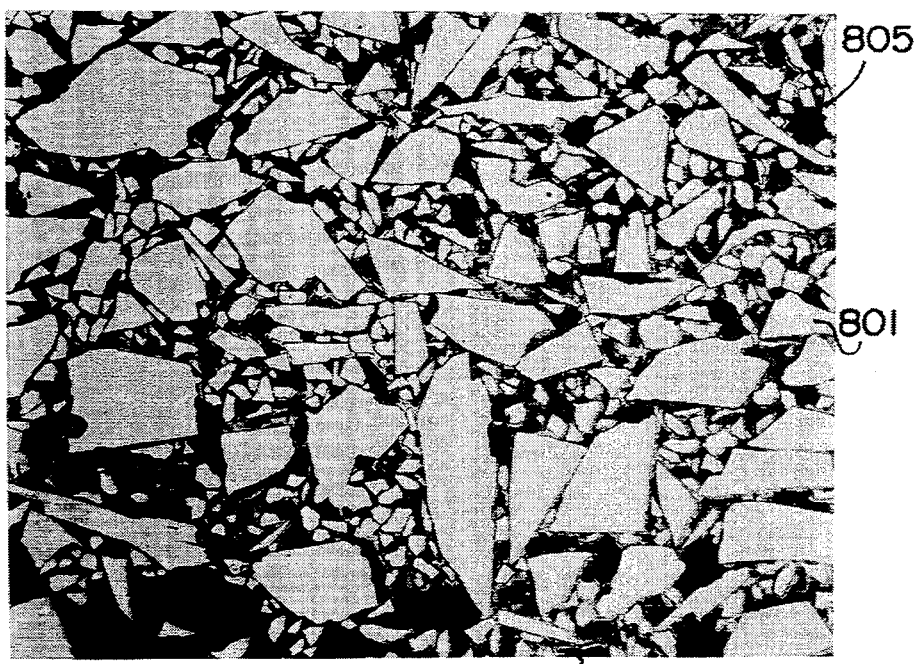
FIG. 10C is a photomicrograph taken at about 200× of the microstructure of the metal matrix composite body after metal removal.

FIG. 10B and FIG. 10C show photomicrographs of the metal-removed metal matrix composite body at a magnification of about 1000× and 200×, respectively. Specifically, FIG. 10B and FIG. 10C show a silicon carbide reinforcement material 801 surrounded by a matrix conversion layer 804 (which is discussed in greater detail below) and porosity 805. A comparison of FIGS. 10A and 10B shows distinct differences between the comparative metal matrix composite body and the metal-removed metal matrix composite body.

To understand better the composition of the matrix conversion layer 804 of the metal-removed composite disk, x-ray diffraction analysis, energy dispersive x-ray analysis and wavelength dispersive analysis of the metal-removed metal matrix composite body were performed. Specifically, a portion of the metal-removed metal matrix disk was prepared for x-ray diffraction analysis by grinding the outer surfaces of the metal-removed metal matrix composite disk using an abrasive diamond disk. The metal-removed composite disk was then ground to form a powder sample for x-ray diffraction analysis. The diffraction analysis was run overnight using a Sieman's Model D500 x-ray diffractometer having a Cu Ka x-ray source tube. The results of the x-ray diffraction analysis indicated that among other phases, the metal-removed metal matrix composite body was comprised of silicon carbide, aluminum nitride and silicon. To correlate the structural features shown in FIG. 10B with the x-ray diffraction results, energy dispersive x-ray analysis of the metal-removed metal matrix composite body was performed in a Model JSM-840 scanning electron microscope (Jeol, Japan). Specifically, spot probes of the matrix conversion layer 804 were performed using a TN-5500 energy dispersive x-ray analyzer (Tracor Northern) while maintaining the electron microscope beam potential of about 10 kilovolts and a beam current of about 1.5 nA. The results of the energy dispersive x-ray analysis indicated that the matrix conversion layer 804 included aluminum. Additionally, wavelength dispersive x-ray analysis was performed using a Model MC54 multielement spectrometer (Peak Instruments Co.) with an excitation potential of about 10 kilovolts, a beam current set at 250 nA and a dwell time of about 3 seconds. This additional x-ray analysis showed that the matrix layer 804 also included nitrogen. A correlation of the microstructural features, the results of the x-ray diffraction analysis, the results of wavelength dispersive analysis and the results of the energy dispersive analysis, suggests that the matrix conversion layer 804 comprises an aluminum nitride-based material.

To characterize further the metal-removed metal matrix composite body, intrusion porosimetry was performed on a portion of the sample using a Model autoscan 33 mercury porosimeter (Quantachrome, Syosset, N.Y.). The results of the porosimetry analysis are summarized in Table VIII below..

land, Mich.) was assembled in substantially the same manner as was described in Example 1. Unlike those of Example 1, however, the fabric preforms of the present Example only measured about 3.2 inches (77 mm) square.

The fabric preforms were then chemical-vapor-infiltrated (CVI) with boron nitride (BN) and silicon carbide (SiC) in substantially the same manner as was described in Example 1 with the following notable exceptions.

Twelve fabric preforms were simultaneously coated with boron nitride, and for the silicon carbide deposition, six boron nitride coated preforms were simultaneously coated. Furthermore, during the boron nitride deposition, a coating temperature of about 742° C. as indicated by a thermocouple contained within the reactor chamber was maintained for about 5.5 hours and the total pressure within the reactor chamber was maintained between about 1.2 and about 1.6 torr. The gaseous reactants consisted of ammonia ($NH_3$) flowing at a rate of about 1200 standard cubic centimeters per minute (sccm) and boron trichloride ($BCl_3$) flowing at a rate of about 300 sccm. For the silicon carbide deposition, a coating temperature of about 928° C. was maintained for about 24 hours at a total reactor chamber operating pressure of about 11 torr.

The differences in the boron nitride and silicon carbide coating thicknesses which were obtained, as shown in Table IX, are accounted for by the relative location of a particular preform within the reactor.

TABLE VIII

EQUIPMENT AND METAL-REMOVED SAMPLE PROPERTIES

| | | | |
|---|---|---|---|
| Instrument | Autoscag 33 | Total Pore Surface Area | 0.92 $m^2$/g |
| 1X 0X - X33000 PSIG (0–2.32 × $10^3$ kg/$cm^2$) | | Apparent Density | 3.1539 g/$cm^3$ |
| Cell Stem Volume | 0.5 $cm^3$ | Mercury Surface Tension | 480.0 erg/$cm^2$ |
| Total Intruded Volume | 0.0621 $cm^3$/g | Bulk Sample Volume | 0.6066 $cm^3$ |
| Bulk Density | 2.6371 g/$cm^3$ | Moving Point Average | 1.0 |
| Mercury Contact Angle | 140.00 X | | |
| Sample Weight | 1.5998 g | | |
| Minimum Delta Volume | 0.500% full scale | | |

Hg volume normalized by sample weight

INTRUSION STATISTICS
24 PSIA TO 32891 PSIA
(1.69 kg/$cm^2$ TO 2.31 × $10^3$ kg/$cm^2$)
8.88842 micrometers TO 0.00649 micrometers

| | MEAN | MODE | MEDIAN |
|---|---|---|---|
| VOLUME | 5.21 × $10^{-2}$ $cm^3$/g at a diameter of 2.70 × $10^{-1}$ micrometers | 1.65 × $10^{-1}$ $cm^3$/(μm-g) at a diameter of 1.22 × $10^{-2}$ micrometers | 3.11 × $10^{-2}$ $cm^3$/g at a diameter of 1.68 micrometers |
| SURFACE AREA | 1.49 × $10^{-1}$ $m^2$/g at a diameter of 2.70 × $10^{-1}$ micrometers | 4.50 × $10^1$ $m^2$/(μm-g) at a diameter of 1.22 × $10^{-2}$ micrometers | 4.60 × $10^{-1}$ $m^2$/g at a diameter of 3.18 × $10^{-2}$ micrometers |
| PORE NUMBER FRACTION | 1.31 × $10^{-3}$ at a diameter of 2.70 × $10^{-1}$ micrometers | 6.06 × $10^{-1}$ at a diameter of 1.22 × $10^{-2}$ micrometers | 1.0 at a diameter of 1.22 × $10^{-2}$ micrometers |

Thus, this Example demonstrates that the method of the present invention may be used to remove at least a portion of at least one metallic component from a metal matrix composite body to form a metal-removed metal matrix composite body.

EXAMPLE 15

This Example demonstrates, among other things, the effect of the chemical-vapor-infiltration (CVI) coating thicknesses of both boron nitride and silicon carbide as well as the volume fraction of reinforcement fibers on an elevated temperature flexural strength of a fiber reinforced ceramic composite material.

Samples Z–AE

Fabric preforms comprising NICALON ™ silicon carbide fiber (obtained from Dow Corning Corp., Mid-

TABLE IX

| Sample No. | Volume % Fiber | BN* (microns) | SiC* (microns) | Avg. Str.** (MPa) |
|---|---|---|---|---|
| Z | 41 | 0.33 | 2.03 | 427 |
| AA | 41 | 0.33 | 1.75 | 358 |
| AB | 37 | 0.48 | 2.10 | 406 |
| AC | 37 | 0.24 | 2.07 | 377 |
| AD | 33 | 0.51 | 2.20 | 367 |
| AE | 32 | 0.49 | 2.43 | 312 |

*nominal coating thickness calculated on the basis of weight gain as a result of chemical vapor depostion of coating
**average of four samples Generally speaking, for both boron nitride and silicon carbide depositions, the closer the preform was to the gas reactant source, the thicker was the coating. During boron nitride deposition, the preforms were arranged six deep in groups of two. Likewise, during silicon carbide deposition, the boron nitride coated preforms were arranged three deep in groups of two. Thus, during boron nitride deposition, the Sample AD preform was closest to the gas reactant source, while the Sample AC preform was farthest away. Likewise, during silicon carbide deposition, the Sample Z preform was closest to the gas reactant source, while the Sample AA preform was farthest away.

Each fabric preform coated with boron nitride and silicon carbide was then infiltrated with a ceramic matrix comprising aluminum oxide and some aluminum alloy using a directed metal oxidation process substantially as described in Example 1.

At least some of the metallic component of the formed fiber reinforced ceramic composite bodies was then removed. This metal removal process was substantially as described in Example 1 with the following exceptions. A nitrogen gas flow rate of about 10,000 sccm instead of about 4000 sccm was maintained throughout the heating and cooling. Also, three fiber reinforced composite bodies were simultaneously processed.

Unlike the method of Example 1, however, no subsequent heat treatment of the formed ceramic composite bodies of the present Example was performed.

The mechanical strength of each of the fiber reinforced ceramic composite bodies of Samples Z-AE was measured at a temperature of about 1200° C. in a four-point flexure mode. Specifically, test specimens were diamond machined to the dimensions specified in Example 1 and tested in four-point bending until failure using the procedure as outlined in Example 1. The resulting flexural strength based upon an average of four data points per material i s reported for each of Samples Z-AE in Table IX.

An examination of the data reported in Table IX reveals a number of trends.

Specifically, a comparison of the data for Sample Z with those for Samples AB, AC and AD shows that boron nitride coating thicknesses of about 0.24 micron and 0.48 micron or thicker resulted in flexural strengths which were suboptimal. Thus, for the fiber reinforced composite bodies of the present invention, a boron nitride coating thickness on the reinforcement fibers of about 0.3 micron ought to be at least close to optimal.

Moreover, inspection of Table IX reveals a correlation between the thickness of the boron nitride coating and the volume fraction of the NICALON TM reinforcement fiber in the coated preform (and ultimately the composite body). This correlation results from the "spring-back" phenomenon which occurs after coating the fabric preforms with boron nitride when the graphite containment fixture is disassembled and the boron nitride coated fabric preform is removed. It seems that the thicker the boron nitride coating which is applied, the more the coated fabric preform expands in its thickness dimension upon its removal from the graphite containment fixture, thus the lower the overall volume fraction of NICALON" fiber.

In addition, a comparison of the strength data for Samples Z, AB and AD shows that the flexural strength of the composite material increases as the volume fraction of reinforcement fibers increases.

Finally, a comparison of the data for Sample AA with the data for Sample Z and, similarly, a comparison of the data for Sample AE with the data for Sample AD reveals that for a given volume fraction of reinforcement fibers, a silicon carbide thickness of about 1.75 microns, while a thickness of about 2.43 microns of silicon carbide is excessive in that it also results in suboptimal strength. The importance of the proper silicon carbide thickness is highlighted by a comparison of the data for Sample AA with for Sample AD. Specifically, this comparison shows that the optimization of the silicon carbide coating thickness at about 2.2 microns compensates for a difference in volume fraction of reinforcement fibers of about eight points or about 20 percent.

Thus, this Example demonstrates, among other things, that for the fiber reinforced ceramic composite materials described herein, there exists desirable boron nitride and silicon carbide coating thicknesses to apply to the reinforcement fibers to optimize the high temperature strength of the formed composite materials. Specifically, the thickness of boron nitride applied should be greater than about 0.24 micron but less than about 0.51 micron. The thickness of silicon carbide applied should be greater than about 1.75 microns but less than about 2.43 microns. Furthermore, within the range of fiber reinforcement of about 32 to 41 volume percent of the composite body, the strength of the composite body increases with the volume fraction of reinforcement.

EXAMPLE 16

This Example demonstrates, among other things, an improved method of coating a fabric preform. Specifically, this Example demonstrates a set of coating conditions which result in coatings of more uniform thickness throughout the fabric preform.

A fabric preform 103 was made by stacking an plurality of layers of harness satin weave (8 HSW) fabric made from NICALON TM silicon carbide fiber (obtained from Dow Corning Corp., Midland, Mich.) on top of each other. The nomenclature describing the orientations of the fabrics is substantially the same as that used in Example 1 and depicted in FIGS. 4A, 4B and 4C.

The fabric preform of the present Example was made by stacking the layers of HSW fabric in the following sequence:

A first fabric layer comprising an 8 HSW fabric was rotated about 90° in the counterclockwise direction from the as-is position about an axis 93 perpendicular to the plane of the fabric and was placed on a supporting surface to start the fabric preform.

A second fabric layer comprising an 8 HSW fabric was place on the first fabric layer in the as-is position do that the edges of the second fabric layer were substantially aligned with the edges of the first fabric layer;

A third fabric layer comprising a 12 HSW fabric was rotated about 90° in the counterclockwise direction from the as-is position about an axis 93 perpendicular to the plane of the fabric and was placed on the second fabric layer so that the edges of the third fabric layer were substantially aligned with the edges of the second fabric layer;

A fourth fabric layer comprising a 12 HSW fabric was placed on the third fabric layer in the as-is position so that the edged of the fourth fabric layer were substantially aligned with the edges of the third fabric layer;

A fifth fabric layer comprising a 12 HSW fabric was rotated about 90° in the counterclockwise direction from the as-is position about an axis 93 perpendicular to the plane of the fabric and was placed on the fourth fabric layer so that the edges of the fifth fabric layer were substantially aligned with the edges of the fourth fabric layer.

A sixth fabric layer comprising an 8 HSW fabric was placed on the fifth fabric layer in the as-is position so that the edges of the sixth fabric layer were substantially aligned with the edges of the fifth fabric layer;

A seventh fabric layer comprising an 8 HSW fabric was rotated about 90° in the counterclockwise direction from the as-is position about an axis 93 perpendicular to the plane of the fabric and was placed on the sixth layer so that the edges of the seventh fabric layer were substantially aligned with the edges of the sixth fabric layer, thus completing the rectangular fabric preform which measured about 9 inches (229 mm) in length by about 6 inches (152 mm) in width by about 0.125 inch (3.2 mm) thick.

The fabric preform was clamped in substantially the same kind of fixture as was described in Example 1 and depicted in FIG. 5e. The preform containment fixture 108 containing the fabric preform was placed into a reactor chamber of a refractory alloy steel chemical vapor infiltration (CVI) apparatus having a graphite tube liner and having overall dimensions of about 8 feet (2.4 meters) in length by about 15.5 inches (394 mm) in inside diameter. The warp yarns of the first and seventh layers of the fabric preform were perpendicular to the gas flow direction within the chamber as well as being perpendicular to the longitudinal axis of the reactor chamber. The reactor chamber was closed and evacuated to less than about 0.5 torr. The reactor chamber was then heated to a temperature of about 800° C. When the temperature within the reactor chamber reached about 800° C., a gas mixture comprising borontrichloride (BCl3) flowing at about 1200 sccm at a temperature of about 60° C. and ammonia (NH3) flowing at about 2100 sccm was introduced into the reactor chamber while maintaining a total operating pressure of about 0.5 torr. After about 4 hours at a temperature of about 800° C., the gas mixture flowing into the reactor chamber was interrupted, the power to the furnace heating the reactor chamber was interrupted and the furnace and its contents were naturally cooled. At a temperature below about 200° C., the reactor chamber door was opened and the graphite containment fixture was removed, cooled and disassembled to reveal that the fibers of the fabric layers of the fabric preform were coated and that the fabric layers comprising the fabric preform were bonded together by a boron nitride coating. The boron nitride coating had a thickness of about 0.48 micron.

The boron nitride coated fabric preform was then stored in a vacuum desiccator until it was ready to be put back into the chemical vapor infiltration apparatus for additional coating.

Figure 11A:
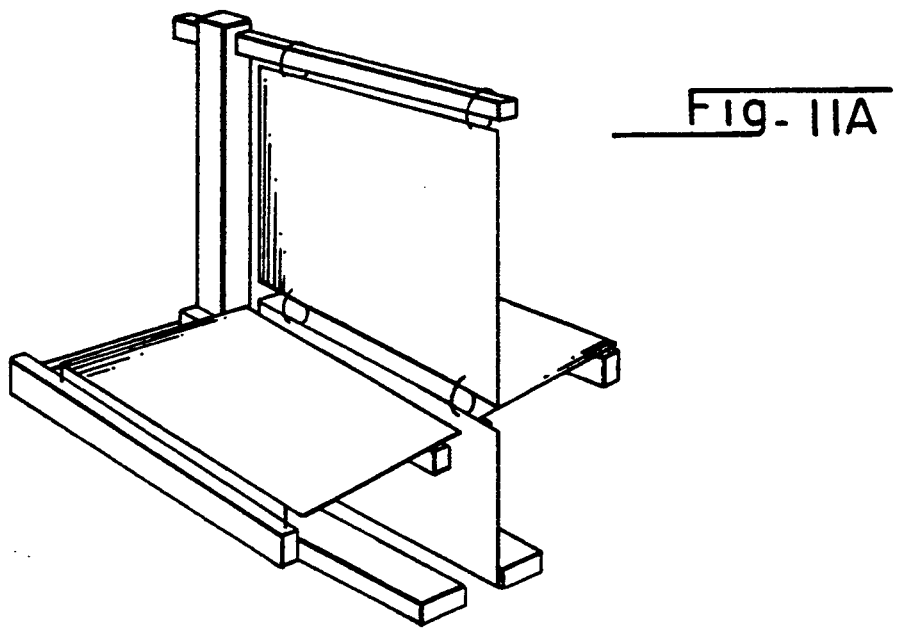
FIG. 11A and 11B are isometric drawings of the graphite support fixture of Example loaded with fabric preforms and in the unloaded condition, respectively.
Figure 11B:
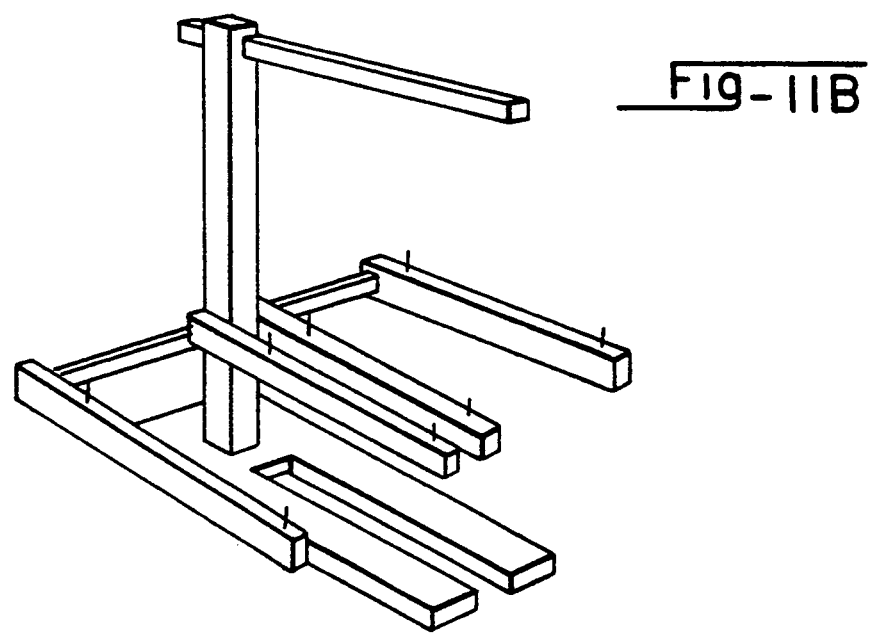

For the application of this subsequent coating, the boron nitride coated and bonded fabric preform was placed back into the reactor chamber of the chemical vapor infiltration apparatus. In this instance, however, the warp yarns of the first and seventh layers of the fabric preform were parallel to the gas flow direction within the chamber, as well as being parallel to the longitudinal axis of the reactor chamber. More specifically, the boron nitride coated fabric preforms were supported by a graphite fixture as shown in FIG. 11A. The graphite fixture alone is shown in FIG. 11B. A total of 8 boron nitride coated fabric preforms can be further coated simultaneously in a single reactor run by placing 2 such loaded fixtures front-to-back in the reactor chamber.

The CVI reactor chamber was closed and evacuated to about less than about 1 torr. Hydrogen gas was introduced into the reactor chamber at a flow rate of about 11,000 standard cubic centimeters per minute (sccm). The reactor chamber was then heated to a temperature of about 950° C. The reactor pressure was equilibrated at about 250 torr. Once the temperature of the contents of the reactor chamber had substantially completely stabilized at about 950° C., about 1800 sccm of hydrogen were diverted away from direct entry into the reactor chamber and were first bubbled through a bath of methyltrichlorosilane (MTS) maintained at a temperature of about 45° C. before entering the reactor chamber. After about 48 hours at a temperature of about 950° C., the power to the furnace heating the reactor chamber was interrupted and the about 1800 sccm of hydrogen that was being directed through the MTS bath was again permitted to flow directly into the reactor chamber to re-establish a direct hydrogen gas flow rate of about 11000 sccm into the reactor chamber. After the reactor chamber had cooled substantially, the hydrogen flow rate was interrupted and the furnace and its contents were evacuated to less than 1 torr. The pressure within the reactor chamber was then brought back up to about atmospheric pressure with argon gas. After the reactor chamber had cooled to a temperature below about 200° C., the argon gas flow rate was interrupted and the reactor chamber door was opened. The graphite support fixtures were removed, cooled and disassembled to reveal that the boron nitride bonded fabric preforms had been coated with a second layer of silicon carbide thereby forming a silicon carbide (SiC)/boron nitride (BN)-coated fabric preform. The silicon carbide had a thickness of about 2–3 microns. Significantly, the silicon carbide coating was of more uniform thickness from the interior of the preform to an exterior surface in the present Example than in the previously described Examples. In other words, the thickness of silicon carbide deposited at the exterior of the preform was not as great as in earlier Examples; thus, the coated preforms of the present Example were more permeable than some of the coated preforms of the previous Examples. Thus, the results of this Example suggest that it may be possible to apply silicon carbide coatings to the present fabric preforms having nominal thickness greater than about 2 to 3 microns without creating isolated pores in the preform.

Growth of an alumina oxidation reaction product through the silicon carbide/boron nitride-coated fabric preform and removed of metal from the resultant fiber reinforced composite body was then carried out in substantially the same manner as was described in Example 1 to form a fiber reinforced ceramic composite body comprising a ceramic matrix comprising an aluminum oxide oxidation reaction product and a metallic component comprising some residual unreacted parent metal, with the ceramic matrix embedding the silicon carbide/boron nitride coated NICALON ™ silicon carbide fibers. Substantially complete growth of the ceramic matrix only required about 72 hours. Since the coated fabric preforms of the present Example were more permeable than those formed by alternate CVI arrangements, it is believed that the time required for complete growth is even less than this value.

Thus, this Example demonstrates an efficient technique for coating a plurality of preforms simultaneously as well as conditions which result in silicon carbide coatings of more uniform thickness.

EXAMPLE 17

This Example demonstrates, among other things, the fatigue characteristics of the present fiber reinforced ceramic composite materials formed by the methods of the present invention. Specifically, this Example demonstrates the lifetimes for samples of NICALON TM silicon carbide fiber reinforced alumina matrix composite bodies as a function of the maximum applied stress for bodies tested in air at various temperatures and subjected to low-frequency cycling in tension.

Each sample was placed into the test chamber of a universal testing machine at about 25° C. The test chamber was then heated to the desired elevated temperature in air. When the temperature of the specimen had stabilized, a sinusoidal tensile stress was applied to the specimen. The minimum applied tensile stress was about 10 percent of the maximum applied tensile stress. The testing apparatus was configured so as to record the number of tensile stress cycles required to cause failure. These fatigue data are presented in Table X. Those test specimens which were still intact following 10,000 cycles of applied tensile stress at temperatures of 1100° C. or 1370° C. were then tensile tested in air using a uniformly increasing load at the same temperature at which they were cycled in

TABLE X

| | LOW FREQUENCY FATIGUE DATA | | | |
|---|---|---|---|---|
| Test Temperature | Max Stress (R = 0.1) MPa (ksi) | Frequency Hz | Cycles to failure | Residual Str. at Temp. MPa (ksi) |
| Room Temperature | 72 (11) | 1 | 172,912* | — |
| | 72 (11) | 1 | 235,858* | — |
| | 138 (20) | 1 | 150,956* | — |
| | 138 (20) | 1 | 166,459* | — |
| | 166 (24) | 1/10 | 351,600/118,360 | — |
| 1000° C. (1800° F.) | 83 (12) | 5 | 2,195,000* | — |
| | 103 (15) | 0.3 | 142,577* | — |
| | 103 (15) | 5 | 117,843 | — |
| | 103 (15) | 5 | 175,620 | — |
| | 124 (18) | 1 | 27,712 | — |
| | 124 (18) | 5 | 66,676 | — |
| 1100° C. (2000° F.) | 60 (9) | 1 | 10,000* | 185 (26) |
| | 120 (17) | 1 | 10,000* | 149 (21) |
| | 180 (26) | 1 | 603 | — |
| 1370° C. (2500° F.) | 58 (8) | 1 | 10,000* | 153 (22) |
| | 115 (16) | 1 | 2,480 | — |
| | 173 (25) | 1 | 128 | — |

*Test stopped prior to failure

Samples which were tested at about 20° C. and at about 1000° C. were fabricated in substantially the same manner as was described in Example 1, including the residual metal removal process. The fiber reinforced ceramic composite bodies which were tested at temperatures of about 1100° C. and about 1370° C. were fabricated substantially in accordance with Example 16, which fabrication also included the residual metal removal process.

Figure 12:
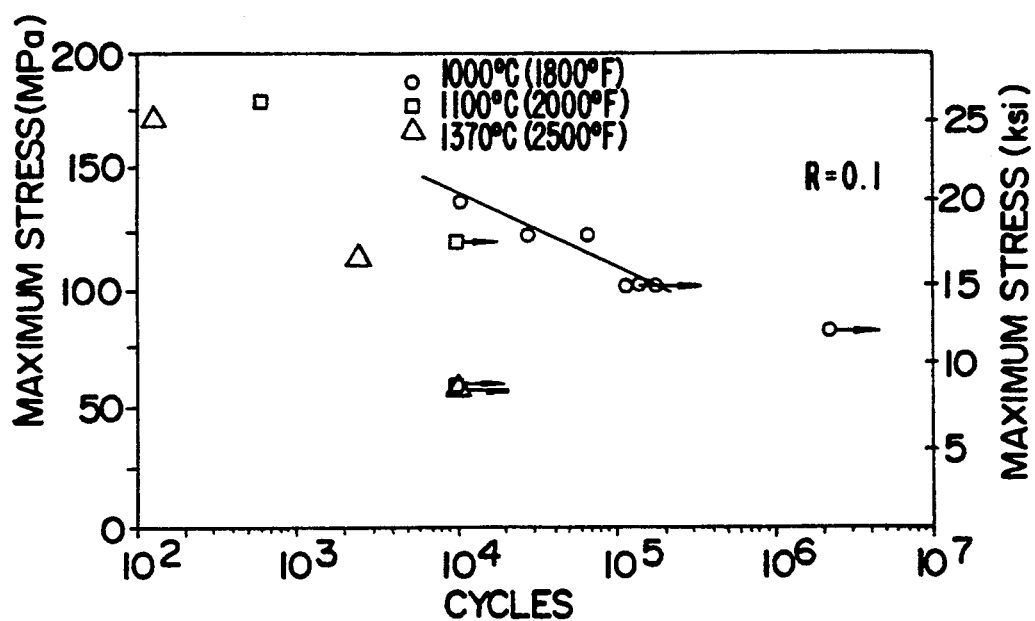
FIG. 12 is an S-N plot showing the life of a fiber reinforced ceramic composite body as a function of temperature and the maximum applied cyclical tensile stress as described in Example 17.

The geometry of the test specimen was that of a "double dogbone", that is, comprising two reduced sections transitioning to two first reduced sections in turn transitioning to a central more reduced section. Specifically, test specimens were diamond machined to an overall length of about 6 inches (152 mm), about 1.0 inch (25 mm) maximum width and about 0.25 inch (6.4 mm) thickness. The central more reduced section measured about 0.75 inch (19 mm) long and about 0.3 inch (7.6 mm) wide. At each end of and contiguous with the central more reduced section were two first reduced sections each measuring about one inch (25 mm) long and about 0.36 inch (9.1 mm) wide. At each outer most end of the test specimen and contiguous with the two first reduced section were tabs. The machined radii transitioning from the each tab to each first reduced section measured about 0.75 inch (19 mm) while that transitioning from each first reduced section to the central more reduced section measured about 1.5 inches (38 mm).

applied stress until failure was observed. The data in Table X shows that such test specimens retained over 50 percent of their original strength following the tensile cycling at elevated temperature. The data is Table X also demonstrates that the fiber reinforced ceramic composite material was capable of surviving over 2 million cycles of a tensile stress applied between about 8 and about 83 MPa at a frequency of about 5 Hz at a temperature of about 1000° C. in air. The elevated temperature data are presented graphically in FIG. 12 which shows the number of cycles to produce failure as a function of the maximum applied tensile stress. The arrows connected to several of the data points and pointing to the right indicate that the particular data point represents a lower bound of the material's life (e.g., failure of the specimen had not been achieved at the indicated maximum stress and number of tensile cycles). Further examination of the data presented in FIG. 12 suggests an endurance limit for the fiber reinforced ceramic composite material of about 80 MPa at a temperature of about 1000° C. in air.

EXAMPLE 18

This Example illustrates, among other things, a modified stress rupture test whose purpose or objective was to further simulate at least some of the conditions which might be present in a turbine engine. Specifically, the test of the present Example comprises a stress rupture test a temperature cycle added or superimposed to the test system during the elevated temperature exposure under the applied dead load.

A fiber reinforced ceramic composite body was fabricated in substantially the same manner as was described in Example 1, including removing a substantial fraction of the residual metallic component.

The stress rapture tests were conducted according to ASTM Designation: E 139-83, "Standard Practice for Conducting Creep, Creep-Rupture, and Stress-Rupture Tests of Metallic Materials." The method was modified to accommodate ceramic matrix composite materials. These modifications are elaborated below. The stress rupture test specimens had shoulders machined into each end. Mica powder was used in a collar to cushion the contact zone between the collar and the shoulder portions of the stress rupture test specimen. Each test specimen measured about 5.5 inches (140 mm) long overall by about 0.5 inch (13 mm) wide by about 0.12 inch (3 mm) thick. The gage portion of each test specimen measured about 2 inches (51 mm) in length by about 0.2 inches (5 mm) wide.

The tests comprised heating each sample to the desired test temperature, loading the sample in tension to a desired stress and maintaining the stressed sample at the temperature. The applied stress was increased in a step-wise manner. The unit length change of each sample within the gage portion of the overall test sample was monitored using a Model 1102 ZYGO ® helium-neon laser extensometer (Zygo Corp., Middlefield, Conn.).

Once the tensile test specimens had been diamond machined collars were attached to each opposite of each specimen to form a test fixture. The test fixture was then loaded into a Model P-5 creep testing machine (SATEC Inc., Grove City, Pa.). A tensile stress of about 12.5 MPa was then applied to the test specimen using dead loading. A resistance-heated air atmosphere furnace completely surrounded the test fixture portion of the creep testing machine and the furnace and the sample specimen contained within were heated from about 20° C. to a temperature of about 1100° C. Each thermal cycle then consisted of maintaining a temperature of about 1100° C. for about 1 hour in air, then uniformly decreasing the temperature of the test specimen to a temperature of about 600° C. over a period of about 45 minutes, maintaining a temperature of about 600° C. for about 1 hour and finally uniformly increasing the temperature of the specimen back up to a temperature of about 1100° C. over a period of about 45 minutes. The sample strain was monitored with a Model 1102 ZYGO ® helium-neon laser extensometer (Zygo Corporation, Middlefield, Conn.). The test data obtained during the testing of each specimen were then recorded in the form of specimen strain as a function of test duration, which data are illustrated graphically in FIG. 13.

Figure 13:
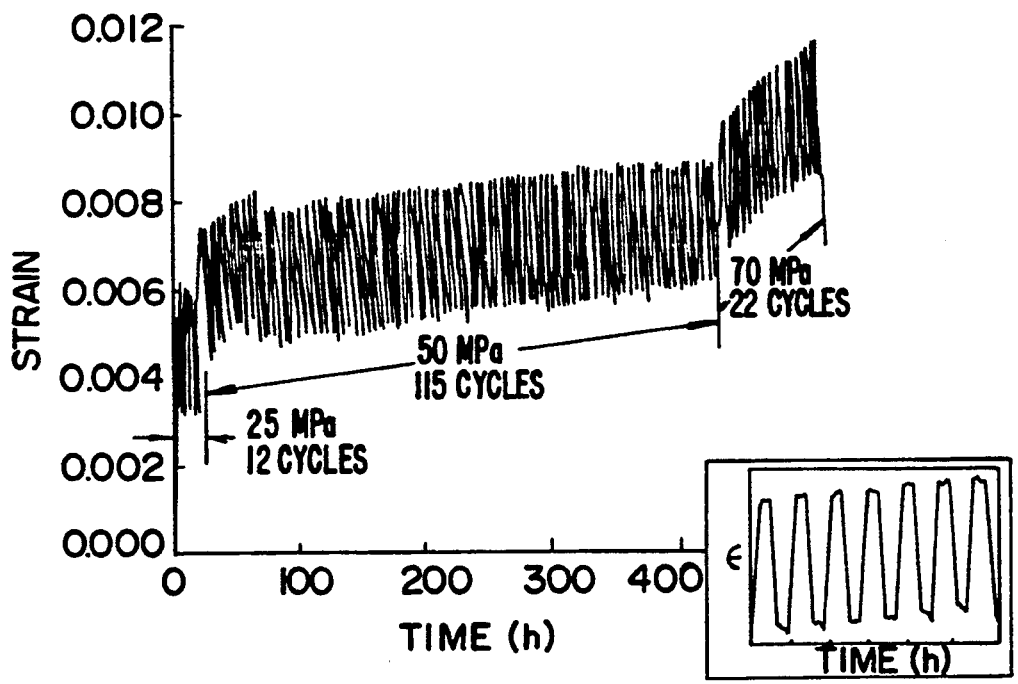
FIG. 13 is a plot of sample strain versus time for a fiber reinforced ceramic composite body subjected to thermal cycling under an applied tensile dead load as described in Example 18.

Referring to FIG. 13, after the application of about 12 thermal cycles at an applied tensile stress of about 25 MPa (the first few cycles were used to monitor the performance of the test equipment), the stress was then increased to about 50 MPa. After the application of about 115 thermal cycles at a stress of about 50 MPa, the stress was then further increased to about 70 MPa. After about 22 cycles at a stress of about 70 MPa, the sample failed. FIG. 13 also shows an enlargement of the 70 MPa region which specifically illustrates the change in strain in the test specimen in response to the change in specimen temperature. All together, the test specimen survived a total of 142 thermal cycles or about 500 hours of test duration.

A second thermal cycling test was then conducted on a substantially similar fiber reinforced composite test specimen in substantially the same manner as described above with the exception that the applied tensile stress throughout the duration of the testing was about 50 MPa. This second test specimen survived thermal cycling under this applied tensile stress in air for a total of about 282 thermal cycles (or about 987 hours) before failure occurred.

Thus, this Example demonstrates, among other things, that the present fiber reinforced ceramic composite bodies produced by the methods of the present invention are capable of surviving hundreds of hours under tensile loads in air under condition of varying elevated temperature.

EXAMPLE 19

This Example demonstrates, among other things, that the addition of particulates of silicon carbide between the fabric plies of fiber in a fiber reinforced ceramic composite body can greatly reduce the extent of microcracking in the ceramic matrix material which may occur between the plies during composite fabrication.

A graphite containment fixture containing a fabric preform was assembled in substantially the same manner as was described in Example 1, with the following notable exceptions. First, the NICALON ™ silicon carbide fabric (obtained from Dow Corning Corp., Midland, Mich.) entirely comprised 8-harness satin weave (8 HSW). Moreover, about 5.75 grams of 220 grit (average particle size of about 66 microns), 39 CRYSTOLON ® dry silicon carbide particulate was evenly applied to the top 6.75 inch (171 mm) face of each of fabric layer two through six. Still further, the dry silicon carbide particulate was worked at least partially into the tows of fiber making up each fiber layer with a brush.

The fabric preform comprising the eight stacked layers of 8-harness satin weave (8 HSW) fabric containing the five layers of silicon carbide particulate were then placed into a chemical-vapor infiltration (CVI) reactor and the fibers were coated with a first layer of boron nitride (BN) followed by layer of silicon carbide (SiC) substantially in accordance with the method described in Example 1. As a result of chemical-vapor infiltration, about 0.51 micron of boron nitride and about 1.94 microns of silicon carbide, as calculated based upon preform weight gain, were deposited onto the reinforcement fibers and particulates in the preform.

A ceramic matrix comprising aluminum oxide and some aluminum alloy metal was then grown into the coated preform by means of the directed metal oxidation process described in Example 1 to form a fiber reinforced ceramic matrix composite body.

The formed ceramic composite body was then subjected to substantially the same metal removal process as described in Example 1 to remove at least some of the metallic component of the ceramic composite body.

Figure 14A:
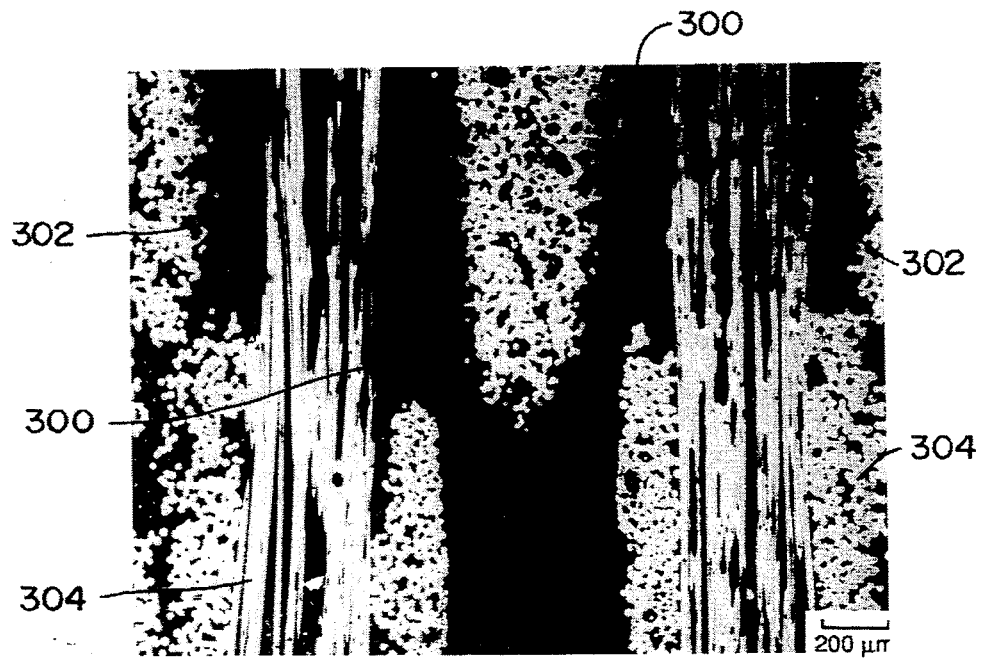
FIG. 14A is a photomicrograph taken at about 50× magnification of the microstructure of the silicon carbide fiber reinforced ceramic composite body which contains no silicon carbide particulates and thus exhibits substantial cracking.
Figure 14B:
FIG. 14B is a photomicrograph taken at about 50× magnification of a silicon carbide fiber reinforced composite incorporating silicon carbide particulates between the silicon carbide fiber layers and thus exhibits substantially no cracking.

The ceramic composite body was then sectioned using a diamond saw, mounted in thermoplastic resin and polished using progressively finer grades of diamond paste to produce a sufficiently smooth surface for optical examination. FIG. 14B is an approximately 50× magnification optical photomicrograph of this polished cross-section of this fiber reinforced ceramic matrix composite. Specifically, FIG. 14B illustrates particulates of silicon carbide 306 embedded within an alumina ceramic matrix material 302 located between and embedding adjacent plies of fabric comprising woven tows of the reinforcement NICALON TM fibers 304. FIG. 14A is also an approximately 50× optical photomicrograph of a fiber reinforced ceramic matrix composite which was produced in substantially the same manner as the composite material of the present Example with the exception that no silicon carbide particulates were placed between the layers of NICALON TM fiber fabric. The absence in FIG. 14B of the cracks 300 shown in FIG. 14A are particularly noticeable and significant.

Thus, the present Example, among other things, demonstrates that addition of a particulate material such as silicon carbide between the layers of NICALON TM silicon carbide fabric can substantially reduce, if not completely eliminate, the phenomenon of microcracking in the matrix material occupying the space between the layers of NICALON TM fiber fabric.

EXAMPLE 20

This Example demonstrates, among other things, that there is a preferred thickness for each of the boron nitride and silicon carbide coatings which are applied to a preform comprising silicon carbide reinforcement fibers if the optimal flexural strength is to be achieved. More particularly, this Example demonstrates that for ceramic composite bodies having about 35 to about 36 volume percent reinforcement fibers in a matrix comprising predominantly aluminum oxide, the optimum thickness of boron nitride is somewhere between 0.20 micron and 0.41 micron and the optimum thickness of silicon carbide is somewhere above about 1.9 microns.

Sample AF

A fabric preform was made in substantially the same manner as was described for Sample A of Example 2, except that all eight layers of fabric comprising NICALON TM silicon carbide fiber (obtained from Dow Corning Corp., Midland, Mich.) comprised 12-harness satin weave (12 HSW) fabric. The fabric preform was then placed into a graphite containment fixture whose shape (but not necessarily size) was substantially as shown in FIG. 4E.

The graphite containment fixture containing the fabric preform was then placed into a reactor chamber of a chemical-vapor infiltration (CVI) apparatus having a outer diameter of about 4.5 inches (110 mm) and a length of about 18 inches (441 mm). The axis of cylindrical symmetry of the inductively heated reactor was oriented vertically such that the reactive gases were introduced at the top of the reactor and exhausted at the base of the reactor. KANTHAL ® iron-chromium-aluminum alloy wires were used to suspend the graphite containment fixture about 11.5 inches (282 mm) from the top of the reactor. The warp yarns of the eighth layer of the fabric preform were parallel to the gas flow direction within the chamber.

The reactor chamber was closed and evacuated to less than about 0.6 torr. The reactor chamber was then heated to a temperature of about 800° C. by means of inductive heating. When the temperature within the reactor chamber reached about 800° C., as indicated by a thermocouple contained therein, a gas mixture comprising ammonia (NH3) flowing at about 400 standard cubic centimeters per minute (sccm) and a boron trichloride (BCl3) flowing at about 200 sccm was introduced into the reactor chamber while maintaining a total operating pressure of about 0.6 torr. After about 135 minutes at a temperature of about 800° C., the gas mixture flowing into the reactor chamber was interrupted, the power to the furnace heating the reactor chamber was interrupted and the furnace and its contents were naturally cooled. After sufficient cooling (e.g., less than about 200° C.), the reactor chamber door was opened and the preform containment fixture was removed from the reactor chamber to cool to about room temperature.

Disassembly of the graphite containment fixture revealed that the fibers of the fabric layers of the fabric preform were coated and bonded together by a boron nitride coating. This boron nitride coating had a thickness of about 0.3 micron as determined by the weight gain of the fabric preform due to boron nitride deposition.

Next, a silicon carbide coating was applied to the fibers of the fabric preform.

The boron nitride coated and bonded fabric preform was suspended about 11.5 inches (282 mm) from the top of the reactor using KANTHAL ® iron-chrominum-aluminum alloy wires into the reactor chamber of the above-described chemical vapor infiltration apparatus. The orientation of the boron nitride coated and bonded fabric preform was such that the warp yarns of the eighth layer of the 12-harness satin weave fabric were parallel to the gas flow direction within the chamber.

The reactor chamber door was closed and the reactor chamber and its contents were evacuated to less than about 0.3 torr. The reactor chamber and its contents were then heated from about room temperature to a temperature of about 925° C. at a rate of about 50° C. per minute. Hydrogen gas was then introduced into the reactor chamber at a flow rate of about 750 standard cubic centimeters per minute (sccm). When the reactor chamber and its contents had equilibrated at a temperature of about 925° C., as indicated by a thermocouple contained therein, additional hydrogen flowing at a rate of about 750 sccm was bubbled through a liquid bath of methyltrichlorosilane (MTS) maintained at a temperature of about 21° C., after which this gas was introduced into a reactor chamber. The pressure in the reactor chamber was stabilized at about 11 torr. After maintaining these conditions of temperature, pressure and gas flow rate for about 3 hours, power to the resistance heated furnace which heated the reactor chamber was interrupted and the about 750 sccm of hydrogen that was being directed through the liquid MTS bath was diverted around the MTS bath and permitted to flow directly into the reactor chamber, thus establishing a direct hydrogen gas flow rate of about 1500 sccm into the reactor chamber. The temperature of the reactor chamber and its contents was allowed to drop to about room temperature. The boron nitride bonded fabric preform was found to have been coated with a layer of silicon carbide, thereby forming a silicon carbide (SiC)-/boron nitride (BN)-coated fabric preform. The silicon carbide coating had a thickness of about 2.3 microns as determined by the weight gain of the preform as a result of the silicon carbide deposition.

A ceramic matrix comprising aluminum oxide and some aluminum alloy was then grown into the coated fabric preform in substantially the same manner as was described for Sample A of Example 2.

Unlike the composite material described in Example 2, the composite material of the present example was neither subjected to the metal removal process nor the elevated temperature heat treatment.

Sample AG

The Sample AG composite material was prepared in substantially the same way as described for the Sample AF composite material with the exception that the coating temperature of about 800° C. for boron nitride deposition was maintained for about 180 minutes. The resulting coating thicknesses for boron nitride and silicon carbide were about 0.41 and about 2.30 microns, respectively.

Sample AH

The composite material of Sample AH was produced in substantially the same manner as was the material for Sample AF with the exception that the coating temperature of about 800° C. for deposition of boron nitride was maintained for about 70 minutes. The coating thicknesses of boron nitride and silicon carbide which resulted were about 0.20 microns and about 2.30 microns, respectively.

Sample AI

The composite material of Sample AI was produced in substantially the same manner as was described for Sample AF with the exception that the temperature of about 925° C. for deposition of the silicon carbide coating was maintained for about 16 hours instead of about 20 hours. The coating thicknesses of boron nitride and silicon carbide which resulted were about 0.29 microns and about 1.78 microns, respectively.

Sample AJ

The composite material of Sample AJ was produced in substantially the same manner as was described for Sample AI with the exception that the temperature of about 800° C. for deposition of the boron nitride coating was maintained for about 70 minutes. The coating thicknesses of boron nitride and silicon carbide which resulted were about 0.21 microns and about 1.90 microns, respectively.

Test specimens for determining the mechanical strength of the above-described composite materials were machined using diamond tooling to the dimensions given in Example 1.

The mechanical strength of these test specimens was then determined by stressing each specimen in four-point flexure substantially as described in Example 1 until the sample failed. These flexural strength tests were conducted at ambient temperature and are reported in Table XI. An examination of Table XI reveals that for a relatively constant silicon carbide coating thickness of about 2.2 to 2.3 microns, the greatest flexural strength (taken from an average of 7 specimens for each composite material sample) is realized for a boron nitride coating thickness of about 0.3 micron. Reductions in strength were observed for boron nitride coating thicknesses of 0.20 and 0.41 microns, respectively. In addition, specifically by comparing the average strength values for Sample AI to that of Sample AF and that of Sample AJ to that of Sample AH, it is clear that silicon carbide coating thicknesses in the range of 2.2-2.3 microns produce greater strengths than silicon carbide coating thicknesses in the range of 1.8-1.9 microns.

Thus, this Example demonstrates, among other things, that there exists a desirable range of coating thicknesses of each of boron nitride and silicon carbide to be applied to the fibers of the present reinforced ceramic composite materials to yield optimum ambient temperature strength. Specifically, the applied thickness of boron nitride should be greater than about 0.20 micron but less than about 0.41 micron. Furthermore, the applied thickness of silicon carbide should be greater than about 1.78 microns and preferably greater than about 1.90 microns.

TABLE XI

| Sample No. | Volume % Fiber | BN* (microns) | SiC* (microns) | Avg. Str.** (MPa) |
| --- | --- | --- | --- | --- |
| AF | 35.3 | 0.30 | 2.20 | 541 |
| AG | 36.0 | 0.41 | 2.30 | 487 |
| AH | 36.0 | 0.20 | 2.30 | 457 |
| AI | 36.0 | 0.29 | 1.78 | 388 |
| AJ | 36.0 | 0.21 | 1.90 | 358 |

*nominal coating thickness calculated on the basis of weight gain as a result chemical vapor deposition of coating
**average of seven samples

EXAMPLE 21

The following Example demonstrates, among other things, a method for forming a fiber reinforced ceramic composite body. Specifically, this Example demonstrates a method for forming a silicon carbide fiber reinforced alumina composite body wherein the silicon carbide fibers are coated with a first layer of boron nitride and a second layer of silicon carbide to create a debond zone between the silicon carbide fiber and the alumina matrix. Reference numerals throughout this Example correspond to the reference numerals used in FIGS. 4A, 4B, 4C, 4D, 4E, 11A and 11B.

Four fabric preforms 103 measuring about 9 inches (229 mm) long, about 6 inches (152 mm) wide and about 0.125 inch (3.2 mm) thick were made by stacking a plurality of layers of 8 harness satin weave (8 HSW) fabric and 12 harness satin weave (12 HSW) fabric made from NICALON ™ silicon carbide fiber (obtained from Dow Corning Corporation, Midland, Mich.) on top of each other.

In reference to FIG. 4E, two fabric preforms 103 each comprised of the two 8 HSW outer fabric layers, and the six 12 HSW inner fabric layers were placed side by side on a perforated graphite plate 104 machined from Grade AXF-5Q graphite (Poco Graphite, Inc., Decatur, Tex.) which measured about 20.6 inches (523 mm) long, about 8 inches (203 mm) wide and about 0.75 inch (19.1 mm) thick. The inner perforated region 105 of the perforated plate measured about 18.6 inches (472 mm) long and about 6 inches (152 mm) wide. The holes 106 of the perforated region 105 had a diameter of about 0.25 inch (6.4 mm), a center-to-center spacing of about 0.375 inch (9.5 mm) and comprised a 31 hole×18 hole array which was bordered along its perimeter by an about 1 inch (25 mm) unperforated region. After the two fabric preforms 103 had been placed on the first graphite plate 104, a second graphite plate 104, substantially the same as the first, was placed over the fabric preform 103 and the plates were clamped using C-clamps to compress the fabric preform 103. Two graphite channel members 107 machined from Grade AXF-5Q graphite (Poco Graphite, Inc., Decatur, Tex.) and measuring about 20.6 inches (523 mm) long were placed over common ends of both perforated graphite plates 104 so as to contact opposite ends of the first and second perforated graphite plates 104 thereby creating a preform containment fixture 108. FIG. 4E is an isometric schematic view of the preform containment fixture 108. After the graphite channels 107 were secured to the perforated plates 104, the C-clamps were removed from the perforated plates 104 and the elastic force exerted by the compressed fabric preforms 103 biased the perforated graphite plates 104 against the graphite channel members 107 to form a relatively rigid preform containment fixture 108. The warp yarns 92 of the eighth layer 102 of the fabric preforms 103 within the graphite containment fixture 108 were positioned so as to be parallel to the length of the graphite channel members 107 of the preform containment fixture 108.

Two graphite containment fixtures 108 each containing the two fabric preforms 103 (only one depicted) were placed into a reactor chamber of a chemical vapor infiltration apparatus having an outer diameter of about 18 inches (457 mm). The inner diameter of the reactor chamber measured about 15.5 [9.45] inches (393 mm) [(240 mm)] after being lined with a graphite tube having a wall thickness of about 0.5 inch (13 mm). The warp yarns 92 of the eighth layer 102 of the fabric preforms 103 were parallel to the gas flow direction within the chamber as well as being parallel to the longitudinal axis of the reactor chamber. The reactor chamber was closed and evacuated to about 0.004 inch (0.1 mm) of mercury (Hg). Then the reactor chamber was heated to about 800° C. at about 6° C. per minute so that the contents of the reactor chamber were at about 750° C., as indicated by a thermocouple contained therein. When the temperature within the reactor chamber reached about 750° C., a gas mixture comprised of ammonia ($NH_3$) flowing at about 2000 standard cubic centimeters (sccm) and boron chloride ($BCl_3$) flowing at about 1200 sccm was introduced into the reactor chamber while maintaining a total operating pressure of from about 0.020 to about 0.039 inches of mercury (about 0.5 to about 1.0 mm Hg). After about 4.0 hours at about 750° C., the gas mixture flowing into the reactor chamber was interrupted, the power to the furnace heating the reactor chamber was interrupted, and the furnace and its contents were naturally cooled to about 100° C. At about 100° C., the reactor chamber door was opened and the graphite containment fixtures 108 were removed, cooled and disassembled to reveal that the fibers of the fabric layers of the four fabric preforms 103 were coated and that the fabric layers comprising the fabric preforms 103 were bonded together by a boron nitride coating formed during the process at about 750° C., thereby forming a coated and bonded fabric preform 109. The boron nitride coating had a thickness of about 0.4 microns.

The four boron nitride coated and bonded fabric preforms 109 were then suspended from a graphite cantilever support fixture (depicted in FIG. 11B) made from Grade AXF-5Q graphite (Poco Graphite, Inc., Decatur, Tex.) by wires comprised of a Kanthal ® iron-chromium-aluminum alloy all of which are depicted schematically in FIG. 11A. The graphite cantilever support fixture 110 and the boron nitride bonded fabric preforms [109] were then replaced into the reactor chamber of the chemical vapor infiltration apparatus discussed above such that the warp yarns 92 of the eighth layer 102 comprised of the 8 harness satin weave fabric were parallel to the gas flow direction within the chamber as well as being parallel to the longitudinal axis of the reactor chamber. After the reactor chamber door was closed, the reactor chamber and its contents were evacuated to about 0.004 inches (0.1 mm Hg). The reactor chamber was heated at about 2° C. per minute so that the contents of the reactor chamber were at about 975° C. as indicated by a thermocouple therein. When the reactor chamber contents were at about 975° C., additional hydrogen, flowing at about 11000 sccm, was introduced into the reactor chamber. Once the temperature of the contents of the reactor chamber had substantially completely stabilized at about 975° C., about 1700 sccm of hydrogen were diverted away from direct entry into the reactor chamber, and were first bubbled through a bath of trichloromethylsilane ($CH_3SiCl_3$) also known as methyltrichlorolsilane (MTS) (Hulls/Petrarch System, Bristol, Pa.), maintained at about 40° C., before entering the reactor chamber. After about 48 hours at about 975° C., the power to the furnace heating the reactor chamber was interrupted and the about 1700 sccm of hydrogen that was being directed through the MTS bath was again permitted to flow directly into the reactor chamber to re-establish a direct hydrogen gas flow rate of about 11000 sccm into the reactor chamber. It was noted that about 12.5 liters of MTS had been consumed during the 48 hours of the run at about 975° C. After about a half hour during which a hydrogen gas flow rate at about 11000 sccm was maintained, the hydrogen flow rate was interrupted and the furnace and its contents were evacuated to about 0.039 inches 0.1 mm of mercury (Hg) and allowed to cool. After the reaction chamber had cooled to a temperature of about 100° C., the argon gas was backfilled to the reaction chamber which increased the reaction chamber pressure to about atmospheric pressure. At about atmospheric pressure and after the argon gas flow was interrupted the reaction chamber door was opened. The graphite cantilever support fixture and the fabric preform were removed from the reactor chamber to reveal that the boron nitride bonded fabric preform had been coated with a second layer of silicon carbide thereby forming a silicon carbide (SiC)/boron nitride (BN)-coated fabric preform. The silicon carbide had an overall average thickness of about 3 microns, as calculated from the weight gain of the preform during the silicon carbide coating procedure, as alluded to previously.

A two piece silicone rubber pattern having an inner cavity communicating with its exterior and was used to make an alumina bonded wollastonite shell. The inner cavity of the two piece silicone rubber mold was designed to form the alumina bonded wollastonite shell having a trapezoid cross-section and measuring about 10 inches (254 mm) by about 7.5 inches (191 mm) at the shell bottom, about 10.5 inches (267 mm) by about 8 inches (203 mm) at the shell opening, and about 1.25 inches (32 mm) deep. The two piece silicone rubber pattern was coated with mold release and then assembled. Specifically, a slurry mixture comprised by weight of about 2 parts BLUONIC ® A colloidal alumina (Buntrock Industries, Lively, Va.), about 1 part −325 mesh (average particle diameter less than about 45 microns) NYAD ® wollastonite (a calcium silicate mineral obtained from NYCO, Willsboro, N.Y.) and about 5 parts −10, +100 mesh NYAD ® FP wollastonite (i.e., having substantially all particles between about 150 and 2000 microns in diameter) was made by hand mixing the materials together in a commercially available mixer (manufactured by Hobart Corp., New Castle, Del.). The slurry mixture was then inserted using a spatula onto the cavity of the silicone rubber pattern to a thickness at the walls of the shell of about 0.75 inch (19 mm) and at the bottom of the shell of about 0.25 inch (6.4 mm). Additional −10, +100 mesh NYAD ® FP wollastonite was sprinkled [liberally] onto the slurry mixture coating comprising the bottom of the shell to prevent liquid runoff and to form a precursor of a shell. When the precursor shell of slurry mixture/coarse wollastonite was formed to produce a thickness of about 0.25 inch (6.4 mm), the filled silicon rubber pattern was set aside to dry at about room temperature for about 4 hours. After the filled silicone rubber pattern had substantially completely dried at about room temperature, the filled silicone rubber pattern was placed into an freezer maintained at about 15° C. The filled silicone rubber pattern was held at a temperature of about 15° C. for about 24 hours, during which time the colloidal alumina set for form an unfired precursor to an alumina bonded wollastonite shell.

The unfired precursor to the alumina bonded wollastonite shell was then placed, after removing the two piece silicone rubber pattern, into an air furnace. The furnace and its contents were then heated to about 1000° C. in about 4 hours and held at about 1000° C. for about 4 hours to insure the at least partial sinter alumina bonded wollastonite shell. The furnace and its contents were then cooled to about room temperature. The above procedure was repeated to produce four substantially similar aluminum bonded wollastonite shells.

The following describes the procedure for preparing growth lay-ups, growing and removing the at least on metallic constituent for each SiC/BN-coated fabric preform as depicted in FIG. 4G. About 30 grams of VASELINE ® petroleum jelly vehicle (Cheseborough Ponds, Inc., Greenwich, Conn.) were melted in a small aluminum weighing dish on a hot plate set at about medium heat until the jelly turned to a liquid. A clean sable brush was then used to substantially completely coat one of the 9 inches (229 mm) by 6 inches (152 mm) rectangular surfaces of the SiC/BN-coated fabric preform 112 to provide an interface for the application of a nickel oxide powder. A mixture comprising about 3 grams of −200 mesh (particle diameter less than about 75 microns) nickel oxide powder and about 4 grams of ethanol was applied with a sponge brush to substantially completely cover the petroleum jelly coated surface of the SiC/BN-coated fabric preform. After the ethanol had substantially completely evaporated, the SiC/BN-coated fabric preform 112 was inserted into the alumina bonded wollastonite shell 120 such that the uncoated side of the SiC/BN-coated preform 112 not coated with the nickel oxide powder contacted the bottom of the shell 120, as shown in FIG. 4G. The spaces between the perimeter of the SiC/BN-coated fabric preform 112 and the walls of the alumina bonded wollastonite shell 120 were filled with −10,+100 mesh NYAD ™ FP wollastonite (NYCO, Willsboro, N.Y.) until the surface of the wollastonite powder was substantially flush with the nickel oxide powder-coated surface of the SiC/BN-coated fabric preform 112. The alumina bonded wollastonite shell 120 containing the SiC/BN-coated fabric preform 112 was then placed level onto two stilts 122, which were made from fire brick and measured about 9 inches (229 mm) long and about 1 inch (25 mm) square, and was thereafter surrounded by wollastonite powder 123 which was contained in a refractory boat 124. The SiC/BN-coated fabric preform 112 was then leveled. About 1350 grams of a parent metal was distributed into three 30 gram clay crucibles (obtained from J. H. Berge, Inc., South Plainfield, N.J.) in amounts of about 450 grams per crucible. The parent metal comprised by weight of about 8.5 to 11.0 percent silicon, 3.0 to 4.0 percent copper, 2.7 to 3.5 percent zinc, 0.2 to 0.3 percent magnesium, ≦0.01 percent calcium, ≦0.10 percent titanium, 0.7 to 1.0 percent iron, ≦0.5 percent nickel, ≦0.5 percent manganese, ≦0.35 percent tin, ≦0.001 percent beryllium, ≦0.15 percent lead and the balance aluminum. The refractory boat 124 and its contents, as well as the three 30 gram clay crucibles containing the parent metal, were placed into an air atmosphere furnace and the furnace door was closed. The furnace and its contents were then heated from about room temperature to about 700° C. at about 400° C. per hour, during which time the VASELINE ® petroleum jelly volatilized and the nickel oxide powder 125 fell onto the surface of the SiC/BN-coated fabric preform 112. After about an hour at about 700° C., during which time the parent metal 126 had substantially completely melted, the parent metal 126 was then poured into the alumina bonded wollastonite shell 120 and onto the nickel oxide powder-coated side of the SiC/BN-coated fabric preform 112, thereby covering the surface of the preform 112. Wollastonite powder 127 was then poured onto the surface of the molten parent metal 126 within the alumina bonded wollastonite shell 120 to substantially completely cover the surface of the molten parent metal. This assembly formed the lay-up for growth of a ceramic matrix composite body. The furnace and its contents comprising the lay-up were then heated to about 950° C. at about 400° C. per hour. After about 90 hours at about 950° C., the furnace and its contents were cooled to about 700° C. at about 150° C. per hour. At about 700° C., the lay-up was removed from the furnace and residual molten parent metal was decanted from the alumina bonded wollastonite shell 120, the shell 120 was quickly broken away from the SiC/BN-coated fabric preform 112 and the preform 112 was buried in a silica sand bed to cool the preform 112 to about room temperature. At about room temperature, it was observed that an oxidation reaction product had grown into and substantially completely embedded the SiC/BN-coated fabric preform 112, thereby forming a fiber reinforced ceramic composite body 130 having a plurality of fabric layers comprised of harness satin weaves. Specifically, the fiber reinforced ceramic composite body 130 comprised two outer layers of 8 harness satin weave silicon carbide fabric and six inner layers of 12 harness satin weave silicon carbide fabric embedded by an aluminum oxide oxidation product. The composite body also comprised a metallic constituent comprising residual unreacted parent metal.

Once the ceramic composite body had been manufactured, the metal removal process of the present invention was begun. The first step of the metal removal process was to form a filler material mixture for infiltration by metal contained in the formed ceramic matrix composite body.

Specifically, filler material mixture comprising by weight of about 90 percent E-67 1000 grit (average particle diameter of about 5 microns) alumina (Norton Co., Worcester, Mass.) and about 10 percent −325 mesh (particle diameter less than about 45 microns) magnesium powder (Reade Manufacturing Company, Lakehurst, N.J.) was prepared using a V-blender. The contents of the V-blender were mixed for about 15 minutes under an argon atmosphere to mix the alumina and magnesium powders together. Thereafter, the filler material mixture 131 was complete.

A stainless steel boat 132 measuring about 12 inches (305 mm) square by about 2 inches (50.8 mm) deep and having a wall thickness of about 0.063 inches (1.6 mm) was lined with a graphite foil box 133 made from a piece of GRAFOIL ® graphite foil (Union Carbide Corp., Carbon Products Division, Cleveland, Ohio). About 1 inch (25 mm) of the filler material mixture 131 was hand packed into the bottom of the graphite foil lined stainless steel boat 132. The fiber reinforced ceramic composite body 130 was then placed onto and forced into the filler material mixture 131. Additional filler material mixture 131 was then poured over the fiber reinforced ceramic composite body 130 to substantially completely cover it. The filler material mixture 131 was then hand packed to ensure good contact between the filler material mixture 131 and the fiber reinforced ceramic composite body 130, thereby forming a metal removal lay-up as depicted schematically in cross-section in FIG. 4H.

The metal removal lay-up comprising the stainless steel boat 132 and its contents was then placed into a resistance heated controlled atmosphere furnace and the furnace chamber door was closed. The furnace chamber and its contents were first evacuated to at least 30 inches (762 mm) of mercury (Hg) vacuum, then the vacuum pump was disconnected from the furnace chamber and nitrogen was introduced into the chamber to establish about atmospheric pressure of nitrogen in the chamber. This operation was repeated. After the pressure in the furnace chamber reached about atmospheric pressure, the furnace chamber and its contents were heated from about room temperature to about 750° C. at a rate of about 200° C. per hour and held at about 750° C. for about 5 hours and cooled from about 750° C. to about 100° C. at about 200° C. per hour with a nitrogen gas flow rate of about 4000 sccm being maintained throughout the heating and cooling. At about 100° C., the nitrogen flow was interrupted, the furnace door was opened, and the stainless steel boat and its contents were removed and cooled by forced convection. At about room temperature, the filler material 131 was separated from the fiber reinforced ceramic composite body 130 and it was noted that the metallic constituent of the fiber reinforced ceramic composite body 130 had been substantially completely removed. The fiber reinforced ceramic composite body 130 was then subjected to grit blasting by a sand blaster which operated with a working pressure of about 40 pounds per square inch to remove any excess filler material that had adhered to the surface of the composite body 130.

What is claimed is:

1. A method for removing at least one metallic component of a metallic constituent contained within a fiber reinforced ceramic matrix composite body comprising:
    contacting at least a portion of at least one surface of said fiber reinforced ceramic matrix composite body with at least one permeable mass comprising at least one material selected from the group consisting of at least one filler material and at least one preform of at least one filler material; and
    spontaneously infiltrating at least a portion of the at least one permeable mass with at least one metallic component of a metallic constituent of the fiber reinforced ceramic matrix composite body, thereby reducing the amount of said at least one metallic component in the fiber reinforced ceramic matrix composite body.

2. The method of claim 1, wherein said at least one permeable mass substantially completely surrounds said fiber reinforced ceramic matrix composite body.

3. The method of claim 1, wherein said at least one permeable mass contacts substantially only one side of said fiber reinforced ceramic matrix composite body.

4. The method of claim 1, wherein said at least one filler material comprises at least one ceramic particulate.

5. The method of claim 1, further comprising providing at least one infiltration enhancer precursor wherein said at least one infiltration enhancer is formed by reacting at least one infiltration enhancer precursor and at least one species selected from the group consisting of an infiltrating atmosphere and at least one material added to the permeable mass.

6. The method of claim 5, wherein said at least one infiltration enhancer comprises at least one nitride of magnesium formed from a reaction between a nitrogenous infiltrating atmosphere and a magnesium-containing infiltration enhancer precursor.

7. The method of claim 1, wherein said at least one permeable mass is contacted with at least one barrier means.

8. The method of claim 7, wherein said spontaneously infiltrating occurs only up to said at least one barrier means.

9. The method of claim 1, wherein said spontaneously infiltrating results in at least one gradation of at least one property in the fiber reinforced ceramic matrix composite body after at least a portion of said at least one metallic component is removed therefrom.

10. The method of claim 9, wherein said at least one gradation of at least one property occurs due to at least one step selected from the group of steps consisting of (1) discontinuing spontaneous infiltration prior to complete removal of said at least one metallic component; (2) adjusting the temperature to different set points during said spontaneous infiltration; (3) providing differing amounts of at least one infiltration enhancer or at least one infiltration enhancer precursor in at least one of said at least one permeable mass and said metallic constituent; (4) causing said at least one permeable mass which contacts said fiber reinforced ceramic matrix composite body to exhibit different properties at different portions thereof; and (5) controlling infiltration of said at least one permeable mass with the at least one metallic component from said fiber reinforced ceramic matrix composite body so as to result in differing amounts of infiltration in certain areas of the at least permeable mass relative to other areas of the at least one permeable mass.

11. The method of claim 1, wherein during or after said spontaneously infiltrating, at least one matrix conversion layer is formed in at least a portion of said fiber reinforced ceramic matrix composite body.

12. The method of claim 11, wherein said at least one matrix conversion layer is formed on at least a portion of at least one reinforcement phase in said fiber reinforced ceramic matrix composite body.

13. The method of claim 12, wherein said at least one matrix conversion layer comprises at least one reaction product formed from at least one reaction between at least a portion of said at least one metallic component and at least one other species.

14. The method of claim 13, wherein said at least one matrix conversion layer is formed from at least one reaction between at least one infiltrating atmosphere and said at least a portion of said at least one metallic component.

15. The method of claim 1, wherein said spontaneously infiltrating occurs at a temperature of at least about 650° C.

16. A method for making a ceramic matrix composite body having reduced metal content and reinforced by at least one fibrous material comprising the steps of:
   providing at least one fibrous material;
   placing at least one coating onto said at least one fibrous material;
   positioning at least one parent metal adjacent to said at least one fibrous material so that formation of oxidation reaction product will occur in a direction towards and into said at least one fibrous material;
   heating said at least one parent metal to render it molten and reacting the molten at least one parent metal with an oxidant to form at least one oxidation reaction product and causing continued oxidation reaction product to grow into the at least one fibrous material;
   continuing formation of oxidation reaction product for a time sufficient to embed at least a portion of the at least one fibrous material, thereby forming a fiber reinforced ceramic matrix composite body comprising a metallic constituent having at least one interconnected metallic component;
   contacting at least a portion of at least one surface of the formed fiber reinforced ceramic matrix composite body with at least one permeable mass comprising at least one material selected from the group consisting of at least one filler material and at least one preform of at least one filler material; and
   spontaneously infiltrating at least a portion of the at least one permeable mass with at least a portion of said at least one interconnected metallic component of said formed fiber reinforced ceramic matrix composite body, thereby reducing the amount of said at least one interconnected metallic component in said formed fiber reinforced ceramic matrix composite body.

17. The method of claim 16, wherein said at least one fibrous material comprises at least one material selected from the group consisting of silicon carbide-based fibers, alumina-based fibers, and carbon-based fibers.

18. The method of claim 16, wherein a chemical vapor infiltration process deposits at least two coatings on said at least one fibrous material, said at least two coatings being selected from the group of coatings consisting of boron nitrides, silicon carbides, titanium carbides, silicon nitrides, iridium, niobium and platinum.

19. The method of claim 1, further comprising providing at least one infiltration enhancer precursor, wherein at least one infiltration enhancer is formed by reacting said at least one infiltration enhancer precursor and at least one species selected from the group consisting of an infiltrating atmosphere and at least one material added to the permeable mass.

20. The method of claim 19, wherein said at least two coatings comprise a first coating of boron nitrides and a second coating of silicon carbides.

21. A method for removing at least one metallic component of at least one metallic constituent contained within a multi-phase composite body comprising:
   contacting at least a portion of at least one surface of said multi-phase composite body with at least one permeable mass comprising at least one material selected from the group consisting of at least one filler material and at least one preform of at least one filler material; and
   spontaneously infiltrating at least a portion of the at least one permeable mass with at least a portion of the at least one metallic component of at least one metallic constituent of the multi-phase composite body, thereby reducing the amount of said at least one metallic component and said at least one metallic constituent in the multi-phase composite body.

22. The method of claim 21, wherein said at least one permeable mass substantially completely surrounds said multi-phase composite body.

23. The method of claim 21, wherein said at least one permeable mass contacts substantially only one side of said multi-phase composite body.

24. The method of claim 21, wherein said at least one filler material comprises at least one ceramic particulate.

25. The method of claim 21, wherein the at least one metallic component of the multi-phase composite body is selectively removed from only that portion of the multi-phase composite body which contacts said at least one permeable mass.

26. The method of claim 21, wherein said at least one metallic component comprises aluminum.

27. The method of claim 21, wherein said at least one permeable mass is contacted with at least one barrier means.

28. The method of claim 27, wherein said spontaneously infiltrating occurs only up to said at least one barrier means.

29. The method of claim 27, wherein said at least one barrier means is placed into contact with said at least one permeable mass by at least one process selected from the group consisting of painting, dipping, silk screening, evaporating, sputtering, depositing and contacting a solid material or sheet with said at least one permeable mass.

30. The method of claim 21, wherein said spontaneously infiltrating results in at least one gradation of at least one property in the formed multi-phase composite body after at least a portion of said at least one metallic component is removed therefrom.

31. The method of claim 30, wherein said at least one gradation of at least one property occurs due to at least one step selected from the group of steps consisting of (1) discontinuing spontaneous infiltration prior to complete removal of said at least one metallic component; (2) adjusting the temperature to different set points during said spontaneous infiltration; (3) providing differing amounts of at least one infiltration enhancer and at least one infiltration enhancer precursor in at least one of said at least one permeable mass and said at least one metallic constituent; (4) causing said at least one permeable mass which contacts said multi-phase composite body to exhibit different properties at different portions thereof; and (5) controlling infiltration of said at least one permeable mass with at least one metallic component from said multi-phase composite body so as to result in differing amounts of infiltration in certain areas of the at least one permeable mass relative to other areas of the at least one permeable mass.

32. The method of claim 21, wherein during or after said spontaneously infiltrating, at least one matrix conversion layer forms in at least a portion of said multi-phase composite body.

33. The method of claim 32, wherein said at least one matrix conversion layer forms on at least a portion of at least one reinforcement phase in said multi-phase composite body.

34. The method of claim 33, wherein said at least one matrix conversion layer comprises at least one reaction product formed from at least one reaction between at least a portion of said at least one metallic component and at least one other species.

35. The method of claim 32, wherein said at least one matrix conversion layer comprises aluminum nitride.

36. The method of claim 21, wherein said multi-phase composite body comprises a metal matrix composite body.

37. The method of claim 21, wherein said multi-phase composite body comprises a ceramic or ceramic matrix composite body.

38. A method for removing at least one metallic component of at least one metallic constituent contained within a multi-phase composite body comprising:

placing at least one composite body comprising at least two phases, one of said phases comprising a metallic component, into contact with at least one permeable mass, said at least one permeable mass comprising at least one material selected from the group consisting of at least one filler material and at least one preform comprising at least one filler material, said permeable mass contacting at least a portion of at least one surface of the at least one multi-phase composite body;

communicating at least one of at least one infiltration enhancer and at least one infiltration enhancer precursor with at least one of (1) said at least one metallic component of the multi-phase composite body, (2) said at least one permeable mass, (3) said at least a portion of at least one surface and (4) at least one infiltrating atmosphere, to cause spontaneous infiltration of at least a portion of the at least one metallic component into the at least one permeable mass to occur; and spontaneously infiltrating at least a portion of the at least one permeable mass with at least one molten metallic component.

39. The method of claim 38, wherein said at least one permeable mass substantially completely surrounds said multi-phase composite body.

40. The method of claim 38, wherein said at least one permeable mass contacts substantially only one side of said multi-phase composite body.

41. The method of claim 38, wherein said at least one filler material comprises at least one ceramic particulate.

42. The method of claim 38, wherein the at least one metallic component of the multi-phase composite body is selectively removed from only that portion of the multi-phase composite body which contacts said at least one permeable mass.

43. The method of claim 38, wherein said at least one infiltrating atmosphere communicates with said at least one permeable mass for substantially all of said spontaneously infiltrating step.

44. The method of claim 38, wherein the at least one infiltration enhancer is supplied.

45. The method of claim 44, wherein the at least one infiltration enhancer is supplied to at least one of said at least one metallic component in said multi-phase composite body and said at least one permeable mass.

46. The method of claim 38, wherein said at least one metallic component comprises aluminum.

47. The method of claim 38, wherein said at least one infiltration enhancer precursor comprises magnesium.

48. The method of claim 47, wherein said at least one infiltrating atmosphere comprises nitrogen.

49. The method of claim 38, wherein said at least one infiltration enhancer is formed by reacting said at least one infiltration enhancer precursor and at least one species selected from the group consisting of the at least one infiltrating atmosphere and a material added to the at least one permeable mass.

50. The method of claim 49, wherein said at least one infiltration enhancer comprises at least one nitride of magnesium formed from a reaction between a nitrogenous infiltrating atmosphere and at least one magnesium-containing infiltration enhancer precursor.

51. The method of claim 38, wherein said at least one permeable mass is contacted with at least one barrier means.

52. The method of claim 51, wherein said spontaneously infiltrating occurs only up to said at least one barrier means.

53. The method of claim 51, wherein said at least one barrier means is placed into contact with said at least one permeable mass by at least one process selected from the group consisting of painting, dipping, silk screening, evaporating, sputtering, depositing and contacting a solid material or sheet with said at least one permeable mass.

54. The method of claim 38, wherein said spontaneously infiltrating results in at least one gradation of at least one property in the formed multi-phase composite body after at least a portion of said at least one metallic component is removed therefrom.

55. The method of claim 54, wherein said at least one gradation of at least one property occurs due to at least one step selected from the group of steps consisting of (1) discontinuing spontaneous infiltration prior to complete removal of said at least one metallic component; (2) adjusting the temperature to different set points during said spontaneous infiltration; (3) providing differing amounts of said at least one infiltration enhancer and said at least one infiltration enhancer precursor in at least one of said at least one permeable mass and said at least one metallic constituent; (4) causing said at least one permeable mass which contacts said multi-phase composite body to exhibit different properties at different portions thereof; and (5) controlling infiltration of said at least one permeable mass with at least one metallic component from said multi-phase composite body so as to result in differing amounts of infiltration in certain areas of the at least one permeable mass relative to other areas of the at least one permeable mass.

56. The method of claim 38, wherein during or after said spontaneously infiltrating, at least one matrix conversion layer forms in at least a portion of said multi-phase composite body.

57. The method of claim 56, wherein said at least one matrix conversion layer comprises aluminum nitride.

58. The method of claim 56, wherein said at least one matrix conversion layer forms on at least a portion of at least one reinforcement phase in said multi-phase composite body.

59. The method of claim 58, wherein said at least one matrix conversion layer comprises at least one reaction product formed from at least one reaction between at least a portion of said at least one metallic component and at least one other species.

60. The method of claim 58, wherein said at least one matrix conversion layer forms from at least one reaction between said at least one infiltrating atmosphere and said at least a portion of said at least one metallic component.

61. The method of claim 38, wherein said at least one metallic component comprises aluminum, said at least one infiltration enhancer precursor comprises magnesium present in an amount of at least about 0.1 percent by weight and said at least one infiltrating atmosphere comprises nitrogen.

62. The method of claim 61, wherein said spontaneously infiltrating occurs at a temperature of at least about 675° C.

63. The method of claim 62, wherein said temperature is from about 675° C. to about 1000° C.

64. The method of claim 38, wherein said multi-phase composite body comprises a metal matrix composite body.

65. The method of claim 38, wherein said multi-phase composite body comprises a ceramic or ceramic matrix composite body.

* * * * *